US011776190B2

(12) United States Patent
Sepulveda et al.

(10) Patent No.: US 11,776,190 B2
(45) Date of Patent: Oct. 3, 2023

(54) TECHNIQUES FOR MANAGING AN AVATAR ON A LOCK SCREEN

(71) Applicant: Apple Inc., Cupertino, CA (US)

(72) Inventors: Raymond S. Sepulveda, Portland, OR (US); Jason D. Rickwald, Santa Cruz, CA (US); Nicolas V. Scapel, London (GB); Kevin N. Armstrong, San Jose, CA (US); Amaury Balliet, Paris (FR); Adam M. Cotugno, Menlo Park, CA (US); Lisa K. Forssell, Palo Alto, CA (US); Thomas Goossens, Mountain View, CA (US); Aurelio Guzman, San Jose, CA (US); Guilherme Jacinto, Cupertino, CA (US); Steve S. Ko, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/736,925

(22) Filed: May 4, 2022

(65) Prior Publication Data

US 2022/0392132 A1 Dec. 8, 2022

Related U.S. Application Data

(60) Provisional application No. 63/197,209, filed on Jun. 4, 2021.

(51) Int. Cl.
G06T 13/40 (2011.01)
G06F 3/04842 (2022.01)
G06F 3/04815 (2022.01)
G06F 3/0482 (2013.01)

(52) U.S. Cl.
CPC ............ G06T 13/40 (2013.01); G06F 3/0482 (2013.01); G06F 3/04815 (2013.01); G06F 3/04842 (2013.01); G06T 2200/24 (2013.01)

(58) Field of Classification Search
CPC ...................................... G06T 13/40
See application file for complete search history.

(56) References Cited

U.S. PATENT DOCUMENTS

| 4,847,819 A | 7/1989 | Hong |
| 4,945,521 A | 7/1990 | Klaus |
| 6,084,598 A | 7/2000 | Chekerylla |
| 6,621,524 B1 | 9/2003 | Iijima et al. |

(Continued)

FOREIGN PATENT DOCUMENTS

| AU | 2015101639 A4 | 12/2015 |
| AU | 2017100683 B4 | 1/2018 |

(Continued)

OTHER PUBLICATIONS

101329707, CN, A, Cited by Chinese Patent Office in an Office Action for related Patent Application No. 201910691872.X dated Mar. 24, 2021.

(Continued)

Primary Examiner — Roland J Casillas
(74) Attorney, Agent, or Firm — DLA Piper LLP (US)

(57) ABSTRACT

The present disclosure generally relates to an avatar on a lock screen. A received user input causes a respective change in a respective element of the lock screen other than the avatar and an animation is displayed, over time, of the avatar transitioning through a plurality of poses.

90 Claims, 33 Drawing Sheets

(56) References Cited

U.S. PATENT DOCUMENTS

| | | |
|---|---|---|
| 7,180,524 B1 | 2/2007 | Axelrod |
| 7,227,976 B1 | 6/2007 | Jung et al. |
| 7,716,057 B2 | 5/2010 | Horvitz |
| 7,751,285 B1 | 7/2010 | Cain et al. |
| 7,908,554 B1 | 3/2011 | Blattner |
| 8,156,060 B2 | 4/2012 | Borzestowski et al. |
| 8,169,438 B1 | 5/2012 | Baraff et al. |
| 8,234,218 B2 | 7/2012 | Robinson et al. |
| 8,280,979 B2 * | 10/2012 | Kunz .................. G06Q 10/06 709/200 |
| 8,295,546 B2 | 10/2012 | Craig et al. |
| 8,390,628 B2 | 3/2013 | Harding et al. |
| 8,423,089 B2 | 4/2013 | Song et al. |
| 8,896,652 B2 | 11/2014 | Ralston |
| 9,094,576 B1 | 7/2015 | Karakotsios |
| 9,153,031 B2 | 10/2015 | El-saban et al. |
| 9,207,837 B2 | 12/2015 | Paretti et al. |
| 9,230,241 B1 | 1/2016 | Singh et al. |
| 9,230,355 B1 | 1/2016 | Ahuja et al. |
| 9,245,177 B2 | 1/2016 | Perez |
| 9,246,961 B2 | 1/2016 | Walkin et al. |
| 9,264,660 B1 | 2/2016 | Petterson et al. |
| 9,298,263 B2 | 3/2016 | Geisner et al. |
| 9,349,414 B1 | 5/2016 | Furment et al. |
| 9,411,506 B1 | 8/2016 | Marra et al. |
| 9,448,708 B1 | 9/2016 | Bennett et al. |
| 9,542,070 B2 | 1/2017 | Xu et al. |
| 9,602,559 B1 | 3/2017 | Barros et al. |
| 9,625,987 B1 | 4/2017 | Lapenna et al. |
| 9,628,416 B2 | 4/2017 | Henderson |
| 9,686,497 B1 | 6/2017 | Terry |
| 9,760,976 B2 | 9/2017 | Kameyama |
| 9,786,084 B1 | 10/2017 | Bhat et al. |
| 9,948,589 B2 | 4/2018 | Gonnen et al. |
| 9,949,697 B2 | 4/2018 | Iscoe et al. |
| 10,062,133 B1 | 8/2018 | Mishra et al. |
| 10,095,385 B2 | 10/2018 | Walkin et al. |
| 10,139,218 B2 | 11/2018 | Matsushita |
| 10,270,983 B1 | 4/2019 | Van Os et al. |
| 10,289,265 B2 | 5/2019 | Kulkarni |
| 10,325,416 B1 | 6/2019 | Scapel et al. |
| 10,325,417 B1 | 6/2019 | Scapel et al. |
| 10,375,313 B1 | 8/2019 | Van Os et al. |
| 10,376,153 B2 | 8/2019 | Tzvieli et al. |
| 10,379,719 B2 | 8/2019 | Scapel et al. |
| 10,410,434 B1 | 9/2019 | Scapel et al. |
| 10,505,726 B1 | 12/2019 | Andon et al. |
| 10,521,091 B2 | 12/2019 | Anzures et al. |
| 10,521,948 B2 | 12/2019 | Rickwald et al. |
| 10,580,221 B2 | 3/2020 | Scapel et al. |
| 10,620,590 B1 | 4/2020 | Guzman et al. |
| 10,628,985 B2 | 4/2020 | Mishra et al. |
| 10,657,695 B2 | 5/2020 | Chand et al. |
| 10,659,405 B1 | 5/2020 | Chang et al. |
| 10,698,575 B2 | 6/2020 | Walkin et al. |
| 10,708,545 B2 | 7/2020 | Rivard et al. |
| 10,789,753 B2 | 9/2020 | Miller et al. |
| 10,796,480 B2 | 10/2020 | Chen et al. |
| 10,798,035 B2 | 10/2020 | Lewis et al. |
| 10,810,409 B2 | 10/2020 | Bacivarov et al. |
| 10,817,981 B1 | 10/2020 | Belkin |
| 10,845,968 B2 | 11/2020 | Scapel et al. |
| 10,855,910 B2 | 12/2020 | Tano et al. |
| 10,902,661 B1 | 1/2021 | Mourkogiannis et al. |
| 11,061,372 B1 | 7/2021 | Chen et al. |
| 11,107,261 B2 | 8/2021 | Scapel et al. |
| 2001/0050689 A1 | 12/2001 | Park |
| 2002/0054157 A1 | 5/2002 | Hayashi et al. |
| 2003/0135769 A1 | 7/2003 | Loughran |
| 2003/0140309 A1 | 7/2003 | Saito et al. |
| 2004/0075699 A1 | 4/2004 | Franchi et al. |
| 2004/0203342 A1 | 10/2004 | Sibecas et al. |
| 2004/0225966 A1 | 11/2004 | Besharat et al. |
| 2005/0124389 A1 | 6/2005 | Yang |
| 2005/0190653 A1 | 9/2005 | Chen |
| 2005/0248574 A1 | 11/2005 | Ashtekar et al. |
| 2005/0257042 A1 * | 11/2005 | Sierra ................. G06F 9/45512 713/2 |
| 2005/0261031 A1 | 11/2005 | Seo et al. |
| 2006/0020904 A1 | 1/2006 | Aaltonen et al. |
| 2006/0166708 A1 | 7/2006 | Kim et al. |
| 2006/0188144 A1 | 8/2006 | Sasaki et al. |
| 2006/0294465 A1 | 12/2006 | Ronen et al. |
| 2007/0024614 A1 | 2/2007 | Tam et al. |
| 2007/0052851 A1 | 3/2007 | Ochs et al. |
| 2007/0113181 A1 | 5/2007 | Blattner et al. |
| 2007/0171091 A1 | 7/2007 | Nisenboim et al. |
| 2007/0192718 A1 | 8/2007 | Voorhees et al. |
| 2007/0226653 A1 | 9/2007 | Moore et al. |
| 2007/0260984 A1 | 11/2007 | Marks et al. |
| 2008/0052242 A1 | 2/2008 | Merritt et al. |
| 2008/0095470 A1 | 4/2008 | Chao et al. |
| 2008/0098031 A1 | 4/2008 | Ducharme |
| 2008/0201438 A1 | 8/2008 | Mandre et al. |
| 2008/0298571 A1 | 12/2008 | Kurtz et al. |
| 2009/0027337 A1 | 1/2009 | Hildreth |
| 2009/0031240 A1 * | 1/2009 | Hildreth ................. G06F 3/0304 715/823 |
| 2009/0044113 A1 | 2/2009 | Jones et al. |
| 2009/0066817 A1 | 3/2009 | Sakamaki |
| 2009/0077497 A1 | 3/2009 | Cho et al. |
| 2009/0144173 A1 | 6/2009 | Mo et al. |
| 2009/0144639 A1 | 6/2009 | Nims et al. |
| 2009/0202114 A1 | 8/2009 | Morin et al. |
| 2009/0216691 A1 | 8/2009 | Borzestowski et al. |
| 2009/0251484 A1 | 10/2009 | Zhao et al. |
| 2009/0254859 A1 | 10/2009 | Arrasvuori et al. |
| 2009/0254862 A1 | 10/2009 | Viginisson et al. |
| 2009/0297022 A1 | 12/2009 | Pettigrew et al. |
| 2009/0300513 A1 | 12/2009 | Nims et al. |
| 2009/0325701 A1 | 12/2009 | Andres Del Valle |
| 2010/0009747 A1 | 1/2010 | Reville et al. |
| 2010/0097375 A1 | 4/2010 | Tadaishi et al. |
| 2010/0123915 A1 | 5/2010 | Kashimoto |
| 2010/0124941 A1 | 5/2010 | Cho |
| 2010/0149573 A1 | 6/2010 | Pat et al. |
| 2010/0153847 A1 | 6/2010 | Fama |
| 2010/0188426 A1 | 7/2010 | Ohmori et al. |
| 2010/0203968 A1 | 8/2010 | Gill et al. |
| 2010/0211899 A1 | 8/2010 | Fujioka |
| 2010/0218089 A1 | 8/2010 | Chao et al. |
| 2010/0257469 A1 | 10/2010 | Kim et al. |
| 2010/0277470 A1 | 11/2010 | Margolis |
| 2010/0317410 A1 | 12/2010 | Song et al. |
| 2011/0007174 A1 | 1/2011 | Bacivarov et al. |
| 2011/0072394 A1 | 3/2011 | Victor et al. |
| 2011/0074807 A1 | 3/2011 | Inada et al. |
| 2011/0119610 A1 | 5/2011 | Hackborn et al. |
| 2011/0221755 A1 | 9/2011 | Geisner et al. |
| 2011/0239115 A1 * | 9/2011 | Williams ................. G06F 3/167 715/728 |
| 2011/0248992 A1 | 10/2011 | Van et al. |
| 2011/0249073 A1 | 10/2011 | Cranfill et al. |
| 2011/0249078 A1 | 10/2011 | Abuan et al. |
| 2011/0252344 A1 | 10/2011 | Van Os |
| 2011/0256848 A1 | 10/2011 | Bok et al. |
| 2011/0304632 A1 | 12/2011 | Evertt et al. |
| 2012/0017180 A1 | 1/2012 | Flik et al. |
| 2012/0069028 A1 | 3/2012 | Bouguerra |
| 2012/0075328 A1 | 3/2012 | Goossens |
| 2012/0079378 A1 | 3/2012 | Goossens |
| 2012/0113762 A1 | 5/2012 | Frost |
| 2012/0206452 A1 | 8/2012 | Geisner et al. |
| 2012/0210263 A1 | 8/2012 | Perry et al. |
| 2012/0256967 A1 | 10/2012 | Baldwin et al. |
| 2012/0293686 A1 | 11/2012 | Karn et al. |
| 2012/0299945 A1 | 11/2012 | Aarabi |
| 2012/0309520 A1 | 12/2012 | Evertt et al. |
| 2012/0314047 A1 | 12/2012 | Kasahara et al. |
| 2013/0038759 A1 | 2/2013 | Jo et al. |
| 2013/0101164 A1 | 4/2013 | Leclerc et al. |
| 2013/0135315 A1 | 5/2013 | Bares et al. |
| 2013/0141513 A1 | 6/2013 | Setton et al. |
| 2013/0147933 A1 | 6/2013 | Kulas et al. |

(56) References Cited

U.S. PATENT DOCUMENTS

| | | |
|---|---|---|
| 2013/0157646 A1 | 6/2013 | Ferren et al. |
| 2013/0159900 A1 | 6/2013 | Pendharkar |
| 2013/0194378 A1 | 8/2013 | Brown |
| 2013/0198210 A1 | 8/2013 | Lee et al. |
| 2013/0201104 A1 | 8/2013 | Ptucha et al. |
| 2013/0234964 A1 | 9/2013 | Kim et al. |
| 2013/0286161 A1 | 10/2013 | Lv et al. |
| 2013/0290905 A1 | 10/2013 | Luvogt et al. |
| 2013/0293686 A1 | 11/2013 | Blow et al. |
| 2013/0305189 A1 | 11/2013 | Kim |
| 2013/0322218 A1 | 12/2013 | Burkhardt et al. |
| 2013/0342730 A1 | 12/2013 | Lee et al. |
| 2014/0055554 A1 | 2/2014 | Du et al. |
| 2014/0078144 A1 | 3/2014 | Berriman et al. |
| 2014/0115488 A1 * | 4/2014 | Hackborn ............ G06F 3/0482 715/741 |
| 2014/0137013 A1 | 5/2014 | Matas |
| 2014/0143693 A1 | 5/2014 | Goossens et al. |
| 2014/0218371 A1 | 8/2014 | Du et al. |
| 2014/0267618 A1 | 9/2014 | Esteban et al. |
| 2014/0300635 A1 | 10/2014 | Suzuki |
| 2014/0333671 A1 | 11/2014 | Phang et al. |
| 2014/0336808 A1 | 11/2014 | Taylor et al. |
| 2014/0351720 A1 | 11/2014 | Yin |
| 2014/0362091 A1 | 12/2014 | Bouaziz et al. |
| 2014/0368601 A1 | 12/2014 | Decharms |
| 2015/0011204 A1 | 1/2015 | Seo et al. |
| 2015/0033192 A1 | 1/2015 | Bohannon et al. |
| 2015/0035825 A1 | 2/2015 | Zhou et al. |
| 2015/0036883 A1 | 2/2015 | Deri et al. |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0058754 A1 | 2/2015 | Rauh |
| 2015/0062052 A1 | 3/2015 | Bernstein et al. |
| 2015/0077502 A1 | 3/2015 | Jordan et al. |
| 2015/0078621 A1 | 3/2015 | Choi et al. |
| 2015/0082193 A1 | 3/2015 | Wallace et al. |
| 2015/0082446 A1 | 3/2015 | Flowers et al. |
| 2015/0091896 A1 | 4/2015 | Tarquini et al. |
| 2015/0149899 A1 | 5/2015 | Bernstein et al. |
| 2015/0149927 A1 | 5/2015 | Walkin et al. |
| 2015/0213604 A1 | 7/2015 | Li et al. |
| 2015/0248235 A1 | 9/2015 | Offenberg et al. |
| 2015/0253740 A1 | 9/2015 | Nishijima et al. |
| 2015/0281145 A1 | 10/2015 | Ji |
| 2015/0302624 A1 | 10/2015 | Burke |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0317945 A1 | 11/2015 | Andress et al. |
| 2015/0334075 A1 | 11/2015 | Wang et al. |
| 2015/0350141 A1 | 12/2015 | Yang et al. |
| 2015/0370529 A1 | 12/2015 | Zambetti et al. |
| 2016/0005211 A1 | 1/2016 | Sarkis et al. |
| 2016/0006987 A1 | 1/2016 | Li et al. |
| 2016/0030844 A1 | 2/2016 | Nair et al. |
| 2016/0034133 A1 | 2/2016 | Wilson et al. |
| 2016/0050169 A1 | 2/2016 | Ben Atar et al. |
| 2016/0086387 A1 | 3/2016 | Os et al. |
| 2016/0092035 A1 | 3/2016 | Crocker et al. |
| 2016/0092043 A1 | 3/2016 | Missig et al. |
| 2016/0132200 A1 | 5/2016 | Walkin et al. |
| 2016/0134840 A1 | 5/2016 | Mcculloch |
| 2016/0150215 A1 | 5/2016 | Chen et al. |
| 2016/0163084 A1 | 6/2016 | Corazza et al. |
| 2016/0187995 A1 | 6/2016 | Rosewall |
| 2016/0217601 A1 | 7/2016 | Tsuda et al. |
| 2016/0226926 A1 | 8/2016 | Singh et al. |
| 2016/0227121 A1 | 8/2016 | Matsushita |
| 2016/0247309 A1 | 8/2016 | Li et al. |
| 2016/0259413 A1 | 9/2016 | Anzures et al. |
| 2016/0259497 A1 | 9/2016 | Bauer et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0275724 A1 | 9/2016 | Adeyoola et al. |
| 2016/0284123 A1 | 9/2016 | Hare et al. |
| 2016/0327911 A1 | 11/2016 | Eim et al. |
| 2016/0328875 A1 | 11/2016 | Fang et al. |
| 2016/0357282 A1 | 12/2016 | Block et al. |
| 2016/0370974 A1 | 12/2016 | Stenneth |
| 2017/0018289 A1 | 1/2017 | Morgenstern |
| 2017/0046065 A1 | 2/2017 | Zeng et al. |
| 2017/0061635 A1 | 3/2017 | Petrovich et al. |
| 2017/0082983 A1 | 3/2017 | Katzer et al. |
| 2017/0083086 A1 | 3/2017 | Mazur et al. |
| 2017/0111616 A1 | 4/2017 | Li et al. |
| 2017/0140214 A1 | 5/2017 | Matas et al. |
| 2017/0164888 A1 | 6/2017 | Matsuda et al. |
| 2017/0178287 A1 | 6/2017 | Anderson |
| 2017/0193684 A1 | 7/2017 | Du et al. |
| 2017/0206095 A1 | 7/2017 | Gibbs et al. |
| 2017/0220212 A1 | 8/2017 | Yang et al. |
| 2017/0236298 A1 | 8/2017 | Vetter |
| 2017/0255169 A1 | 9/2017 | Lee et al. |
| 2017/0269715 A1 | 9/2017 | Kim et al. |
| 2017/0285916 A1 | 10/2017 | Xu et al. |
| 2017/0286913 A1 | 10/2017 | Liu et al. |
| 2017/0323266 A1 | 11/2017 | Seo |
| 2017/0336926 A1 | 11/2017 | Chaudhri et al. |
| 2017/0336928 A1 | 11/2017 | Chaudhri et al. |
| 2017/0337554 A1 | 11/2017 | Mokhasi et al. |
| 2018/0004404 A1 | 1/2018 | Delfino et al. |
| 2018/0034867 A1 | 2/2018 | Zahn et al. |
| 2018/0047200 A1 | 2/2018 | O'hara et al. |
| 2018/0059903 A1 | 3/2018 | Lim et al. |
| 2018/0067633 A1 | 3/2018 | Wilson et al. |
| 2018/0074693 A1 | 3/2018 | Jones et al. |
| 2018/0081515 A1 | 3/2018 | Block et al. |
| 2018/0091732 A1 | 3/2018 | Wilson et al. |
| 2018/0095649 A1 | 4/2018 | Valdivia et al. |
| 2018/0114543 A1 | 4/2018 | Novikoff |
| 2018/0121060 A1 | 5/2018 | Jeong et al. |
| 2018/0131878 A1 | 5/2018 | Charlton et al. |
| 2018/0165862 A1 | 6/2018 | Sawaki |
| 2018/0189549 A1 | 7/2018 | Inomata |
| 2018/0191944 A1 | 7/2018 | Carbonell et al. |
| 2018/0246639 A1 | 8/2018 | Han et al. |
| 2018/0268589 A1 | 9/2018 | Grant |
| 2018/0324353 A1 | 11/2018 | Kim et al. |
| 2018/0329587 A1 | 11/2018 | Ko et al. |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2018/0349795 A1 | 12/2018 | Boyle et al. |
| 2019/0050045 A1 | 2/2019 | Jha et al. |
| 2019/0058827 A1 | 2/2019 | Park et al. |
| 2019/0139207 A1 | 5/2019 | Jeong et al. |
| 2019/0158735 A1 | 5/2019 | Wilson et al. |
| 2019/0235748 A1 | 8/2019 | Seol et al. |
| 2019/0266807 A1 | 8/2019 | Lee et al. |
| 2019/0339847 A1 | 11/2019 | Scapel et al. |
| 2019/0342507 A1 | 11/2019 | Dye et al. |
| 2019/0347868 A1 | 11/2019 | Scapel et al. |
| 2020/0045245 A1 | 2/2020 | Van Os et al. |
| 2020/0068095 A1 | 2/2020 | Nabetani |
| 2020/0089302 A1 | 3/2020 | Kim et al. |
| 2020/0226848 A1 | 7/2020 | Van Os et al. |
| 2020/0234481 A1 | 7/2020 | Scapel et al. |
| 2020/0234508 A1 | 7/2020 | Shaburov et al. |
| 2020/0285851 A1 | 9/2020 | Lin et al. |
| 2020/0380768 A1 | 12/2020 | Harris et al. |
| 2020/0380781 A1 | 12/2020 | Barlier et al. |
| 2020/0410763 A1 | 12/2020 | Hare et al. |
| 2020/0412975 A1 | 12/2020 | Al Majid et al. |
| 2021/0005003 A1 | 1/2021 | Chong et al. |
| 2021/0056769 A1 | 2/2021 | Scapel et al. |
| 2021/0058351 A1 | 2/2021 | Viklund et al. |

(56) References Cited

U.S. PATENT DOCUMENTS

| | | |
|---|---|---|
| 2021/0065448 A1 | 3/2021 | Goodrich et al. |
| 2021/0065454 A1 | 3/2021 | Goodrich et al. |
| 2021/0096703 A1 | 4/2021 | Anzures et al. |
| 2021/0099568 A1 | 4/2021 | Depue et al. |
| 2021/0099761 A1 | 4/2021 | Zhang |
| 2021/0152505 A1 | 5/2021 | Baldwin et al. |
| 2021/0168108 A1 | 6/2021 | Antmen et al. |
| 2021/0264656 A1 | 8/2021 | Barlier et al. |
| 2021/0287343 A1 | 9/2021 | Kaida |
| 2021/0335055 A1 | 10/2021 | Scapel et al. |
| 2021/0349426 A1 | 11/2021 | Chen et al. |
| 2021/0349427 A1 | 11/2021 | Chen et al. |
| 2021/0349611 A1 | 11/2021 | Chen et al. |
| 2021/0349612 A1 | 11/2021 | Triverio |
| 2021/0375042 A1 | 12/2021 | Chen et al. |
| 2021/0390753 A1 | 12/2021 | Scapel et al. |
| 2022/0070385 A1 | 3/2022 | Van Os et al. |
| 2023/0004270 A1 | 1/2023 | Chen et al. |
| 2023/0043249 A1 | 2/2023 | Van Os et al. |

FOREIGN PATENT DOCUMENTS

| | | |
|---|---|---|
| AU | 2015297035 B2 | 6/2018 |
| CA | 2356232 A1 | 3/2002 |
| CN | 101055646 A | 10/2007 |
| CN | 101329707 A | 12/2008 |
| CN | 101692681 A | 4/2010 |
| CN | 101742053 A | 6/2010 |
| CN | 102035990 A | 4/2011 |
| CN | 102075727 A | 5/2011 |
| CN | 102142149 A | 8/2011 |
| CN | 102271241 A | 12/2011 |
| CN | 102298797 A | 12/2011 |
| CN | 102622085 A | 8/2012 |
| CN | 102750070 A | 10/2012 |
| CN | 102854979 A | 1/2013 |
| CN | 103516894 A | 1/2014 |
| CN | 103703438 A | 4/2014 |
| CN | 103927190 A | 7/2014 |
| CN | 103947190 A | 7/2014 |
| CN | 104182741 A | 12/2014 |
| CN | 104246793 A | 12/2014 |
| CN | 104270597 A | 1/2015 |
| CN | 104376160 A | 2/2015 |
| CN | 104753762 A | 7/2015 |
| CN | 104952063 A | 9/2015 |
| CN | 105100462 A | 11/2015 |
| CN | 105190700 A | 12/2015 |
| CN | 105391937 A | 3/2016 |
| CN | 105611215 A | 5/2016 |
| CN | 105611275 A | 5/2016 |
| CN | 105653031 A | 6/2016 |
| CN | 106303690 A | 1/2017 |
| CN | 107533356 A | 1/2018 |
| CN | 107924113 A | 4/2018 |
| DK | 201670652 A1 | 12/2017 |
| EP | 0579093 A1 | 1/1994 |
| EP | 1215867 A2 | 6/2002 |
| EP | 1429291 A1 | 6/2004 |
| EP | 1592212 A1 | 11/2005 |
| EP | 1736931 A2 | 12/2006 |
| EP | 2416563 A2 | 2/2012 |
| EP | 2990887 A2 | 3/2016 |
| EP | 3026636 A1 | 6/2016 |
| EP | 3047884 A1 | 7/2016 |
| EP | 3051525 A1 | 8/2016 |
| EP | 3101958 A1 | 12/2016 |
| EP | 3190563 A1 | 7/2017 |
| EP | 3211587 A1 | 8/2017 |
| EP | 2556665 B1 | 8/2018 |
| JP | 53-31170 A | 3/1978 |
| JP | 56-621 A | 1/1981 |
| JP | 3007616 U | 2/1995 |
| JP | 9-9072 A | 1/1997 |
| JP | 10-506472 A | 6/1998 |
| JP | 11-109066 A | 4/1999 |
| JP | 2000-76460 A | 3/2000 |
| JP | 2000-162349 A | 6/2000 |
| JP | 2001-144884 A | 5/2001 |
| JP | 2001-273064 A | 10/2001 |
| JP | 2001-313886 A | 11/2001 |
| JP | 2002-251238 A | 9/2002 |
| JP | 2003-9404 A | 1/2003 |
| JP | 2003-219217 A | 7/2003 |
| JP | 2003-233616 A | 8/2003 |
| JP | 2004-28918 A | 1/2004 |
| JP | 2004-184396 A | 7/2004 |
| JP | 2005-521890 A | 7/2005 |
| JP | 2006-520053 A | 8/2006 |
| JP | 2007-528240 A | 10/2007 |
| JP | 2011-517810 A | 6/2011 |
| JP | 2011-525648 A | 9/2011 |
| JP | 2011-209887 A | 10/2011 |
| JP | 2012-38292 A | 2/2012 |
| JP | 2013-3671 A | 1/2013 |
| JP | 2013-92289 A | 5/2013 |
| JP | 2013-97760 A | 5/2013 |
| JP | 2013-101528 A | 5/2013 |
| JP | 2013-232230 A | 11/2013 |
| JP | 2014-206817 A | 10/2014 |
| JP | 2016-136324 A | 7/2016 |
| JP | 2017-527917 A | 9/2017 |
| JP | 2017-531225 A | 10/2017 |
| JP | 6240301 B1 | 11/2017 |
| JP | 6266736 B1 | 1/2018 |
| JP | 2018-514838 A | 6/2018 |
| JP | 2018-106365 A | 7/2018 |
| JP | 2018-116067 A | 7/2018 |
| JP | 2019-145108 A | 8/2019 |
| KR | 10-2004-0046272 A | 6/2004 |
| KR | 10-2004-0107489 A | 12/2004 |
| KR | 10-2005-0086630 A | 8/2005 |
| KR | 10-2008-0050336 A | 6/2008 |
| KR | 10-2010-0086052 A | 7/2010 |
| KR | 10-2011-0028581 A | 3/2011 |
| KR | 10-2012-0132134 A | 12/2012 |
| KR | 10-2014-0033088 A | 3/2014 |
| KR | 10-2014-0049340 A | 4/2014 |
| KR | 10-2015-0008996 A | 1/2015 |
| KR | 10-2015-0024899 A | 3/2015 |
| KR | 10-2015-0067197 A | 6/2015 |
| KR | 10-1540544 B1 | 7/2015 |
| KR | 10-1587115 B1 | 1/2016 |
| KR | 10-2016-0016910 A | 2/2016 |
| KR | 10-2016-0047891 A | 5/2016 |
| KR | 10-2016-0063058 A | 6/2016 |
| KR | 10-2017-0081391 A | 7/2017 |
| KR | 10-2017-0117306 A | 10/2017 |
| KR | 10-2018-0017227 A | 2/2018 |
| KR | 10-1875907 B1 | 7/2018 |
| KR | 10-2019-0114034 A | 10/2019 |
| KR | 10-2338576 B1 | 12/2021 |
| WO | 98/40795 A1 | 9/1998 |
| WO | 03/085460 A2 | 10/2003 |
| WO | 2007/120981 A2 | 10/2007 |
| WO | 2009/073607 A2 | 6/2009 |
| WO | 2009/114239 A1 | 9/2009 |
| WO | 2009/133710 A1 | 11/2009 |
| WO | 2011/127309 A1 | 10/2011 |
| WO | 2012/170354 A2 | 12/2012 |
| WO | 2013/082325 A1 | 6/2013 |
| WO | 2013/120851 A1 | 8/2013 |
| WO | 2013/152453 A1 | 10/2013 |
| WO | 2013/152454 A1 | 10/2013 |
| WO | 2013/152455 A1 | 10/2013 |
| WO | 2013/189058 A1 | 12/2013 |
| WO | 2014/053063 A1 | 4/2014 |
| WO | 2014/094199 A1 | 6/2014 |
| WO | 2014/200734 A1 | 12/2014 |
| WO | 2015/034960 A1 | 3/2015 |
| WO | 2015/144209 A1 | 10/2015 |
| WO | 2016/022203 A1 | 2/2016 |
| WO | 2016/022204 A1 | 2/2016 |
| WO | 2016/022205 A1 | 2/2016 |

(56) References Cited

FOREIGN PATENT DOCUMENTS

| | | |
|---|---|---|
| WO | 2016/036218 A1 | 3/2016 |
| WO | 2016/042926 A1 | 3/2016 |
| WO | 2016/045005 A1 | 3/2016 |
| WO | 2016/057062 A1 | 4/2016 |
| WO | 2016/064435 A1 | 4/2016 |
| WO | 2016/101124 A1 | 6/2016 |
| WO | 2016/101131 A1 | 6/2016 |
| WO | 2016/101132 A1 | 6/2016 |
| WO | 2016/144385 A1 | 9/2016 |
| WO | 2016/145129 A1 | 9/2016 |
| WO | 2016/161556 A1 | 10/2016 |
| WO | 2017/153771 A1 | 9/2017 |
| WO | 2017/201326 A1 | 11/2017 |
| WO | 2017/218193 A1 | 12/2017 |
| WO | 2018/006053 A1 | 1/2018 |
| WO | 2018/049430 A2 | 3/2018 |
| WO | 2018/057272 A1 | 3/2018 |
| WO | 2018/212802 A1 | 11/2018 |
| WO | 2019/216997 A1 | 11/2019 |
| WO | 2019/216999 A1 | 11/2019 |
| WO | 2021/050190 A1 | 3/2021 |

OTHER PUBLICATIONS

101692681, CN, A, Cited by Chinese Patent Office in an Office Action for related Patent Application No. 201910691865.X dated Jul. 8, 2020.
102075727, CN, A, Cited by Chinese Patent Office in an Office Action for related Patent Application No. 201910692978.1 dated Apr. 3, 2020.
102142149, CN, A, Cited by Chinese Patent Office in an Office Action for related Patent Application No. 201910691865.X dated Jul. 8, 2020.
102750070, CN, A, Cited by Australian Patent Office in an Office Action for related Patent Application No. 2020239749 dated Jul. 16, 2021.
103927190, CN, A, Cited by European Patent Office in an Office Action for related Patent Application No. 19212057.4 dated Feb. 27, 2020.
104182741, CN, A, Cited by Chinese Patent Office in an Office Action for related Patent Application No. 201910315328.5 dated Nov. 30, 2021.
104753762, CN, A, Cited by Chinese Patent Office in an Office Action for related Patent Application No. 201910691865.X dated Jul. 8, 2020.
105611215, CN, A, Cited by Chinese Patent Office in an Office Action for related Patent Application No. 201910692978.1 dated Apr. 3, 2020.
105653031, CN, A, Cited by Chinese Patent Office in an Office Action for related Patent Application No. 201911202668.3 dated Aug. 4, 2020.
106303690, CN, A, Cited by U.S. Patent Office in an Office Action for related U.S. Appl. No. 16/599,433 dated Jan. 28, 2021.
0579093, EP, A1, Cited by Danish Patent Office in an Office Action for related Patent Application No. PA202070623 dated Dec. 21, 2020.
53-31170, JP, A, Cited by Japanese Patent Office in an Office Action for related Patent Application No. 2020-159823 dated Dec. 23, 2021.
56-621, JP, A, Cited by Japanese Patent Office in an Office Action for related Patent Application No. 2020-159823 dated Dec. 23, 2021.
3007616, JP, U, Cited by Japanese Patent Office in an Office Action for related Patent Application No. 2020-159823 dated Dec. 23, 2021.
11-109066, JP, A, Cited by Japanese Patent Office in an Office Action for related Patent Application No. 2020-159824 dated Dec. 17, 2021.

2000-76460, JP, A, Cited by Japanese Patent Office in an Office Action for related Patent Application No. 2021-092483 dated Apr. 1, 2022.
2001-273064, JP, A, Cited by Japanese Patent Office in an Office Action for related Patent Application No. 2020-159824 dated Dec. 17, 2021.
2002-251238, JP, A, Cited by Japanese Patent Office in an Office Action for related Patent Application No. 2020-159824 dated Dec. 17, 2021.
2003-219217, JP, A, Cited by Japanese Patent Office in an Office Action for related Patent Application No. 2021-092483 dated Apr. 1, 2022.
2003-233616, JP, A, Cited by Japanese Patent Office in an Office Action for related Patent Application No. 2020-159824 dated Dec. 17, 2021.
2004-28918, JP, A, Cited by Japanese Patent Office in an Office Action for related Patent Application No. 2020-159825 dated Dec. 10, 2021.
2006-520053, JP, A, Cited by Japanese Patent Office in an Office Action for related Patent Application No. 2020-120086 dated Nov. 20, 2020.
2007-528240, JP, A, Cited by Japanese Patent Office in an Office Action for related Patent Application No. 2020-120086 dated Nov. 20, 2020.
2012-38292, JP, A, Cited by Japanese Patent Office in an Office Action for related Patent Application No. 2018-184254 dated Mar. 2, 2020..
2013-3671, JP, A, Cited by Japanese Patent Office in an Office Action for related Patent Application No. 2020-159825 dated Dec. 10, 2021.
2013-92989, JP, A, Cited by Japanese Patent Office in an Office Action for related Patent Application No. 2020-159825 dated Dec. 10, 2021.
2013-97760, JP, A, Cited by Japanese Patent Office in an Office Action for related Patent Application No. 2021-092483 dated Apr. 1, 2022.
2013-232230, JP, A, Cited by Japanese Patent Office in an Office Action for related Patent Application No. 2020-159824 dated Dec. 17, 2021.
2014-206817, JP, A, Cited by Japanese Patent Office in an Office Action for related Patent Application No. 2020-120086 dated Nov. 20, 2020.
2016-136324, JP, A, Cited by Japanese Patent Office in an Office Action for related Patent Application No. 2019-511767 dated Mar. 30, 2020.
2017-527917, JP, A, Cited by Japanese Patent Office in an Office Action for related Patent Application No. 2019-215503 dated Aug. 20, 2021.
2018-116067, JP, A, Cited by WIPO in an Office Action for related PCT Patent Application No. PCT/US2021/031212 dated Jul. 28, 2021.
2019-145108, JP, A, Cited by Japanese Patent Office in an Office Action for related Patent Application No. 2020-193703 dated Apr. 19, 2021.
10-2005-0086630, KR, A, Cited by Korean Patent Office in an Office Action for related Patent Application No. 10-2022-7002829 dated Feb. 12, 2022.
10-2015-0024899, KR, A, Cited by Australian Patent Office in an Office Action for related Patent Application No. 2019100794 dated Oct. 3, 2019.
[B612] Addition of facial recognition bear/cat stamps and AR background function having moving sparkles or hearts, Available Online at: <URL, htpps://apptopi.jp/2017/01/22/b612>, Jan. 22, 2017, 11 pages, Cited by Japanese Patent Office in an Office Action for related Patent Application No. 2018-182607 dated Apr. 6, 2020.
APPLIVGAMES, "Super Mario Run" Stickers for iMessage: Free Delivery Started!, Available online at: <https://games.app-liv.jp/archives/178627>, Sep. 13, 2016, 3 pages, Cited by Japanese Patent Office in an Office Action for related Patent Application No. 2019-215503 dated Feb. 5, 2021.
Contents Pocket, "Line Stamp Information", Available online at:<https://web.archive.org/web/20150404080541/http://contents-pocket.net/linestamp.html>, Apr. 2015, 2 pages, Cited by Japanese Patent

(56) References Cited

OTHER PUBLICATIONS

Office in an Office Action for related Patent Application No. 2019-215503 dated Feb. 5, 2021.
ENTERBRAIN, "No. 5 Create your own Avatar MII Studio", vol. 26, No. 11, p. 138, Feb. 24, 2011, 4 pages, Cited by Japanese Patent Office in an Office Action for related Patent Application No. 2018-184254 dated Mar. 2, 2020.
ILOVEX, "Stripe Generator", a tool that makes it easy to create striped materials, Online available at: https://www.ilovex.co.jp/blog/system/webconsulting/stripe-generator.html, May 2, 2012, 3 pages, Cited by Japanese Patent Office in an Office Action for related Patent Application No. 2020-159825 dated Dec. 10, 2021.
Kyoko Makino, "How to Make a Lookalike Face Icon for Your Friend", ASCII,Japan Weekly, ASCII Media Works Inc., vol. 24, pp. 90-93, Jul. 17, 2014, 7 pages, Cited by Japanese Patent Office in an Office Action for related Patent Application No. 2018-184254 dated Mar. 2, 2020.
Mitsuru Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages, Cited by Japanese Patent Office in an Office Action for related Patent Application No. 2018-184254 dated Mar. 2, 2020.
Tsuchihashi et al., "Generation of Caricatures by Automatic Selection of Templates for Shapes and Placement of Facial Parts", Technical Report of the Institute of Image Information and Television Engineers, Japan, The Institute of Image Information and Television Engineers, vol. 33, No. 11, pp. 77-80., Feb. 8, 2009, 7 pages, Cited by Japanese Patent Office in an Office Action for related Patent Application No. 2018-184254 dated Mar. 2, 2020.
Zy News, "Generate Cartoon Face within Three Seconds, you are the New-generation Expression Emperor", Online available at: <http://inews.ifeng.com/48551936/news.shtml>, Apr. 22, 2016, 3 pages, Cited by Chinese Patent Office in an Office Action for related Patent Application No. 201911199054.4 dated Jan. 20, 2021.
[B612] Addition of facial recognition bear/cat stamps and AR background function having moving sparkles or hearts, Available Online at: <URL, htpps://apptopi.jp/2017/01/22/b612>, Jan. 22, 2017, 11 pages See Communication Under 37 CFR § 1.98(a) (3).
Advisory Action received for U.S. Appl. No. 13/082,035, dated Jun. 19, 2015, 5 pages.
Advisory Action received for U.S. Appl. No. 13/082,035, dated Oct. 23, 2013, 3 pages.
Advisory Action received for U.S. Appl. No. 16/259,771, dated Feb. 26, 2020, 3 pages.
Advisory Action received for U.S. Appl. No. 16/259,771, dated Jul. 14, 2020, 6 pages.
Ali et al., "Facial Expression Recognition Using Human to Animated-Character Expression Translation", Oct. 12, 2019, 8 pages.
Applicant Initiated Interview Summary received for U.S. Appl. No. 16/259,771, dated May 5, 2020, 10 pages.
Applicant Initiated Interview Summary received for U.S. Appl. No. 17/031,671, dated Aug. 2, 2021, 5 pages.
Applicant Initiated Interview Summary received for U.S. Appl. No. 17/031,671, dated Nov. 8, 2021, 5 pages.
Applicant-Initiated Interview Summary received for U.S. Appl. No. 13/082,035, dated Apr. 4, 2013, 3 pages.
Applicant-Initiated Interview Summary received for U.S. Appl. No. 13/082,035, dated Aug. 1, 2016, 3 pages.
Applicant-Initiated Interview Summary received for U.S. Appl. No. 13/082,035, dated Jan. 29, 2015, 3 pages.
Applicant-Initiated Interview Summary received for U.S. Appl. No. 13/082,035, dated Oct. 30, 2013, 3 pages.
Applicant-Initiated Interview Summary received for U.S. Appl. No. 14/866,560, dated Jan. 30, 2019, 3 pages.
Applicant-Initiated Interview Summary received for U.S. Appl. No. 14/866,560, dated Jul. 26, 2018, 3 pages.
Applicant-Initiated Interview Summary received for U.S. Appl. No. 14/866,560, dated May 14, 2019, 4 pages.
Applicant-Initiated Interview Summary received for U.S. Appl. No. 14/866,560, dated Oct. 21, 2019, 3 pages.
Applicant-Initiated Interview Summary received for U.S. Appl. No. 16/259,771, dated Apr. 18, 2022, 2 pages.
Applicant-Initiated Interview Summary received for U.S. Appl. No. 16/519,850, dated Jun. 26, 2020, 4 pages.
Applicant-Initiated Interview Summary received for U.S. Appl. No. 16/599,433, dated Apr. 20, 2021, 7 pages.
Applicant-Initiated Interview Summary received for U.S. Appl. No. 16/663,062, dated Dec. 18, 2020, 3 pages.
Applicant-Initiated Interview Summary received for U.S. Appl. No. 16/833,436, dated Jan. 27, 2022, 2 pages.
Applicant-Initiated Interview Summary received for U.S. Appl. No. 16/833,436, dated Jul. 1, 2021, 2 pages.
Applicant-Initiated Interview Summary received for U.S. Appl. No. 17/031,654, dated Feb. 1, 2021, 2 pages.
Applicant-Initiated Interview Summary received for U.S. Appl. No. 17/031,765, dated Dec. 15, 2021, 4 pages.
Applicant-Initiated Interview Summary received for U.S. Appl. No. 17/031,765, dated Sep. 22, 2021, 5 pages.
Applicant-Initiated Interview Summary received for U.S. Appl. No. 17/093,408, dated Mar. 1, 2022, 3 pages.
Applicant-Initiated Interview Summary received for U.S. Appl. No. 17/373,163, dated Apr. 11, 2022, 2 pages.
APPLIVGAMES, "Super Mario Run" Stickers for iMessage: Free Delivery Started!, Available online at: <https://games.app-liv.jp/archives/178627>, Sep. 13, 2016, 3 pages See Communication Under 37 CFR § 1.98(a) (3).
Brief Communication Regarding Oral Proceedings received for European Patent Application No. 19172407.9, mailed on Nov. 9, 2020, 1 page.
Brief Communication Regarding Oral Proceedings received for European Patent Application No. 19172407.9, mailed on Nov. 20, 2020, 2 pages.
Carretero et al., "Preserving Avatar Genuineness in Different Display Media", Mobile Networks and Applications, Kluwer Academic Publishers, BO, vol. 13, No. 6, Jul. 15, 2008, pp. 627-634.
Certificate of Examination received for Australian Patent Application No. 2019100420, dated Jul. 3, 2019, 2 pages.
Certificate of Examination received for Australian Patent Application No. 2019100497, dated Jul. 29, 2019, 2 pages.
Certificate of Examination received for Australian Patent Application No. 2019100794, dated Dec. 19, 2019, 2 pages.
Certificate of Examination received for Australian Patent Application No. 2019101019, dated Nov. 12, 2019, 2 pages.
Certificate of Examination received for Australian Patent Application No. 2019101667, dated Mar. 20, 2020, 2 pages.
Certificate of Examination received for Australian Patent Application No. 2020100189, dated May 12, 2020, 2 pages.
Certificate of Examination received for Australian Patent Application No. 2020100675, dated Jun. 30, 2020, 2 pages.
Certificate of Examination received for Australian Patent Application No. 2020101043, dated Dec. 22, 2020, 2 pages.
Certificate of Examination received for Australian Patent Application No. 2020101715, dated Oct. 6, 2020, 2 pages.
Contents Pocket, "Line Stamp Information", Available online at:<https://web.archive.org/web/20150404080541/http://contents-pocket.net/linestamp.html>, Apr. 2015, 2 pages See Communication Under 37 CFR § 1.98(a) (3).
Corrected Notice of Allowance received for U.S. Appl. No. 15/713,490, dated May 1, 2019, 2 pages.
Corrected Notice of Allowance received for U.S. Appl. No. 16/142,288, dated Jul. 30, 2019, 5 pages.
Corrected Notice of Allowance received for U.S. Appl. No. 16/143,097, dated Nov. 8, 2019, 3 pages.
Corrected Notice of Allowance received for U.S. Appl. No. 16/519,850, dated Nov. 2, 2020, 5 pages.
Corrected Notice of Allowance received for U.S. Appl. No. 16/519,850, dated Sep. 8, 2020, 5 pages.
Corrected Notice of Allowance received for U.S. Appl. No. 16/599,433, dated Aug. 13, 2021, 5 pages.
Corrected Notice of Allowance received for U.S. Appl. No. 16/599,433, dated Oct. 14, 2021, 3 pages.

(56) References Cited

OTHER PUBLICATIONS

Corrected Notice of Allowance received for U.S. Appl. No. 16/663,062, dated Apr. 14, 2021, 2 pages.
Corrected Notice of Allowance received for U.S. Appl. No. 16/663,062, dated Jul. 21, 2021, 2 pages.
Corrected Notice of Allowance received for U.S. Appl. No. 17/091,460, dated Feb. 16, 2022, 6 pages.
Corrected Notice of Allowance received for U.S. Appl. No. 17/091,460, dated Feb. 25, 2022, 6 pages.
Decision on Appeal received for U.S. Appl. No. 16/259,771, mailed on Aug. 19, 2021, 12 pages.
Decision to Grant received for Danish Patent Application No. PA201870372, dated Jun. 17, 2020, 2 pages.
Decision to Grant received for Danish Patent Application No. PA201870375, dated Jul. 24, 2019, 2 pages.
Decision to Grant received for Danish Patent Application No. PA201870377, dated May 14, 2019, 2 pages.
Decision to Grant received for European Patent Application No. 19172407.9, dated Jun. 17, 2021, pages.
Decision to Grant received for European Patent Application No. 20168021.2, dated Feb. 3, 2022, 2 pages.
Decision to Grant received for Japanese Patent Application No. 2018-182607, dated Apr. 13, 2022, 3 pages (1 page of English Translation).
Decision to Grant received for Japanese Patent Application No. 2020-193703, dated Aug. 10, 2021, 3 pages (1 page of English Translation).
Decision to Refuse received for European Patent Application No. 19204230.7, dated Feb. 4, 2022, 15 pages.
Decision to Refuse received for European Patent Application No. 19724959.2, dated Jun. 22, 2021, 13 pages.
Enterbrain, "No. 5 Create your own Avatar MII Studio", vol. 26, No. 11, p. 138, Feb. 24, 2011, 4 pages See Communication Under 37 CFR § 1.98(a) (3).
European Search Report received for European Patent Application No. 19172407.9, dated Oct. 9, 2019, 4 pages.
European Search Report received for European Patent Application No. 19181242.9, dated Nov. 27, 2019, 4 pages.
European Search Report received for European Patent Application No. 20168021.2, dated Jul. 8, 2020, 4 pages.
Examiner's Answer to Appeal Brief received for U.S. Appl. No. 16/259,771, mailed on Oct. 23, 2020, 15 pages.
Examiner's Pre-Review Report received for Japanese Patent Application No. 2019-215503, dated Aug. 20, 2021, 15 pages (8 pages of English Translation).
Extended European Search Report received for European Patent Application No. 17853657.9, dated May 28, 2020, 9 pages.
Extended European Search Report received for European Patent Application No. 19204230.7, dated Feb. 21, 2020, 7 pages.
Extended European Search Report received for European Patent Application No. 19212057.4, dated Feb. 27, 2020, 8 pages.
Fedko Daria, "AR Hair Styles", Online Available at <https://www.youtube.com/watch?v=FrS6tHRbFE0>, Jan. 24, 2017, 2 pages.
Final Office Action received for U.S. Appl. No. 13/082,035, dated Apr. 16, 2015, 24 pages.
Final Office Action received for U.S. Appl. No. 13/082,035, dated Aug. 15, 2013, 24 pages.
Final Office Action received for U.S. Appl. No. 14/866,560, dated Oct. 9, 2018, 22 pages.
Final Office Action received for U.S. Appl. No. 16/116,221, dated Mar. 22, 2019, 35 pages.
Final Office Action received for U.S. Appl. No. 16/259,771, dated Nov. 18, 2019, 13 pages.
Final Office Action received for U.S. Appl. No. 16/833,436, dated Sep. 21, 2021, 29 pages.
Final Office Action received for U.S. Appl. No. 17/031,671, dated Sep. 7, 2021, 27 pages.
Final Office Action received for U.S. Appl. No. 17/031,765, dated Oct. 29, 2021, 34 pages.

Flatlinevertigo, "Black Desert Online: Intro to Hair Customization", Online Available at: <https://www.youtube.com/watch?v=9MCbfd_eMEg>, Sep. 9, 2015, 3 pages.
Gao et al., "Automatic Unpaired Shape Deformation Transfer", ACM Transactions on Graphics, Online available at: https://doi.org/10.1145/3272127.3275028, 2018, 11 pages.
Here are Warez Files: Eve Online Character Creator, Online Available at: <http://theherearewarezfiles.blogspot.com/2014/03/eve-online-character-creator-download.html>, Mar. 3, 2014, 7 pages.
ILOVEX, "Stripe Generator", a tool that makes it easy to create striped materials, Online available at: https://www.ilovex.co.jp/blog/system/webconsulting/stripe-generator.html, May 2, 2012, 3 pages See Communication Under 37 CFR § 1.98(a) (3).
Intention to Grant received for Danish Patent Application No. PA201870372, dated Feb. 13, 2020, 2 pages.
Intention to Grant received for Danish Patent Application No. PA201870375, dated Jun. 3, 2019, 2 pages.
Intention to Grant received for Danish Patent Application No. PA201870375, dated Mar. 26, 2019, 2 pages.
Intention to Grant received for Danish Patent Application No. PA201870377, dated Mar. 26, 2019, 2 pages.
Intention to Grant received for European Patent Application No. 19172407.9, dated Feb. 11, 2021, 9 pages.
Intention to Grant received for European Patent Application No. 19181242.9, dated Oct. 28, 2021, 16 pages.
Intention to Grant received for European Patent Application No. 20168021.2, dated Apr. 15, 2021, 8 pages.
Intention to Grant received for European Patent Application No. 20168021.2, dated Sep. 20, 2021, 8 pages.
International Preliminary Report on Patentability received for PCT Patent Application No. PCT/US2011/031616, dated Oct. 18, 2012, 6 pages.
International Preliminary Report on Patentability received for PCT Patent Application No. PCT/US2017/049795, dated Apr. 4, 2019, 16 pages.
International Preliminary Report on Patentability received for PCT Patent Application No. PCT/US2019/023793, dated Nov. 19, 2020, 12 pages.
International Preliminary Report on Patentability received for PCT Patent Application No. PCT/US2019/024067, dated Nov. 19, 2020, 12 pages.
International Preliminary Report on Patentability received for PCT Patent Application No. PCT/US2020/014176, dated Jul. 29, 2021, 9 pages.
International Search Report and Written Opinion received for PCT Application No. PCT/US2017/049795, dated Dec. 27, 2017, 26 pages.
International Search Report and Written Opinion received for PCT Patent Application No. PCT/US2011/031616, dated Aug. 30, 2011, 8 pages.
International Search Report and Written Opinion received for PCT Patent Application No. PCT/US2019/023793, dated Aug. 27, 2019, 17 pages.
International Search Report and Written Opinion received for PCT Patent Application No. PCT/US2019/024067, dated Oct. 9, 2019, 18 pages.
International Search Report and Written Opinion received for PCT Patent Application No. PCT/US2020/014176, dated Mar. 26, 2020, 12 pages.
International Search Report and Written Opinion received for PCT Patent Application No. PCT/US2021/031096, dated Oct. 13, 2021, 16 pages.
International Search Report and Written Opinion received for PCT Patent Application No. PCT/US2021/031212, dated Sep. 21, 2021, 21 pages.
Invitation to Pay Additional Fees received for PCT Patent Application No. PCT/US2017/049795, dated Nov. 3, 2017, 3 pages.
Invitation to Pay Additional Fees received for PCT Patent Application No. PCT/US2019/023793, dated Jul. 5, 2019, 11 pages.
Invitation to Pay Additional Fees received for PCT Patent Application No. PCT/US2019/024067, dated Jul. 16, 2019, 13 pages.
Invitation to Pay Additional Fees received for PCT Patent Application No. PCT/US2021/031096, dated Aug. 19, 2021, 8 pages.

(56) References Cited

OTHER PUBLICATIONS

Invitation to Pay Additional Fees received for PCT Patent Application No. PCT/US2021/031212, dated Jul. 28, 2021, 19 pages.
Invitation to Pay Search Fees received for European Patent Application No. 19724959.2, dated Feb. 25, 2020, 3 pages.
Koti Kotresh, "Colour with Asian Paints.A Mobail App by Android Application—2018", Available Online at <https://www.youtube.com/watch?v=M6EIO7ErYd0&feature=youtu.be&t=81>, May 6, 2018, 2 pages.
Kozak Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Kyoko Makino, "How to Make a Lookalike Face Icon for Your Friend", ASCII,Japan Weekly, ASCII Media Works Inc., vol. 24, pp. 90-93, Jul. 17, 2014, 7 pages See Communication Under 37 CFR § 1.98(a) (3).
Lang Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Minutes of the Oral Proceedings received for European Patent Application No. 19181242.9, mailed on Dec. 15, 2020, 6 pages.
Minutes of the Oral Proceedings received for European Patent Application No. 19204230.7, mailed on Feb. 2, 2022, 9 pages.
Minutes of the Oral Proceedings received for European Patent Application No. 19724959.2, mailed on Jun. 14, 2021, 6 pages.
Mitsuru Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages See Communication Under 37 CFR § 1.98(a) (3).
Neurotechnology,"Sentimask SDK", Available at: https://www.neurotechnology.com/sentimask.html, Apr. 22, 2018, 5 pages.
Noh et al., "Expression Cloning", Proceedings of the 28th annual conference on Computer Graphics and Interactive Techniques, ACM SIGGRAPH, Los Angeles, CA, USA, Aug. 12-17, 2001, 12 pages.
Non-Final Office Action received for U.S. Appl. No. 13/082,035, dated Apr. 21, 2016, 25 pages.
Non-Final Office Action received for U.S. Appl. No. 13/082,035, dated Dec. 19, 2012, 19 pages.
Non-Final Office Action received for U.S. Appl. No. 13/082,035, dated Sep. 11, 2014, 23 pages.
Non-Final Office Action received for U.S. Appl. No. 14/866,560, dated Apr. 19, 2018, 10 pages.
Non-Final Office Action received for U.S. Appl. No. 14/866,560, dated Apr. 30, 2019, 23 pages.
Non-Final Office Action received for U.S. Appl. No. 16/116,221, dated Nov. 13, 2018, 27 pages.
Non-Final Office Action received for U.S. Appl. No. 16/142,288, dated Nov. 20, 2018, 15 pages.
Non-Final Office Action received for U.S. Appl. No. 16/142,305, dated Nov. 23, 2018, 32 pages.
Non-Final Office Action received for U.S. Appl. No. 16/142,328, dated Nov. 8, 2018, 18 pages.
Non-Final Office Action received for U.S. Appl. No. 16/143,097, dated Feb. 28, 2019, 17 pages.
Non-Final Office Action received for U.S. Appl. No. 16/259,771, dated Jan. 25, 2022, 20 pages.
Non-Final Office Action received for U.S. Appl. No. 16/259,771, dated May 8, 2019, 11 pages.
Non-Final Office Action received for U.S. Appl. No. 16/519,850, dated Mar. 23, 2020, 8 pages.
Non-Final Office Action received for U.S. Appl. No. 16/599,433, dated Jan. 28, 2021, 16 pages.
Non-Final Office Action received for U.S. Appl. No. 16/663,062, dated Oct. 28, 2020, 14 pages.
Non-Final Office Action received for U.S. Appl. No. 16/833,436, dated Mar. 29, 2021, 27 pages.
Non-Final Office Action received for U.S. Appl. No. 17/031,654, dated Nov. 19, 2020, 12 pages.
Non-Final Office Action received for U.S. Appl. No. 17/031,671, dated Apr. 1, 2022, 32 pages.
Non-Final Office Action received for U.S. Appl. No. 17/031,671, dated Apr. 30, 2021, 27 pages.
Non-Final Office Action received for U.S. Appl. No. 17/031,765, dated Jun. 28, 2021, 32 pages.
Non-Final Office Action received for U.S. Appl. No. 17/031,765, dated Mar. 29, 2022, 33 pages.
Non-Final Office Action received for U.S. Appl. No. 17/091,460, dated Sep. 10, 2021, 10 pages.
Non-Final Office Action received for U.S. Appl. No. 17/093,408, dated Dec. 8, 2021, 37 pages.
Non-Final Office Action received for U.S. Appl. No. 17/373,163, dated Jan. 27, 2022, 14 pages.
Notice of Acceptance received for Australian Patent Application No. 2017330212, dated Apr. 28, 2020, 3 pages.
Notice of Acceptance received for Australian Patent Application No. 2019265357, dated Dec. 24, 2020, 3 pages.
Notice of Acceptance received for Australian Patent Application No. 2019266049, dated Nov. 24, 2020, 3 pages.
Notice of Acceptance received for Australian Patent Application No. 2020213402, dated Sep. 21, 2020, 3 pages.
Notice of Acceptance received for Australian Patent Application No. 2020294208, dated Mar. 2, 2022, 3 pages.
Notice of Allowance received for Chinese Patent Application No. 201910379481.4, dated Nov. 9, 2020, 6 pages (3 pages of English Translation and 3 pages of Official Copy).
Notice of Allowance received for Chinese Patent Application No. 201910692978.1, dated Feb. 4, 2021, 6 pages (3 pages of English Translation and 3 pages of Official Copy).
Notice of Allowance received for Chinese Patent Application No. 201911202668.3, dated Feb. 4, 2021, 5 pages (2 pages of English Translation and 3 pages of Official Copy).
Notice of Allowance received for Chinese Patent Application No. 201911219525.3, dated Sep. 29, 2020, 2 pages (1 page of English Translation and 1 page of Official Copy).
Notice of Allowance received for Japanese Patent Application No. 2018-184254, dated Jun. 15, 2020, 5 pages (2 pages of English Translation and 3 pages of Official Copy).
Notice of Allowance received for Japanese Patent Application No. 2019-511767, dated Mar. 30, 2020, 4 pages (1 page of English Translation and 3 pages of Official Copy).
Notice of Allowance received for Japanese Patent Application No. 2020-120086, dated Nov. 15, 2021, 5 pages (2 pages of English Translation and 3 pages of Official Copy).
Notice of Allowance received for Japanese Patent Application No. 2020-159825, dated Mar. 25, 2022, 5 pages (1 page of English Translation and 4 pages of Official Copy).
Notice of Allowance received for Korean Patent Application No. 10-2019-7005369, dated Oct. 26, 2020, 4 pages (1 page of English Translation and 3 pages of Official Copy).
Notice of Allowance received for Korean Patent Application No. 10-2020-7031855, dated Mar. 22, 2021, 5 pages (1 page of English Translation and 4 pages of Official Copy).
Notice of Allowance received for Korean Patent Application No. 10-2020-7032147, dated May 12, 2021 5 pages (2 pages of English Translation and 3 pages of Official Copy).
Notice of Allowance received for Korean Patent Application No. 10-2021-7019525, dated Jul. 13, 2021 5 pages (1 page of English Translation and 4 pages of Official Copy).
Notice of Allowance received for Korean Patent Application No. 10-2021-7023617, dated Dec. 21, 2021, 6 pages (2 pages of English Translation and 4 pages of Official Copy).
Notice of Allowance received for Korean Patent Application No. 10-2022-7002829, dated Feb. 12, 2022, 6 pages (1 page of English Translation and 5 pages of Official Copy).
Notice of Allowance received for U.S. Appl. No. 13/082,035, dated Oct. 5, 2016, 9 pages.

(56) References Cited

OTHER PUBLICATIONS

Notice of Allowance received for U.S. Appl. No. 14/866,560, dated Nov. 15, 2019, 9 pages.
Notice of Allowance received for U.S. Appl. No. 15/713,490, dated Mar. 20, 2019, 15 pages.
Notice of Allowance received for U.S. Appl. No. 16/110,514, dated Apr. 29, 2019, 9 pages.
Notice of Allowance received for U.S. Appl. No. 16/110,514, dated Mar. 13, 2019, 11 pages.
Notice of Allowance received for U.S. Appl. No. 16/116,221, dated Nov. 22, 2019, 13 pages.
Notice of Allowance received for U.S. Appl. No. 16/116,221, dated Sep. 20, 2019, 13 pages.
Notice of Allowance received for U.S. Appl. No. 16/142,288, dated Jun. 24, 2019, 10 pages.
Notice of Allowance received for U.S. Appl. No. 16/142,288, dated Mar. 27, 2019, 9 pages.
Notice of Allowance received for U.S. Appl. No. 16/142,288, dated May 1, 2019, 4 pages.
Notice of Allowance received for U.S. Appl. No. 16/142,305, dated Apr. 3, 2019, 5 pages.
Notice of Allowance received for U.S. Appl. No. 16/142,305, dated May 1, 2019, 2 pages.
Notice of Allowance received for U.S. Appl. No. 16/142,328, dated Apr. 5, 2019, 7 pages.
Notice of Allowance received for U.S. Appl. No. 16/143,097, dated Aug. 29, 2019, 23 pages.
Notice of Allowance received for U.S. Appl. No. 16/143,201, dated Feb. 8, 2019, 9 pages.
Notice of Allowance received for U.S. Appl. No. 16/143,201, dated Nov. 28, 2018, 14 pages.
Notice of Allowance received for U.S. Appl. No. 16/519,850, dated Aug. 26, 2020, 8 pages.
Notice of Allowance received for U.S. Appl. No. 16/599,433, dated May 14, 2021, 11 pages.
Notice of Allowance received for U.S. Appl. No. 16/599,433, dated Oct. 4, 2021, 13 pages.
Notice of Allowance received for U.S. Appl. No. 16/663,062, dated Jul. 13, 2021, 7 pages.
Notice of Allowance received for U.S. Appl. No. 16/663,062, dated Mar. 24, 2021, 8 pages.
Notice of Allowance received for U.S. Appl. No. 17/031,654, dated Feb. 10, 2021, 9 pages.
Notice of Allowance received for U.S. Appl. No. 17/031,654, dated May 27, 2021, 8 pages.
Notice of Allowance received for U.S. Appl. No. 17/091,460, dated Apr. 28, 2022, 9 pages.
Notice of Allowance received for U.S. Appl. No. 17/091,460, dated Feb. 4, 2022, 10 pages.
Office Action received for Australian Patent Application No. 2017330212, dated Feb. 21, 2020, 2 pages.
Office Action received for Australian Patent Application No. 2019100794, dated Oct. 3, 2019, 4 pages.
Office Action received for Australian Patent Application No. 2020100189, dated Apr. 1, 2020, 3 pages.
Office Action received for Australian Patent Application No. 2020101043, dated Aug. 14, 2020, 5 pages.
Office Action received for Australian Patent Application No. 2020101043, dated Oct. 30, 2020, 4 pages.
Office Action received for Australian Patent Application No. 2020239749, dated Jan. 21, 2022, 4 pages.
Office Action received for Australian Patent Application No. 2020239749, dated Jul. 16, 2021, 5 pages.
Office Action received for Australian Patent Application No. 2020294208, dated Dec. 17, 2021, 2 pages.
Office Action received for Australian Patent Application No. 2021201295, dated Jan. 14, 2022, 3 pages.
Office Action received for Chinese Patent Application No. 201910315328.5, dated Nov. 30, 2021, 21 pages (10 pages of English Translation and 11 pages of Official Copy).
Office Action received for Chinese Patent Application No. 201910379481.4, dated Mar. 2, 2020, 18 pages (10 pages of English Translation and 8 pages of Official Copy).
Office Action received for Chinese Patent Application No. 201910691865.X, dated Aug. 4, 2021, 10 pages (6 pages of English Translation and 4 pages of Official Copy).
Office Action received for Chinese Patent Application No. 201910691865.X, dated Feb. 4, 2021, 16 pages (9 pages of English Translation and 7 pages of Official Copy).
Office Action received for Chinese Patent Application No. 201910691865.X, dated Jul. 8, 2020, 17 pages (8 pages of English Translation and 9 pages of Official Copy).
Office Action received for Chinese Patent Application No. 201910691872.X, dated Jun. 3, 2020, 10 pages (5 pages of English Translation and 5 pages of Official Copy).
Office Action received for Chinese Patent Application No. 201910691872.X, dated Jun. 23, 2021, 10 pages (5 pages of English Translation and 5 pages of Official Copy).
Office Action received for Chinese Patent Application No. 201910691872.X, dated Mar. 24, 2021, 19 pages (9 pages of English Translation and 10 pages of Official Copy).
Office Action received for Chinese Patent Application No. 201910691872.X, dated Nov. 10, 2021, 16 pages (9 pages of English Translation and 7 pages of Official Copy).
Office Action received for Chinese Patent Application No. 201910692978.1, dated Apr. 3, 2020, 19 pages (8 pages of English Translation and 11 pages of Official Copy).
Office Action received for Chinese Patent Application No. 201910692978.1, dated Nov. 4, 2020, 4 pages (1 page of English Translation and 3 pages of Official Copy).
Office Action received for Chinese Patent Application No. 201911199054.4, dated Jan. 20, 2021, 19 pages (11 pages of English Translation and 8 pages of Official Copy).
Office Action received for Chinese Patent Application No. 201911199054.4, dated Jul. 3, 2020, 15 pages (9 pages of English Translation and 6 pages of Official Copy).
Office Action received for Chinese Patent Application No. 201911199054.4, dated Jun. 10, 2021, 13 pages (7 pages of English Translation and 6 pages of Official Copy).
Office Action received for Chinese Patent Application No. 201911202668.3, dated Aug. 4, 2020, 13 pages (7 pages of English Translation and 6 pages of Official Copy).
Office Action received for Chinese Patent Application No. 201911219525.3, dated Jul. 10, 2020, 7 pages (1 page of English Translation and 6 pages of Official Copy).
Office Action received for Chinese Patent Application No. 202010330318.1, dated Jul. 13, 2021, 12 pages (6 pages of English Translation and 6 pages of Official Copy).
Office Action received for Chinese Patent Application No. 202010330318.1, dated Mar. 31, 2021, 13 pages (7 pages of English Translation and 6 pages of Official Copy).
Office Action received for Chinese Patent Application No. 202010330318.1, dated Nov. 19, 2020, 18 pages (9 pages of English Translation and 9 pages of Official Copy).
Office Action received for Chinese Patent Application No. 202110820692.4, dated Mar. 15, 2022, 18 pages (9 pages of English Translation and 9 pages of Official Copy).
Office Action received for Danish Patent Application No. PA201870366, dated Aug. 22, 2019, 3 pages.
Office Action received for Danish Patent Application No. PA201870366, dated Dec. 12, 2018, 3 pages.
Office Action received for Danish Patent Application No. PA201870367, dated Dec. 20, 2018, 5 pages.
Office Action received for Danish Patent Application No. PA201870368, dated Dec. 20, 2018, 5 pages.
Office Action received for Danish Patent Application No. PA201870368, dated Oct. 1, 2019, 6 pages.
Office Action received for Danish Patent Application No. PA201870372, dated Aug. 20, 2019, 2 pages.
Office Action received for Danish Patent Application No. PA201870372, dated Jan. 31, 2019, 4 pages.
Office Action received for Danish Patent Application No. PA201870374, dated Feb. 6, 2019, 5 pages.

(56) References Cited

OTHER PUBLICATIONS

Office Action received for Danish Patent Application No. PA201870374, dated Jun. 17, 2019, 5 pages.
Office Action received for Danish Patent Application No. PA201870375, dated Jan. 31, 2019, 4 pages.
Office Action received for Danish Patent Application No. PA201870377, dated Jan. 31, 2019, 4 pages.
Office Action received for Danish Patent Application No. PA202070623, dated Aug. 24, 2021, 3 pages.
Office Action received for Danish Patent Application No. PA202070624, dated Feb. 4, 2022, 4 pages.
Office Action received for Danish Patent Application No. PA202070624, dated Jun. 16, 2021, 5 pages.
Office Action received for Danish Patent Application No. PA202070625, dated Feb. 8, 2022, 2 pages.
Office Action received for Danish Patent Application No. PA202070625, dated Jun. 16, 2021, 3 pages.
Office Action received for European Patent Application No. 17853657.9, dated Apr. 1, 2021, 6 pages.
Office Action received for European Patent Application No. 19172407.9, dated Oct. 18, 2019, 7 pages.
Office Action received for European Patent Application No. 19181242.9, dated Dec. 6, 2019, 9 pages.
Office Action received for European Patent Application No. 19204230.7, dated Sep. 28, 2020, 6 pages.
Office Action received for European Patent Application No. 19212057.4, dated Mar. 9, 2021, 6 pages.
Office Action received for European Patent Application No. 19724959.2, dated Apr. 23, 2020, 10 pages.
Office Action received for European Patent Application No. 20168021.2, dated Jul. 22, 2020, 8 pages.
Office Action received for Indian Patent Application No. 201814036470, dated Feb. 26, 2021, 7 pages.
Office Action received for Indian Patent Application No. 201814036472, dated Jul. 8, 2021, 8 pages.
Office Action received for Japanese Patent Application No. 2018-182607, dated Apr. 6, 2020, 6 pages (3 pages of English Translation and 3 pages of Official Copy).
Office Action received for Japanese Patent Application No. 2018-182607, dated Jul. 20, 2020, 5 pages (2 pages of English Translation and 3 pages of Official Copy).
Office Action received for Japanese Patent Application No. 2018-182607, dated Sep. 8, 2021, 7 pages (4 pages of English Translation and 3 pages of Official Copy).
Office Action received for Japanese Patent Application No. 2018-184254, dated Mar. 2, 2020, 8 pages (4 pages of English Translation and 4 pages of Official Copy).
Office Action received for Japanese Patent Application No. 2019-215503, dated Feb. 5, 2021, 12 pages (6 pages of English Translation and 6 pages of Official Copy).
Office Action received for Japanese Patent Application No. 2019-215503, dated Jul. 3, 2020, 12 pages (6 pages of English Translation and 6 pages of Official Copy).
Office Action received for Japanese Patent Application No. 2020-120086, dated May 21, 2021, 6 pages (3 pages of English Translation and 3 pages of Official Copy).
Office Action received for Japanese Patent Application No. 2020-120086, dated Nov. 20, 2020, 6 pages (3 pages of English Translation and 3 pages of Official Copy).
Office Action received for Japanese Patent Application No. 2020-159823, dated Dec. 23, 2021, 8 pages (4 pages of English Translation and 4 pages of Official Copy).
Office Action received for Japanese Patent Application No. 2020-159824, dated Dec. 17, 2021, 13 pages (7 pages of English Translation and 6 pages of Official Copy).
Office Action received for Japanese Patent Application No. 2020-159825, dated Dec. 10, 2021, 4 pages (2 pages of English Translation and 2 pages of Official Copy).
Office Action received for Japanese Patent Application No. 2020-193703, dated Apr. 19, 2021, 4 pages (2 pages of English Translation and 2 pages of Official Copy).
Office Action received for Japanese Patent Application No. 2021-092483, dated Apr. 1, 2022, 8 pages (4 pages of English Translation and 4 pages of Official Copy).
Office Action received for Korean Patent Application No. 10-2019-7005369, dated Mar. 13, 2020, 12 pages (5 pages of English Translation and 7 pages of Official Copy).
Office Action received for Korean Patent Application No. 10-2020-7031855, dated Nov. 24, 2020, 6 pages (2 pages of English Translation and 4 pages of Official Copy).
Office Action received for Korean Patent Application No. 10-2020-7032147, dated Feb. 16, 2021, 6 pages (2 pages of English Translation and 4 pages of Official Copy).
Office Action received for Korean Patent Application No. 10-2021-7002582, dated Apr. 16, 2021, 13 pages (6 pages of English Translation and 7 pages of Official Copy).
Office Action received for Korean Patent Application No. 10-2021-7002582, dated Oct. 29, 2021, 6 pages (3 pages of English Translation and 3 pages of Official Copy).
Office Action received for Taiwanese Patent Application No. 100111887, dated Oct. 7, 2013, 23 pages (9 pages of English Translation and 14 pages of Official Copy).
PC World, "How to make AR Emojis on the Samsung Galaxy S9", You Tube, Available Online: https://www.youtube.com/watch?v=8wQICfulkz0, Feb. 25, 2018, 2 pages.
Pre-Appeal Review Report received for Japanese Patent Application No. 2018-182607, mailed on Jan. 21, 2021, 4 pages (2 pages of English Translation).
Pumarola et al., "GANimation: Anatomically-aware Facial Animation from a Single Image", Proceedings of the European Conference on Computer Vision (ECCV), Jul. 24, 2018, 16 pages.
Pyun et al., "An Example-Based Approach for Facial Expression Cloning", SIGGRAPH Symposium on Computer Animation, The Eurographics Association (2003), 2003, 10 pages.
Record of Oral Hearing received for U.S. Appl. No. 16/259,771, mailed on Aug. 4, 2021, 15 pages.
Result of Consultation received for European Patent Application No. 19172407.9, mailed on Nov. 5, 2020, 17 pages.
Result of Consultation received for European Patent Application No. 19204230.7, mailed on Nov. 16, 2020, 3 pages.
Result of Consultation received for European Patent Application No. 19204230.7, mailed on Sep. 24, 2020, 5 pages.
Result of Consultation received for European Patent Application No. 19724959.2, mailed on Sep. 4, 2020, 3 pages.
Result of Consultation received for European Patent Application No. 19181242.9, mailed on Dec. 1, 2020, 12 pages.
Rosa et al., "Stripe Generator—a Free Tool for the Web Design Community", Available online at: http://www.stripegenerator.com/, Mar. 28, 2019, 10 pages.
Search Report and Opinion received for Danish Patent Application No. PA201870366, dated Aug. 27, 2018, 9 pages.
Search Report and Opinion received for Danish Patent Application No. PA201870367, dated Aug. 27, 2018, 9 pages.
Search Report and Opinion received for Danish Patent Application No. PA201870368, dated Sep. 6, 2018, 7 pages.
Search Report and Opinion received for Danish Patent Application No. PA201870372, dated Sep. 14, 2018, 8 pages.
Search Report and Opinion received for Danish Patent Application No. PA201870372, dated Sep. 17, 2018, 10 pages.
Search Report and Opinion received for Danish Patent Application No. PA201870374, dated Aug. 27, 2018, 9 pages.
Search Report and Opinion received for Danish Patent Application No. PA201870375, dated Aug. 23, 2018, 8 pages.
Search Report and Opinion received for Danish Patent Application No. PA201870377, dated Sep. 4, 2018, 8 pages.
Search Report and Opinion received for Danish Patent Application No. PA202070623, dated Dec. 21, 2020, 9 pages.
Search Report and Opinion received for Danish Patent Application No. PA202070624, dated Dec. 10, 2020, 10 pages.
Search Report and Opinion received for Danish Patent Application No. PA202070625, dated Dec. 17, 2020, 9 pages.

(56) References Cited

OTHER PUBLICATIONS

Singh Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 80 pages.
Slashgear, "Samsung AR Emoji demo on the Galaxy S9", Available Online at <https://www.youtube.com/watch?v=GQwNKzY4C9Y>, Feb. 25, 2018, 3 pages.
Spellburst,"The SIMS 3: Create a SIM With Me | #2—Dark Fairy + Full CC List!", Available online at: <https://www.youtube.com/watch?v=Dy_5g9B-wkA>, Oct. 9, 2017, 2 pages.
Summons to Attend Oral Proceedings received for European Patent Application No. 19172407.9, mailed on Jun. 24, 2020, 14 pages.
Summons to Attend Oral Proceedings received for European Patent Application No. 19181242.9, mailed on Jun. 16, 2020, 12 pages.
Summons to Attend Oral Proceedings received for European Patent Application No. 19204230.7, mailed on May 25, 2021, 10 pages.
Summons to Attend Oral Proceedings received for European Patent Application No. 19724959.2, mailed on Feb. 1, 2021, 9 pages.
Summons to Attend Oral Proceedings received for European Patent Application No. 19724959.2, mailed on Mar. 31, 2021, 3 pages.
Supplemental Notice of Allowance received for U.S. Appl. No. 15/713,490, dated May 30, 2019, 2 pages.
Supplemental Notice of Allowance received for U.S. Appl. No. 16/143,201, dated Dec. 13, 2018, 2 pages.
Supplemental Notice of Allowance received for U.S. Appl. No. 16/143,201, dated Dec. 19, 2018, 2 pages.
Supplemental Notice of Allowance received for U.S. Appl. No. 16/143,201, dated Jan. 10, 2019, 2 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
THEUNLOCKR, "Galaxy Watch Complete Walkthrough: The Best Watch They've Made So Far", Available online at: https://www.youtube.com/watch?v=xiECIfe1SN4, Sep. 11, 2018, 27 pages.
Tsuchihashi et al., "Generation of Caricatures by Automatic Selection of Templates for Shapes and Placement of Facial Parts", Technical Report of the Institute of Image Information and Television Engineers, Japan, The Institute of Image Information and Television Engineers, vol. 33, No. 11, pp. 77-80., Feb. 8, 2009, 7 pages See Communication Under 37 CFR § 1.98(a) (3).
VIDSTUBE, "Bitmoji Clockface on Fitbit Versa Sense/Versa 3/Versa 2", Available online at:<https://www.youtube.com/watch?v=4V_xDnSLeHE>, Retrieved on Dec. 3, 2020, Jun. 30, 2019, 1 page.
Woolsey Amanda, "How to Customize the Clock on the Apple Watch", Available online at:<https://www.youtube.com/watch?v=t-3Bckdd9B4>, Retrieved on Dec. 11, 2020, Apr. 25, 2015, 1 page.
Zhang et al., "Facial Expression Retargeting from Human to Avatar Made Easy", IEEE Transactions on Visualization and Computer Graphics, Aug. 2020,14 pages.
Zhao et al., "An Event-related Potential Comparison of Facial Expression Processing between Cartoon and Real Faces", Online available at: https://www.biorxiv.org/content/10.1101/333898v2, Jun. 18, 2018, 31 pages.
Zy News, "Generate Cartoon Face within Three Seconds, you are the New-generation Expression Emperor", Online available at: <http://inews.ifeng.com/48551936/news.shtml>, Apr. 22, 2016, 3 pages See Communication Under 37 CFR § 1.98(a) (3).
Advisory Action received for U.S. Appl. No. 17/031,765, dated Dec. 12, 2022, 7 pages.
Advisory Action received for U.S. Appl. No. 17/093,408, dated Jun. 5, 2023, 4 pages.
Applicant Initiated Interview Summary received for U.S. Appl. No. 17/031,671, dated Jun. 13, 2022, 7 pages.
Applicant-Initiated Interview Summary received for U.S. Appl. No. 17/031,671, dated Dec. 9, 2022, 5 pages.
Applicant-Initiated Interview Summary received for U.S. Appl. No. 17/031,671, dated May 23, 2023, 3 pages.
Applicant-Initiated Interview Summary received for U.S. Appl. No. 17/031,765, dated Apr. 17, 2023, 4 pages.
Applicant-Initiated Interview Summary received for U.S. Appl. No. 17/031,765, dated May 3, 2023, 6 pages.
Applicant-Initiated Interview Summary received for U.S. Appl. No. 17/031,765, dated May 23, 2022, 5 pages.
Applicant-Initiated Interview Summary received for U.S. Appl. No. 17/031,765, dated Nov. 16, 2022, 5 pages.
Applicant-Initiated Interview Summary received for U.S. Appl. No. 17/093,408, dated Jan. 5, 2023, 3 pages.
Applicant-Initiated Interview Summary received for U.S. Appl. No. 17/093,408, dated Jul. 1, 2022, 3 pages.
Applicant-Initiated Interview Summary received for U.S. Appl. No. 17/093,408, dated May 10, 2023, 3 pages.
Applicant-Initiated Interview Summary received for U.S. Appl. No. 17/093,408, dated May 25, 2023, 2 pages.
Applicant-Initiated Interview Summary received for U.S. Appl. No. 17/370,505, dated Oct. 17, 2022, 4 pages.
Applicant-Initiated Interview Summary received for U.S. Appl. No. 17/461,014, dated Feb. 21, 2023, 3 pages.
Applicant-Initiated Interview Summary received for U.S. Appl. No. 17/941,962, dated May 30, 2023, 2 pages.
Brief Communication Regarding Oral Proceedings received for European Patent Application No. 19181242.9, mailed on Oct. 5, 2022, 4 pages.
Corrected Notice of Allowance received for U.S. Appl. No. 17/370,505, dated Apr. 4, 2023, 5 pages.
Corrected Notice of Allowance received for U.S. Appl. No. 17/370,505, dated Apr. 28, 2023, 5 pages.
Corrected Notice of Allowance received for U.S. Appl. No. 17/370,505, dated Mar. 8, 2023, 5 pages.
Corrected Notice of Allowance received for U.S. Appl. No. 17/373,163, dated Jul. 15, 2022, 5 pages.
Corrected Notice of Allowance received for U.S. Appl. No. 17/373,163, dated Jun. 27, 2022, 5 pages.
Corrected Notice of Allowance received for U.S. Appl. No. 17/525,664, dated Apr. 11, 2023, 2 pages.
Corrected Notice of Allowance received for U.S. Appl. No. 17/525,664, dated Feb. 23, 2023, 2 pages.
Corrected Notice of Allowance received for U.S. Appl. No. 17/525,664, dated May 17, 2023, 2 pages.
Corrected Notice of Allowance received for U.S. Appl. No. 17/525,664, dated Nov. 3, 2022, 2 pages.
Corrected Notice of Allowance received for U.S. Appl. No. 17/941,962, dated Apr. 14, 2023, 6 pages.
Decision on Appeal received for Korean Patent Application No. 10-2021-7002582, dated May 13, 2022, 29 pages (2 pages of English Translation and 27 pages of Official Copy).
Decision to Grant received for European Patent Application No. 19181242.9, dated Mar. 23, 2023, 3 pages.
Decision to Grant received for Japanese Patent Application No. 2021-166686, dated Apr. 20, 2023, 2 pages (1 page of English Translation and 1 page of Official Copy).
Decision to Refuse received for Japanese Patent Application No. 2020-159824, dated Sep. 30, 2022, 6 pages (3 pages of English Translation and 3 pages of Official Copy).
Examiner's Answer to Appeal Brief received for U.S. Appl. No. 16/259,771, mailed on May 26, 2023, 23 pages.
Extended European Search Report received for European Patent Application No. 22154034.7, dated May 11, 2022, 14 pages.
Final Office Action received for U.S. Appl. No. 16/259,771, dated Aug. 12, 2022, 25 pages.
Final Office Action received for U.S. Appl. No. 17/031,671, dated Nov. 15, 2022, 27 pages.
Final Office Action received for U.S. Appl. No. 17/031,765, dated Sep. 12, 2022, 37 pages.
Final Office Action received for U.S. Appl. No. 17/093,408, dated Mar. 2, 2023, 51 pages.
Final Office Action received for U.S. Appl. No. 17/093,408, dated May 18, 2022, 41 pages.
Final Office Action received for U.S. Appl. No. 17/461,014, dated Apr. 6, 2023, 24 pages.
Intention to Grant received for Danish Patent Application No. PA202070623, dated Jul. 20, 2022, 2 pages.

(56) References Cited

OTHER PUBLICATIONS

Intention to Grant received for European Patent Application No. 19181242.9, dated Nov. 17, 2022, 9 pages.
International Preliminary Report on Patentability received for PCT Patent Application No. PCT/US2021/031096, dated Nov. 24, 2022, 11 pages.
International Preliminary Report on Patentability received for PCT Patent Application No. PCT/US2021/031212, dated Nov. 24, 2022, 16 pages.
Non-Final Office Action received for U.S. Appl. No. 17/031,671, dated Mar. 17, 2023, 34 pages.
Non-Final Office Action received for U.S. Appl. No. 17/031,765, dated Mar. 28, 2023, 31 pages.
Non-Final Office Action received for U.S. Appl. No. 17/093,408, dated Sep. 14, 2022, 46 pages.
Non-Final Office Action received for U.S. Appl. No. 17/370,505, dated Jul. 6, 2022, 14 pages.
Non-Final Office Action received for U.S. Appl. No. 17/461,014, dated Dec. 7, 2022, 22 pages.
Notice of Acceptance received for Australian Patent Application No. 2020239749, dated May 27, 2022, 3 pages.
Notice of Acceptance received for Australian Patent Application No. 2021201295, dated May 10, 2022, 3 pages.
Notice of Acceptance received for Australian Patent Application No. 2021202254, dated Nov. 16, 2022, 3 pages.
Notice of Acceptance received for Australian Patent Application No. 2022200965, dated May 11, 2023, 3 pages.
Notice of Acceptance received for Australian Patent Application No. 2022215297, dated Sep. 26, 2022, 3 pages.
Notice of Acceptance received for Australian Patent Application No. 2022220279, dated Sep. 27, 2022, 3 pages.
Notice of Allowance received for Chinese Patent Application No. 201780058426.4, dated Jun. 30, 2023, 2 pages (1 page of English Translation and 1 page of Official Copy).
Notice of Allowance received for Chinese Patent Application No. 201910315328.5, dated Aug. 24, 2022, 4 pages (1 page of English Translation and 3 pages of Official Copy).
Notice of Allowance received for Chinese Patent Application No. 202110820692.4, dated Nov. 16, 2022, 2 pages (1 page of English Translation and 1 page of Official Copy).
Notice of Allowance received for Danish Patent Application No. PA202070623, dated Sep. 20, 2022, 2 pages.
Notice of Allowance received for Japanese Patent Application No. 2019-215503, dated Aug. 26, 2022, 3 pages (1 page of English Translation and 2 pages of Official Copy).
Notice of Allowance received for Japanese Patent Application No. 2021-092483, dated Sep. 30, 2022, 4 pages (1 page of English Translation and 3 pages of Official Copy).
Notice of Allowance received for Japanese Patent Application No. 2021-153573, dated Feb. 17, 2023, 4 pages (1 page of English Translation and 3 page of Official Copy).
Notice of Allowance received for Korean Patent Application No. 10-2020-0123852, dated Mar. 9, 2023, 7 pages (2 pages of English Translation and 5 pages of Official Copy).
Notice of Allowance received for Korean Patent Application No. 10-2020-0123852, dated Nov. 28, 2022, 7 pages (2 pages of English Translation and 5 pages of Official Copy).
Notice of Allowance received for Korean Patent Application No. 10-2020-0123857, dated Feb. 21, 2023, 6 pages (1 page of English Translation and 5 pages of Official Copy).
Notice of Allowance received for Korean Patent Application No. 10-2020-0123887, dated Nov. 28, 2022, 7 pages (2 pages of English Translation and 5 pages of Official Copy).
Notice of Allowance received for Korean Patent Application No. 10-2022-7009437, dated Jun. 22, 2023, 7 pages (2 pages of English Translation and 5 pages of Official Copy).
Notice of Allowance received for Korean Patent Application No. 10-2022-7016421, dated May 25, 2022, 6 pages (2 pages of English Translation and 4 pages of Official Copy).
Notice of Allowance received for U.S. Appl. No. 16/833,436, dated Jul. 7, 2022, 8 pages.
Notice of Allowance received for U.S. Appl. No. 16/833,436, dated Sep. 8, 2022, 8 pages.
Notice of Allowance received for U.S. Appl. No. 17/091,460, dated May 23, 2022, 9 pages.
Notice of Allowance received for U.S. Appl. No. 17/370,505, dated Feb. 2, 2023, 8 pages.
Notice of Allowance received for U.S. Appl. No. 17/373,163, dated Jul. 27, 2022, 8 pages.
Notice of Allowance received for U.S. Appl. No. 17/373,163, dated May 11, 2022, 8 pages.
Notice of Allowance received for U.S. Appl. No. 17/525,664, dated Apr. 26, 2023, 10 pages.
Notice of Allowance received for U.S. Appl. No. 17/525,664, dated Feb. 14, 2023, 10 pages.
Notice of Allowance received for U.S. Appl. No. 17/525,664, dated Oct. 27, 2022, 11 pages.
Notice of Allowance received for U.S. Appl. No. 17/941,962, dated Jul. 3, 2023, 9 pages.
Notice of Allowance received for U.S. Appl. No. 17/941,962, dated Mar. 10, 2023, 11 pages.
Notice of Allowance received for U.S. Appl. No. 17/941,962, dated May 3, 2023, 10 pages.
Notice of Allowance received for U.S. Appl. No. 17/971,456, dated Jun. 26, 2023, 9 pages.
Office Action received for Australian Patent Application No. 2021202254, dated Jun. 20, 2022, 2 pages.
Office Action received for Australian Patent Application No. 2022200965, dated Feb. 14, 2023, 4 pages.
Office Action received for Australian Patent Application No. 2023200039, dated Jul. 4, 2023, 2 pages.
Office Action received for Chinese Patent Application No. 201780058426.4, dated Dec. 2, 2022, 11 pages (5 pages of English Translation and 6 pages of Official Copy).
Office Action received for Danish Patent Application No. PA202070623, dated May 23, 2022, 3 pages.
Office Action received for Danish Patent Application No. PA202070625, dated Sep. 23, 2022, 4 pages.
Office Action received for European Patent Application No. 20704768.9, dated Mar. 24, 2023, 8 pages.
Office Action received for European Patent Application No. 22154034.7, dated May 26, 2023, 10 pages.
Office Action received for Indian Patent Application No. 202015008746, dated Mar. 6, 2023, 7 pages.
Office Action received for Indian Patent Application No. 202015008747, dated Mar. 15, 2023, 10 pages.
Office Action received for Indian Patent Application No. 202215026045, dated Mar. 31, 2023, 8 pages.
Office Action received for Indian Patent Application No. 202215026505, dated Feb. 8, 2023, 9 pages.
Office Action received for Japanese Patent Application No. 2020-159823, dated Aug. 15, 2022, 6 pages (3 pages of English Translation and 3 pages of Official Copy).
Office Action received for Japanese Patent Application No. 2021-153573, dated Oct. 17, 2022, 4 pages (2 pages of English Translation and 2 pages of Official Copy).
Office Action received for Japanese Patent Application No. 2021-166686, dated Oct. 3, 2022, 3 pages (2 pages of English Translation and 1 page of Official Copy).
Office Action received for Korean Patent Application No. 10-2020-0123852, dated Jun. 9, 2022, 10 pages (4 pages of English Translation and 6 pages of Official Copy).
Office Action received for Korean Patent Application No. 10-2020-0123857, dated Dec. 16, 2022, 8 pages (4 pages of English Translation and 4 pages of Official Copy).
Office Action received for Korean Patent Application No. 10-2020-0123857, dated Jun. 9, 2022, 12 pages (5 pages of English Translation and 7 pages of Official Copy).
Office Action received for Korean Patent Application No. 10-2020-0123887, dated Jun. 9, 2022, 5 pages (2 pages of English Translation and 3 pages of Official Copy).

(56) References Cited

OTHER PUBLICATIONS

Office Action received for Korean Patent Application No. 10-2022-7003364, dated Apr. 22, 2022, 14 pages (6 pages of English Translation and 8 pages of Official Copy).
Office Action received for Korean Patent Application No. 10-2022-7003364, dated Dec. 26, 2022, 8 pages (3 pages of English Translation and 5 pages of Official Copy).
Office Action received for Korean Patent Application No. 10-2022-7009437, dated Nov. 30, 2022, 6 pages (2 pages of English Translation and 4 pages of Official Copy).
Office Action received for Korean Patent Application No. 10-2023-0064928, dated Jun. 9, 2023, 6 pages (2 pages of English Translation and 4 pages of Official Copy).
Pre-Appeal Review Report received for Japanese Patent Application No. 2020-159823, mailed on Jan. 12, 2023, 4 pages (2 pages of English Translation and 2 pages of Official Copy).
Summons to Attend Oral Proceedings received for European Patent Application No. 17853657.9, mailed on May 2, 2023, 8 pages.
Summons to Attend Oral Proceedings received for European Patent Application No. 19181242.9, mailed on May 19, 2022, 7 pages.
Summons to Attend Oral Proceedings received for European Patent Application No. 19212057.4, mailed on Apr. 19, 2023, 9 pages.
Supplemental Notice of Allowance received for U.S. Appl. No. 16/833,436, dated Jul. 14, 2022, 2 pages.
Droid Life, "20+ Galaxy S9, S9+ Tips and Tricks", Available Online at: https://www.youtube.com/watch?v=sso0mYTfV6w, Mar. 22, 2018, pp. 1-33.
Gauging Gadgets, "How to Customize Watch Faces—Garmin Venu Tutorial", Online Available at: https://www.youtube.com/watch?v=dxajKKulaP0, Jan. 7, 2020, 14 pages.
Lein et al., "Patternizer", Available online at: https://patternizer.com/, Apr. 2016, 5 pages.
Pavlakos et al., "Expressive Body Capture: 3D Hands, Face, and Body from a Single Image", In Proceedings of the IEEE/CVF conference on computer vision and pattern recognition 2019, online available at https://arxiv.org/abs/1904.05866, 2019, p. 10975-10985.
Takahashi et al., "Neural network modeling of altered facial expression recognition in autism spectrum disorders based on predictive processing framework", Scientific reports, online available at:-https://www.nature.com/articles/s41598-021-94067-x, Jul. 26, 2021, 14 pages.
Zollhöfer et al., "State of the Art on Monocular 3D Face Reconstruction, Tracking, and Applications", In Computer graphics forum May 2018 (vol. 37, No. 2), online available at https://studios.disneyresearch.com/wp-content/uploads/2019/03/State-of-the-Art-on-Monocular-3D-Face-Reconstruction-Tracking-and-Applications-1.pdf., 2018, 28 pages.

\* cited by examiner

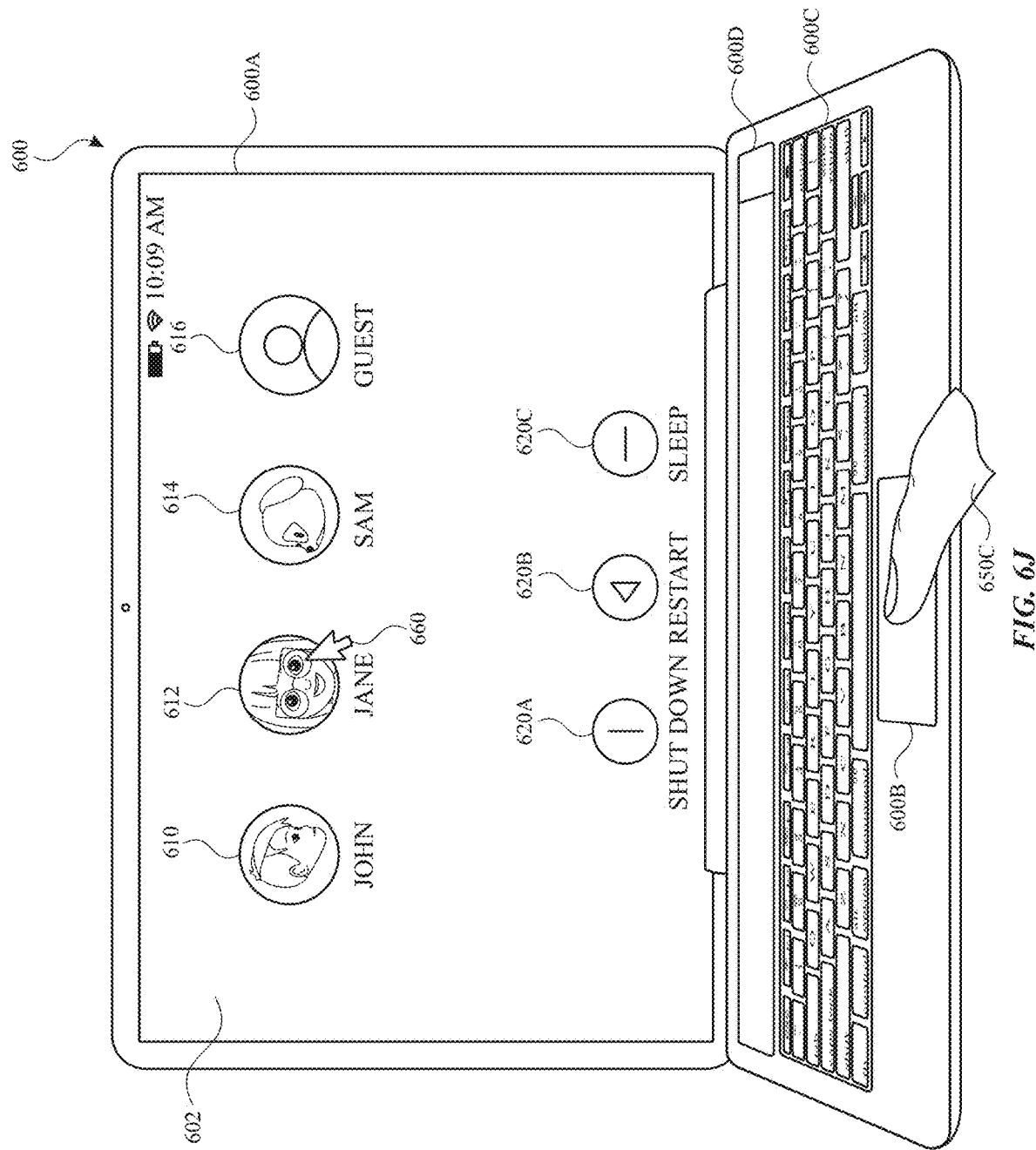

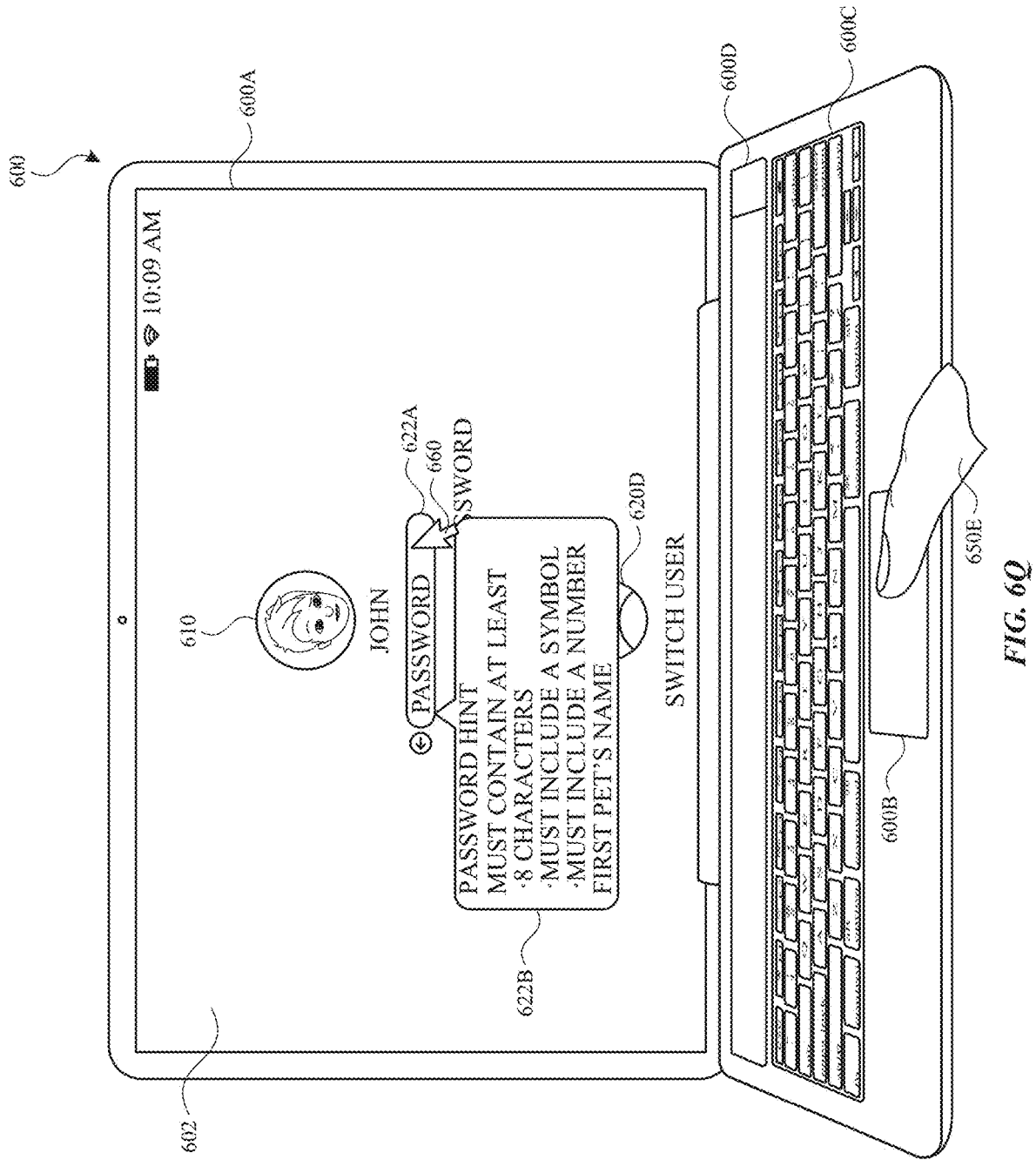

TECHNIQUES FOR MANAGING AN AVATAR ON A LOCK SCREEN

CROSS-REFERENCE TO RELATED APPLICATIONS

This application claims priority to U.S. Application No. 63/197,209, filed Jun. 4, 2021, entitled "TECHNIQUES FOR MANAGING AN AVATAR ON A LOCK SCREEN," the entire contents of which are hereby incorporated by reference.

FIELD

The present disclosure relates generally to computer user interfaces, and more specifically to techniques for managing an avatar on a lock screen user interface.

BACKGROUND

Some computer systems display lock screens, which indicate to a user that the computer system is powered on and locked. For example, a computer system may display a lock screen when the system is turned on, when the system is restarted, or when a user is logged out.

BRIEF SUMMARY

Some techniques for managing lock screens using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing an avatar on a lock screen. Methods and interfaces of the present technique optionally complement or replace other methods for managing avatars. Such methods and interfaces reduce the cognitive burden on a user and produce a more efficient human-machine interface. For battery-operated computing devices, such methods and interfaces conserve power and increase the time between battery charges. Methods and interfaces of the present technique also provide the user with visual feedback about the inputs being received at the device and the state of the device.

In accordance with some embodiments, a method is described. The method is performed at a computer system that is in communication with a display generation component and one or more input devices. The method comprises: while the computer system is in a locked state: displaying, via the display generation component, a lock screen user interface that includes a first avatar; and while displaying the lock screen user interface that includes the first avatar, receiving, via the one or more input devices, first input; and in response to receiving the first input: displaying, via the display generation component, a respective change in a respective element of the lock screen user interface other than the first avatar including: in accordance with a determination that the first input is a first type of input, the respective change is a first change in the respective element of the lock screen user interface; and in accordance with a determination that the first input is a second type of input different from the first type of input, the respective change is a second change in the respective element of the lock screen user interface that is different from the first change in the respective element of the lock screen user interface; and displaying, via the display generation component, animation, over time, of the first avatar transitioning through a plurality of poses, wherein, after the animation, the first avatar is concurrently displayed along with the respective change in the respective element of the lock screen user interface other than the first avatar.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: while the computer system is in a locked state: displaying, via the display generation component, a lock screen user interface that includes a first avatar; and while displaying the lock screen user interface that includes the first avatar, receiving, via the one or more input devices, first input; and in response to receiving the first input: displaying, via the display generation component, a respective change in a respective element of the lock screen user interface other than the first avatar including: in accordance with a determination that the first input is a first type of input, the respective change is a first change in the respective element of the lock screen user interface; and in accordance with a determination that the first input is a second type of input different from the first type of input, the respective change is a second change in the respective element of the lock screen user interface that is different from the first change in the respective element of the lock screen user interface; and displaying, via the display generation component, animation, over time, of the first avatar transitioning through a plurality of poses, wherein, after the animation, the first avatar is concurrently displayed along with the respective change in the respective element of the lock screen user interface other than the first avatar.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: while the computer system is in a locked state: displaying, via the display generation component, a lock screen user interface that includes a first avatar; and while displaying the lock screen user interface that includes the first avatar, receiving, via the one or more input devices, first input; and in response to receiving the first input: displaying, via the display generation component, a respective change in a respective element of the lock screen user interface other than the first avatar including: in accordance with a determination that the first input is a first type of input, the respective change is a first change in the respective element of the lock screen user interface; and in accordance with a determination that the first input is a second type of input different from the first type of input, the respective change is a second change in the respective element of the lock screen user interface that is different from the first change in the respective element of the lock screen user interface; and displaying, via the display generation component, animation, over time, of the first avatar transitioning through a plurality of poses, wherein, after the animation, the first avatar is concurrently displayed along with the respective change in the respective element of the lock screen user interface other than the first avatar.

In accordance with some embodiments, a computer system is described. The computer system is configured to communicate with a display generation component and one or more input devices. The computer system comprises: one or more processors; and memory storing one or more programs configured to be executed by the one or more processors, the one or more programs including instructions for: while the computer system is in a locked state: displaying, via the display generation component, a lock screen user interface that includes a first avatar; and while displaying the lock screen user interface that includes the first avatar, receiving, via the one or more input devices, first input; and in response to receiving the first input: displaying, via the display generation component, a respective change in a respective element of the lock screen user interface other than the first avatar including: in accordance with a determination that the first input is a first type of input, the respective change is a first change in the respective element of the lock screen user interface; and in accordance with a determination that the first input is a second type of input different from the first type of input, the respective change is a second change in the respective element of the lock screen user interface that is different from the first change in the respective element of the lock screen user interface; and displaying, via the display generation component, animation, over time, of the first avatar transitioning through a plurality of poses, wherein, after the animation, the first avatar is concurrently displayed along with the respective change in the respective element of the lock screen user interface other than the first avatar.

In accordance with some embodiments, a computer system is described. The computer system is configured to communicate with a display generation component and one or more input devices. The computer system comprises: means, while the computer system is in a locked state, for: displaying, via the display generation component, a lock screen user interface that includes a first avatar; and while displaying the lock screen user interface that includes the first avatar, receiving, via the one or more input devices, first input; and means, responsive to receiving the first input, for: displaying, via the display generation component, a respective change in a respective element of the lock screen user interface other than the first avatar including: in accordance with a determination that the first input is a first type of input, the respective change is a first change in the respective element of the lock screen user interface; and in accordance with a determination that the first input is a second type of input different from the first type of input, the respective change is a second change in the respective element of the lock screen user interface that is different from the first change in the respective element of the lock screen user interface; and displaying, via the display generation component, animation, over time, of the first avatar transitioning through a plurality of poses, wherein, after the animation, the first avatar is concurrently displayed along with the respective change in the respective element of the lock screen user interface other than the first avatar.

In accordance with some embodiments, a computer program product is described. The computer program product comprises one or more programs configured to be executed by one or more processors of a computer system that is in communication with a display generation component and one or more input devices, the one or more programs including instructions for: while the computer system is in a locked state: displaying, via the display generation component, a lock screen user interface that includes a first avatar; and while displaying the lock screen user interface that includes the first avatar, receiving, via the one or more input devices, first input; and in response to receiving the first input: displaying, via the display generation component, a respective change in a respective element of the lock screen user interface other than the first avatar including: in accordance with a determination that the first input is a first type of input, the respective change is a first change in the respective element of the lock screen user interface; and in accordance with a determination that the first input is a second type of input different from the first type of input, the respective change is a second change in the respective element of the lock screen user interface that is different from the first change in the respective element of the lock screen user interface; and displaying, via the display generation component, animation, over time, of the first avatar transitioning through a plurality of poses, wherein, after the animation, the first avatar is concurrently displayed along with the respective change in the respective element of the lock screen user interface other than the first avatar.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing an avatar on a lock screen, thereby increasing the effectiveness, efficiency, and user satisfaction with such devices. Such methods and interfaces may complement or replace other methods for managing an avatar on a lock screen.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing an avatar on a lock screen. For example, the animations of the avatar provide the user with visual feedback about what inputs are being received at the device and about the state of the device. Such techniques can reduce the cognitive burden on a user who use lock screens, thereby enhancing productivity. Further, such techniques can reduce processor and battery power otherwise wasted on redundant user inputs.

Figure 6A:
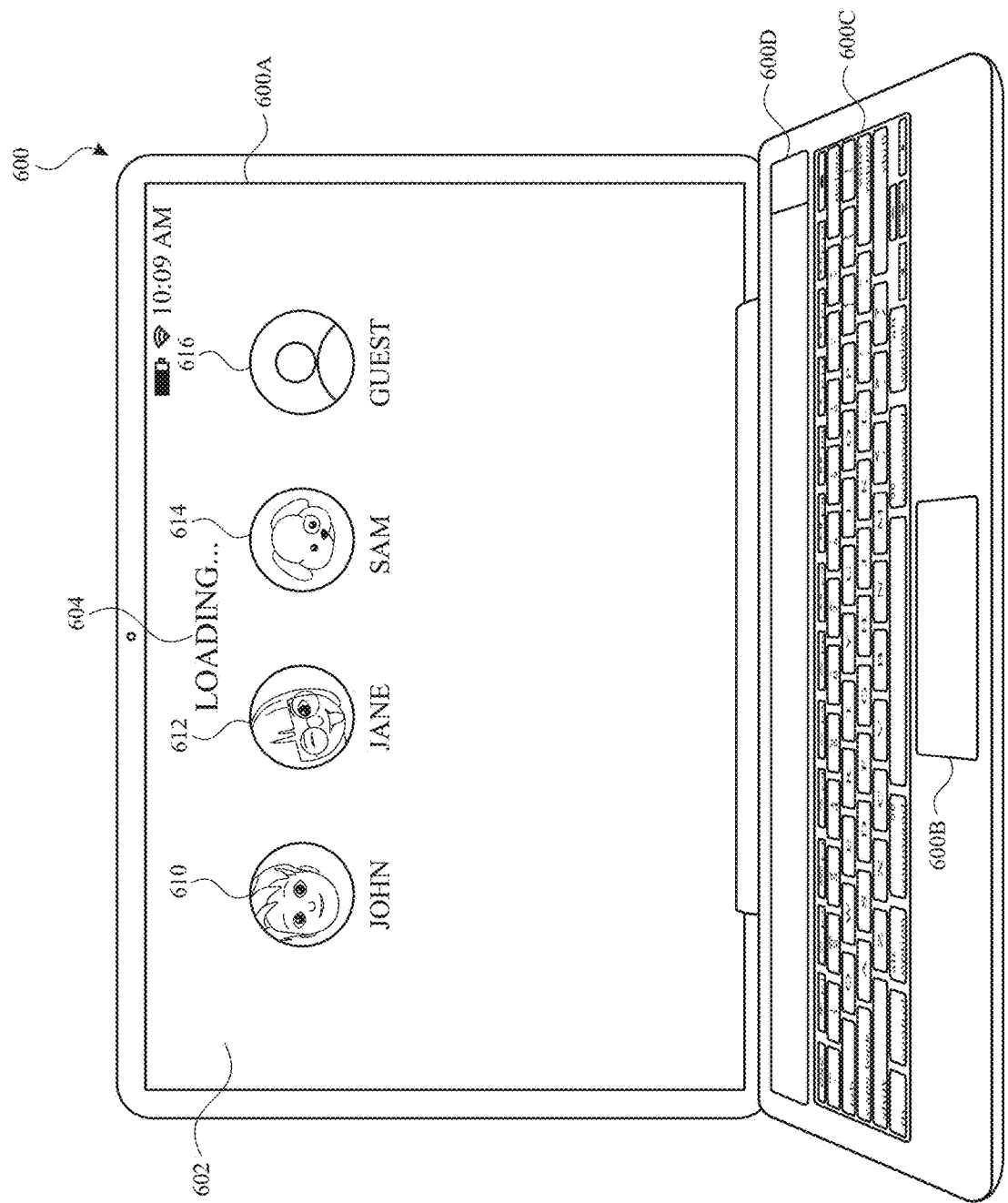
FIGS. 6A-6X illustrate exemplary user interfaces for managing an avatar on a lock screen.
Figure 6X:
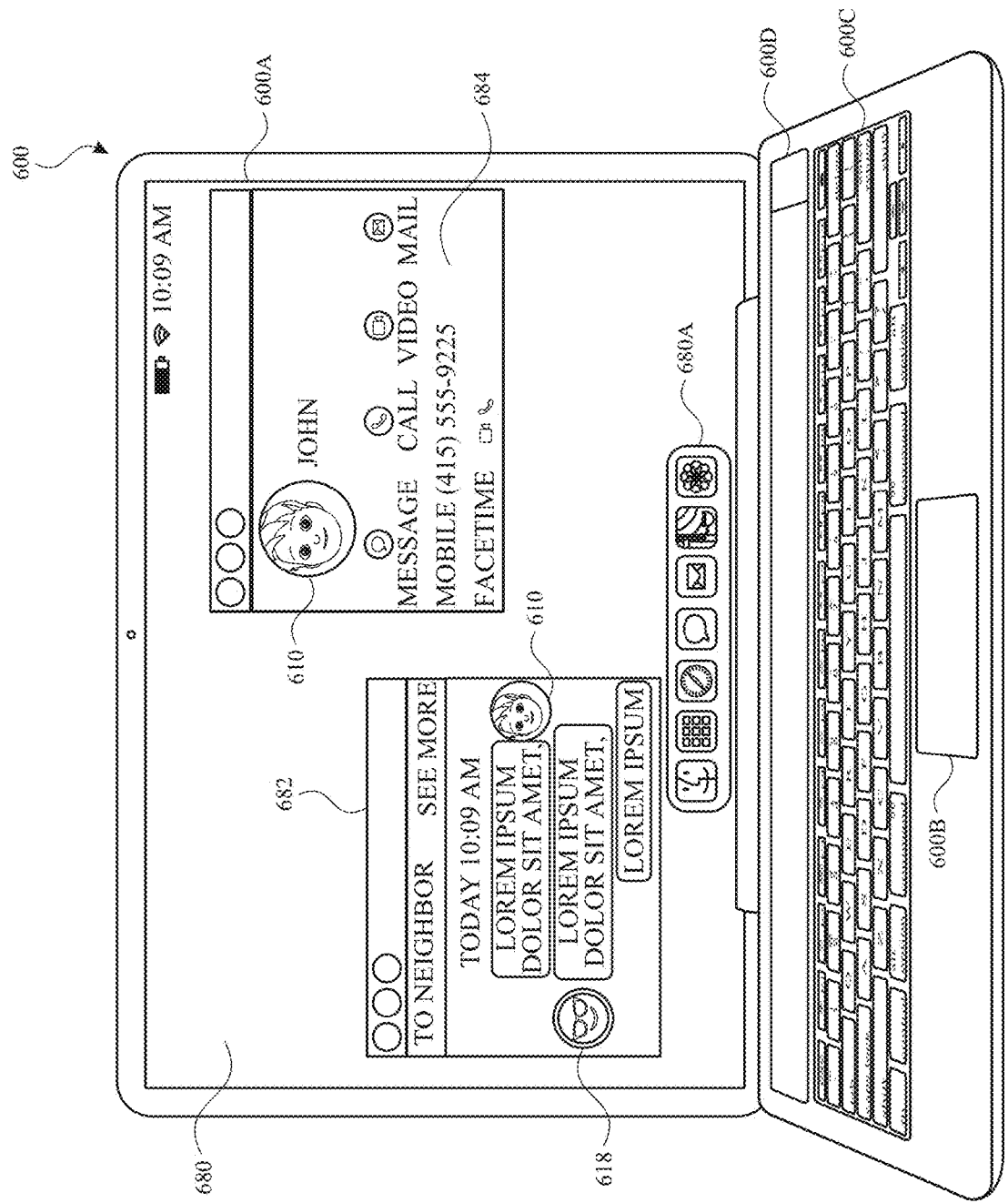
Figure 7:
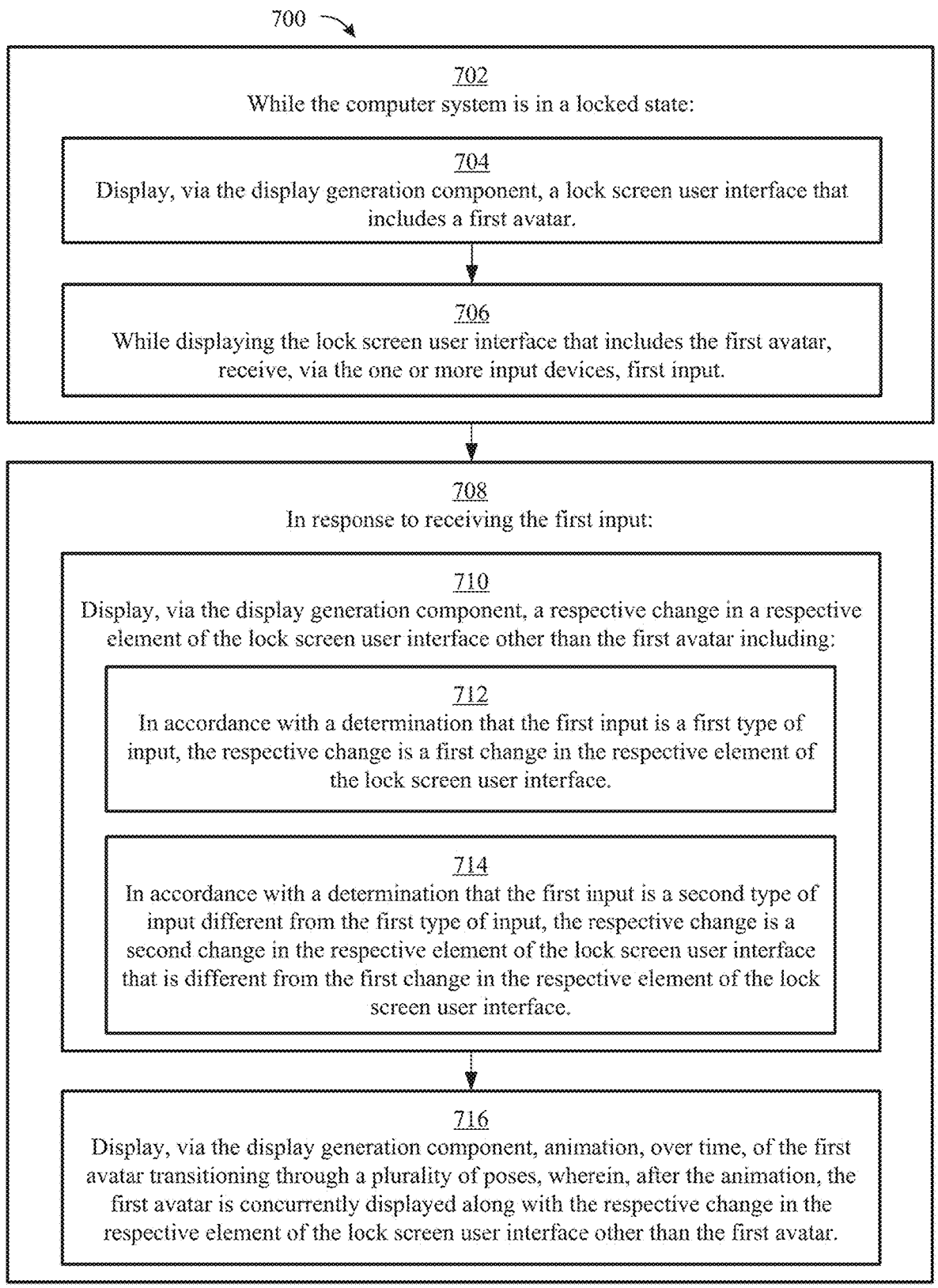
FIG. 7 is a flow diagram illustrating methods of managing an avatar on a lock screen in accordance with some embodiments.

Below, FIGS. 1A-1B, 2, 3, 4A-4B, and 5A-5B provide a description of exemplary devices for performing the techniques for managing an avatar on a lock screen. FIGS. 6A-6X illustrate exemplary user interfaces for managing an avatar on a lock screen. FIG. 7 is a flow diagram illustrating methods of managing an avatar on a lock screen in accordance with some embodiments.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
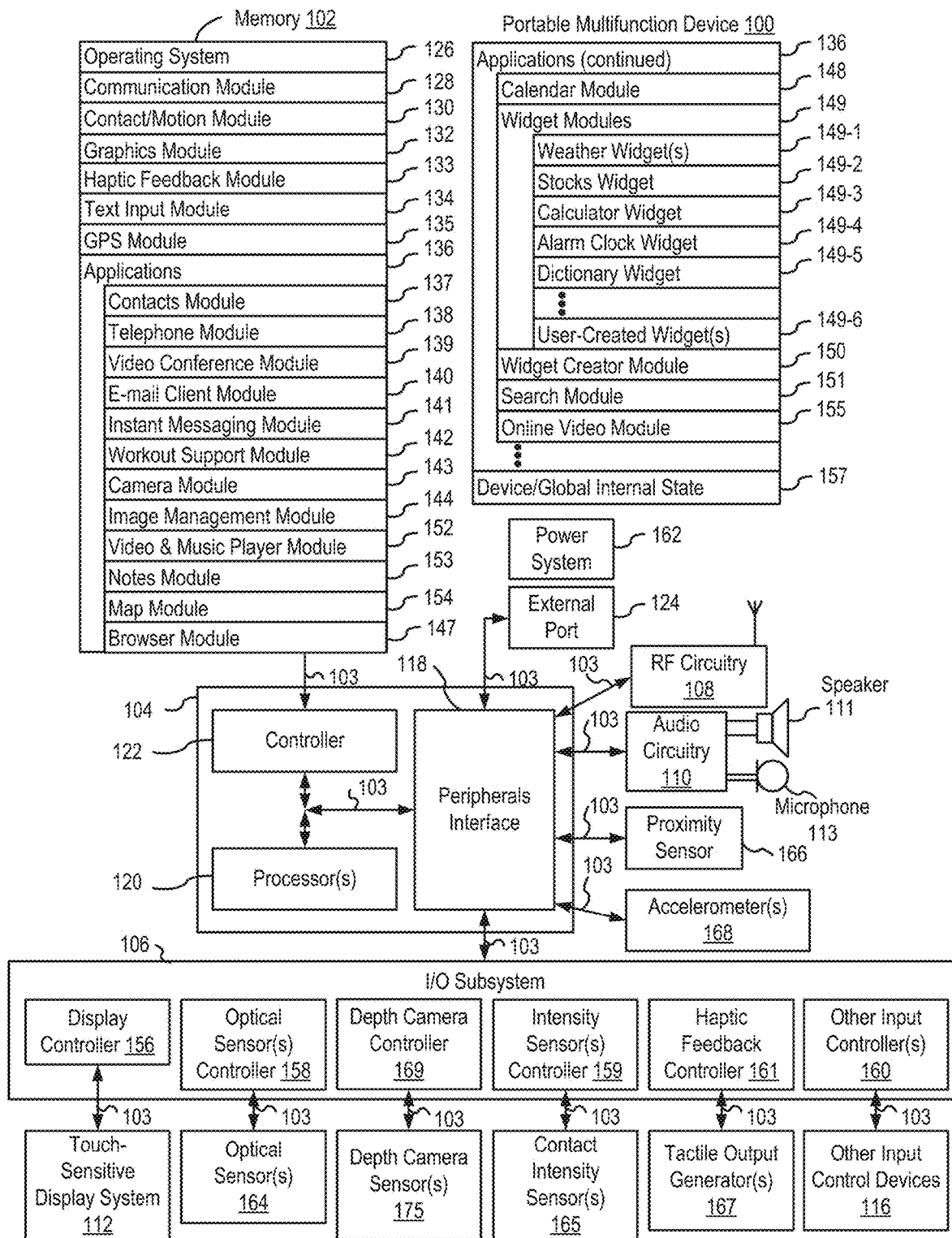
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
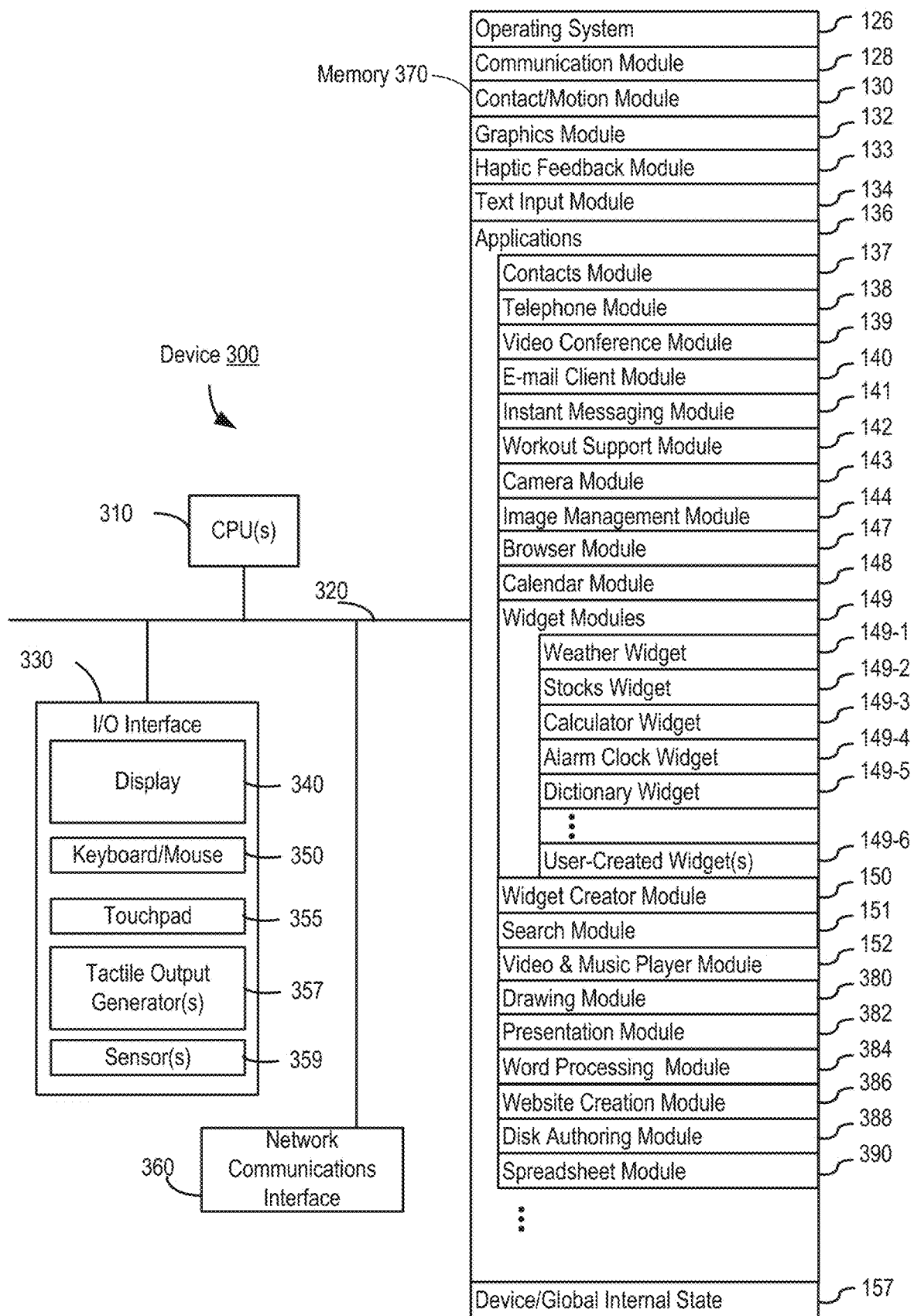
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;

Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
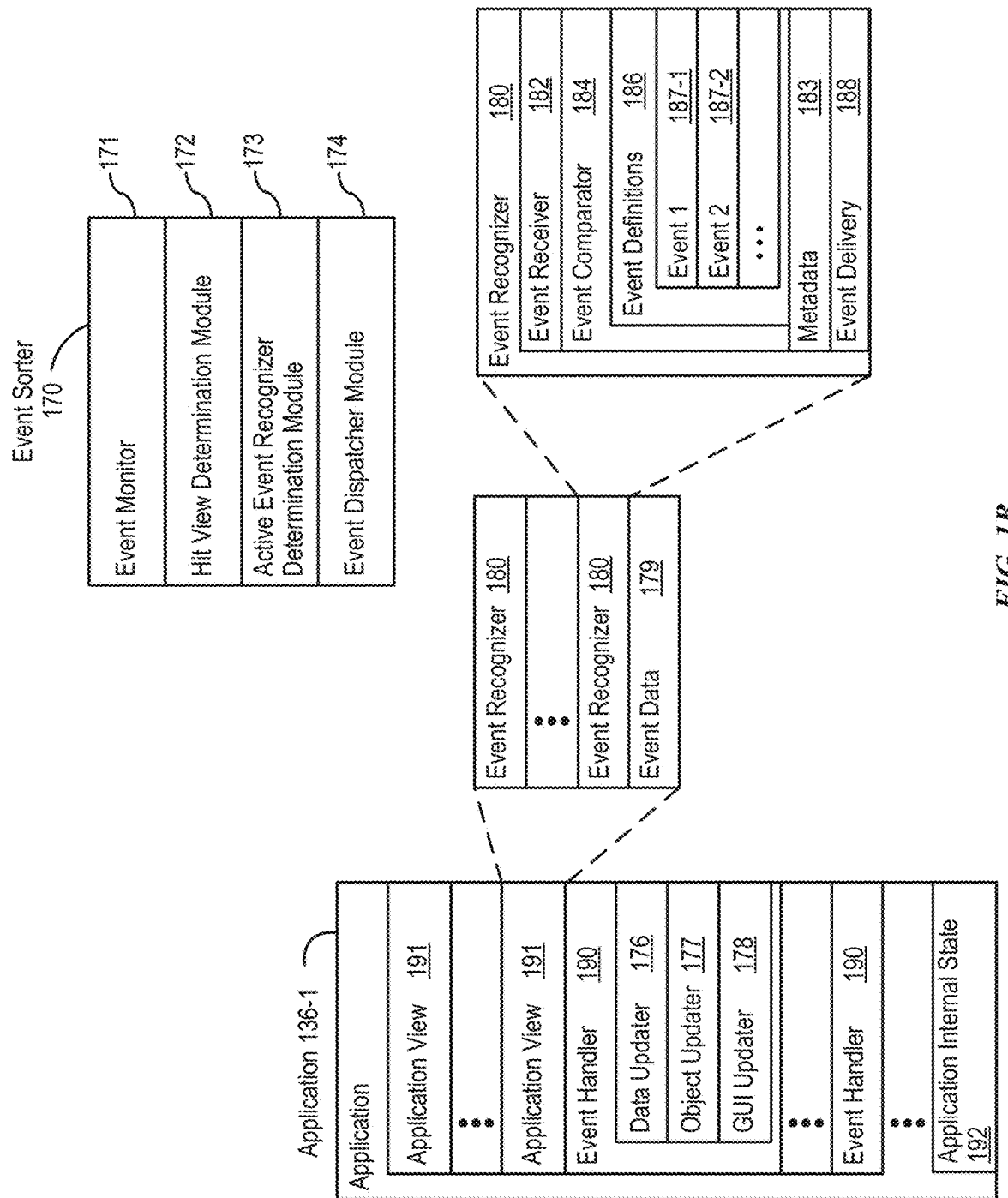
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
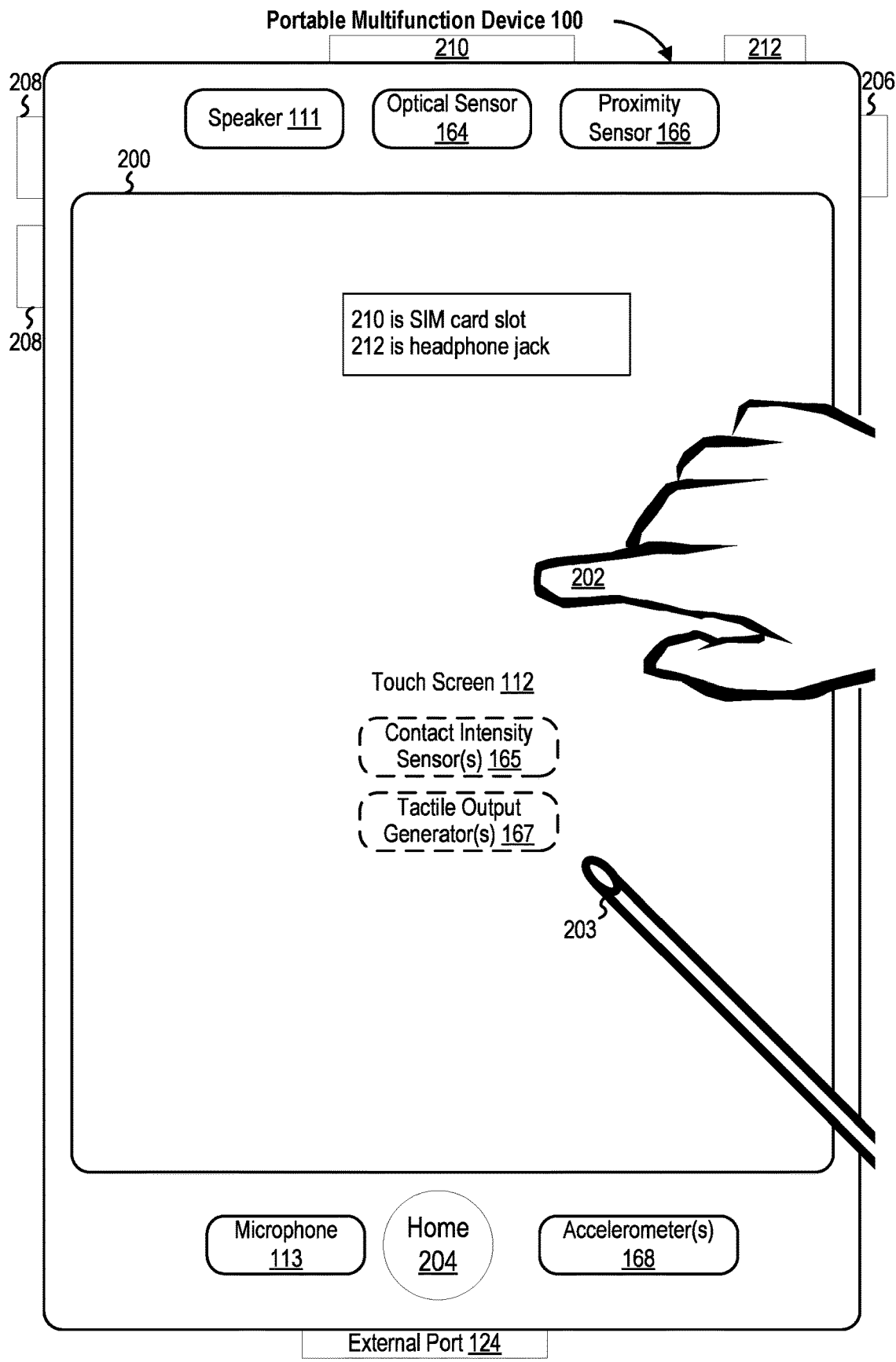
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
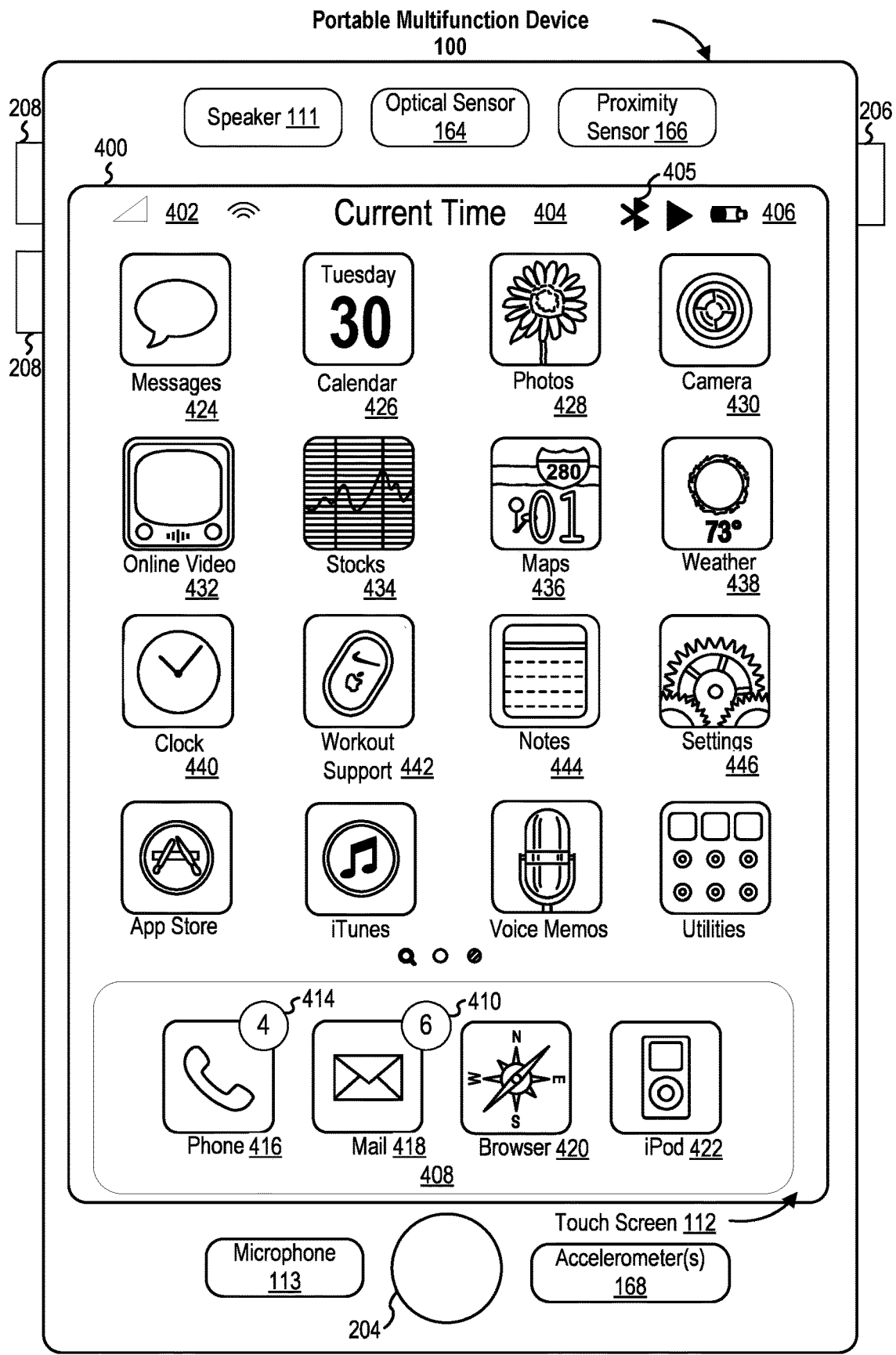
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
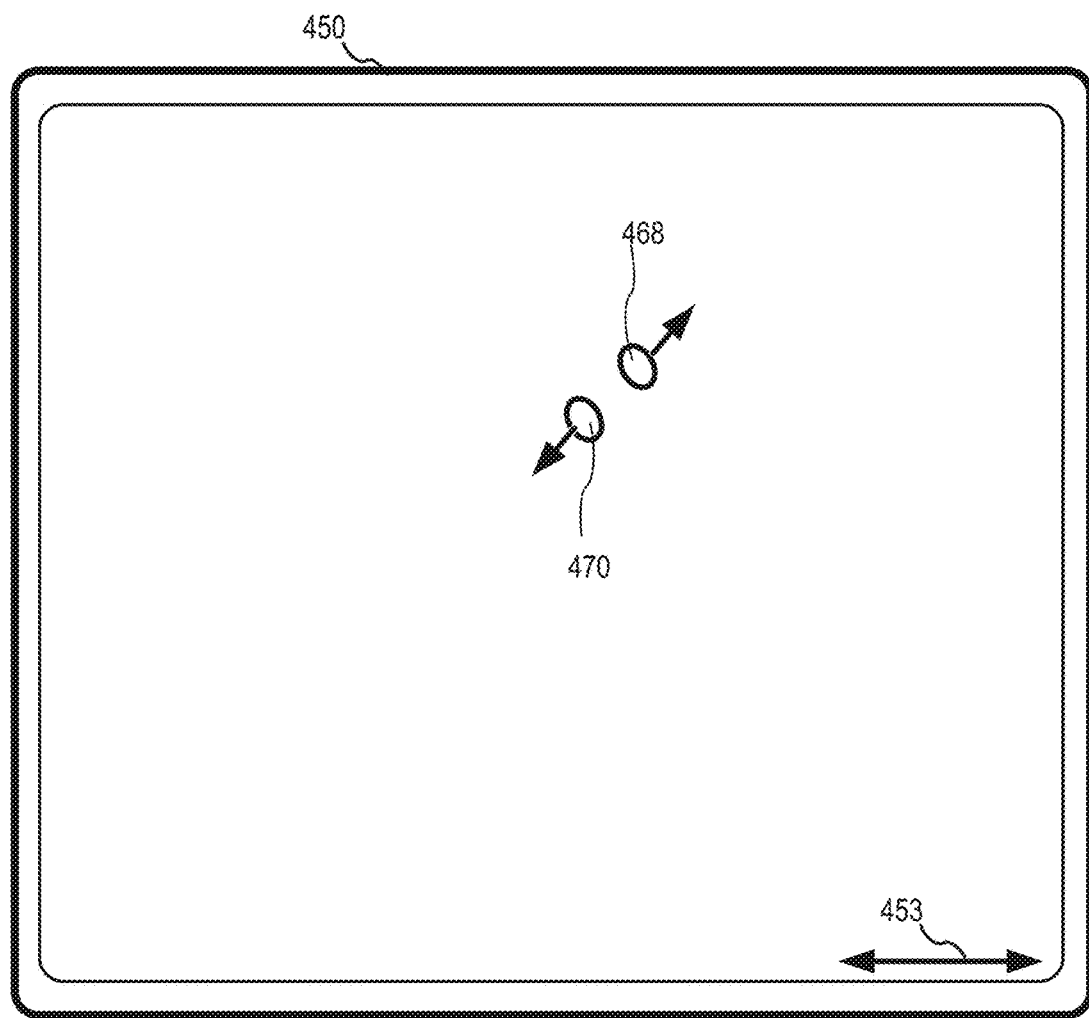
FIG. 4B illustrates an exemplary user interface for a multifunction device with a touch-sensitive surface that is separate from the display in accordance with some embodiments.
Figure 4B:
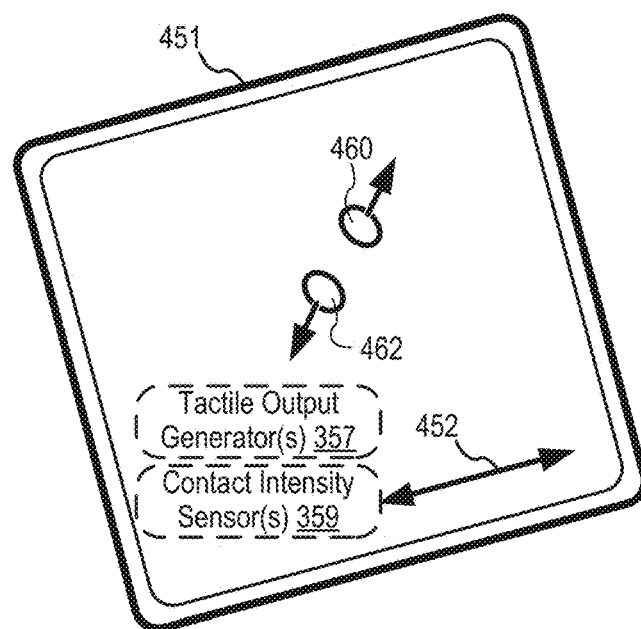

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
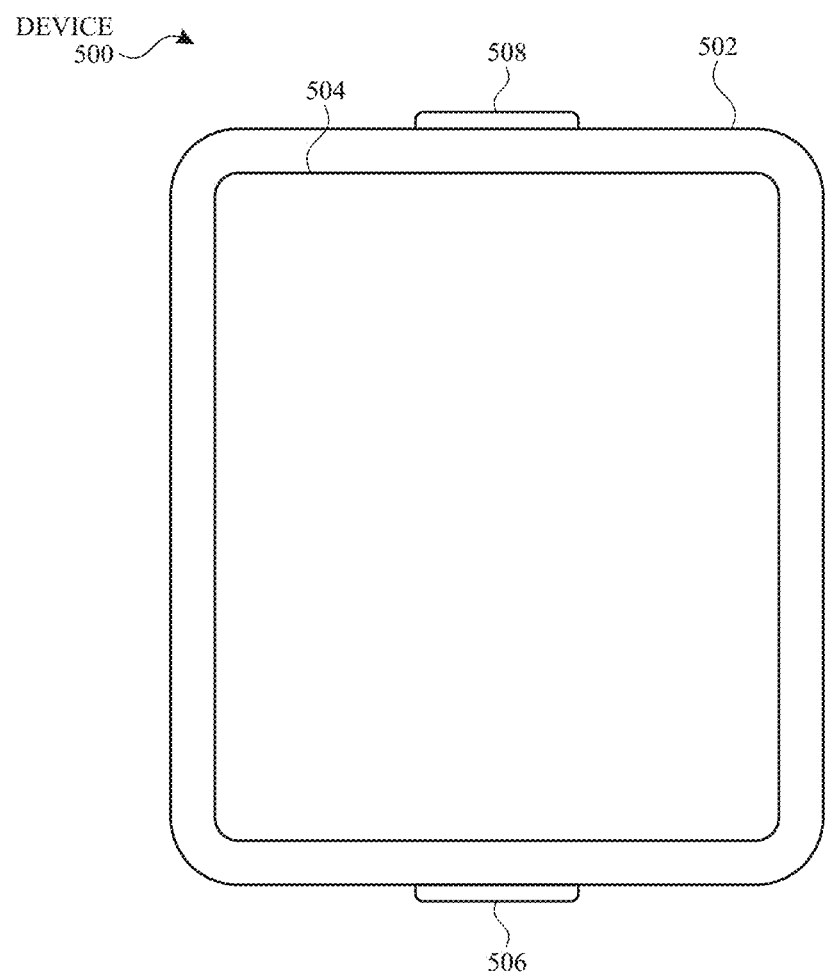
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
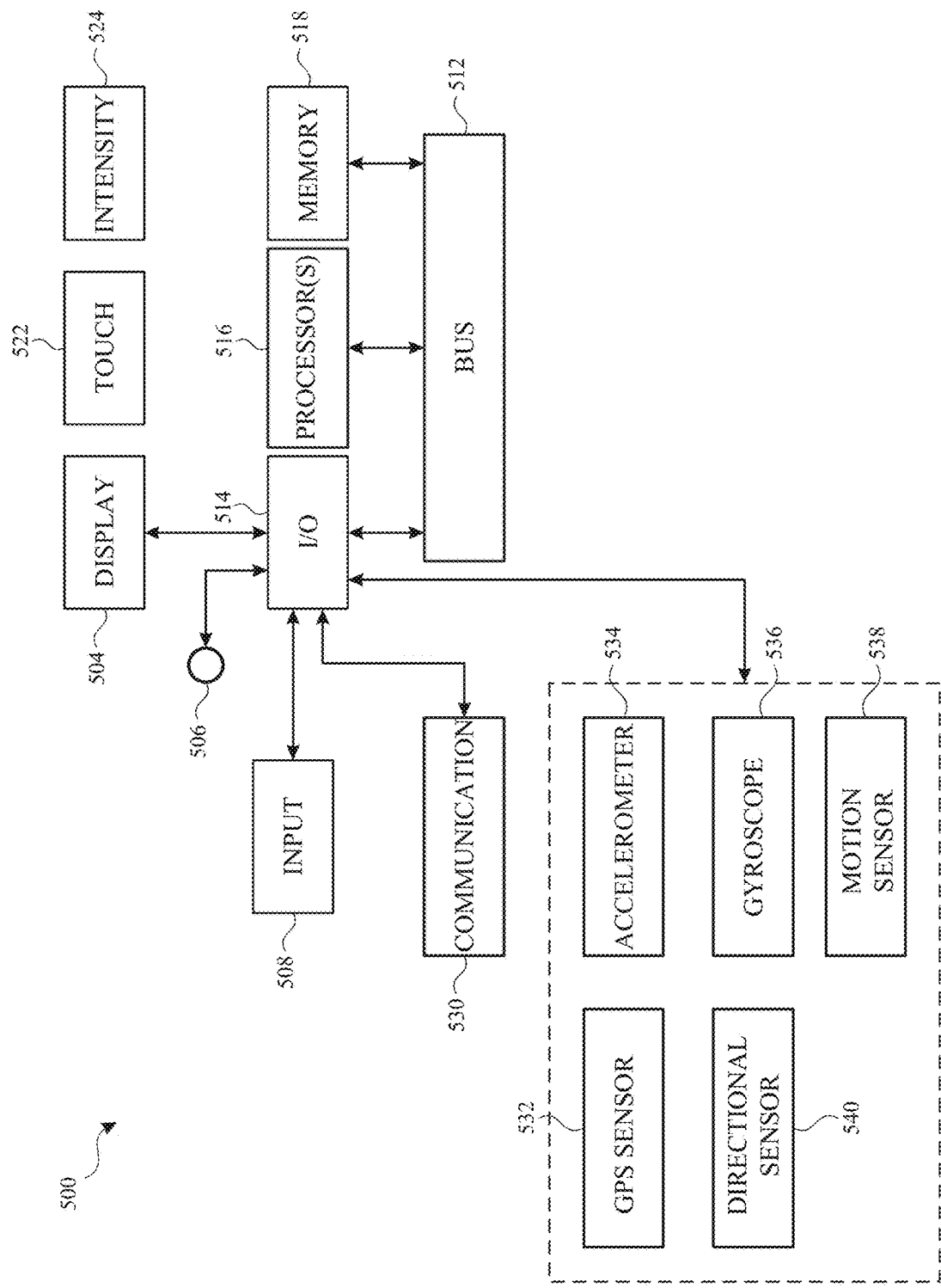
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6X illustrate exemplary user interfaces for managing an avatar on a lock screen, in accordance with some embodiments. The user interfaces in these figures are used to illustrate the processes described below, including the process in FIG. 7.

FIG. 6A illustrates a computer system 600 that is a laptop computer with display 600A, touch-sensitive surface (e.g., touchpad) 600B, keyboard 600C, and fingerprint sensor 600D. Computer system 600 optionally includes the same features as described above with respect to electronic devices 100, 300, and/or 500. At FIG. 6A, computer system 600 has been turned on and lock screen 602 is being displayed. Initially, lock screen 602 includes an indication 604 that computer system 600 is still loading an operating system. In some embodiments, the computer system does not process some types of inputs while the operating system is loading, such as inputs received at a pointing device (e.g., at touch-sensitive surface 600B and/or at a computer mouse). During at least a portion (e.g., a non-zero time period) of the loading phase, avatars 610-616 are displayed with static poses, meaning avatars 610-616 are not animated (e.g., until the operating system finishes loading). Avatars 610-614 represent user accounts configured on computer system 600. Guest avatar 616 represents a guest account that can be used to access some features of computer system 600 by a user that does not have an existing user account. Avatars 610-614 are displayed based on previously having been selected by the respective users to represent the users. The static poses of avatars 610-614 (illustrated in FIG. 6A) are poses that have been previously selected by the respective users as the pose to use to represent the users, such as in a contact card (e.g., 684 of FIG. 6X) of the user and/or in instant messaging conversations (e.g., 682 of FIG. 6X) in which the user is a participant, as will be described in further detail with respective to FIG. 6X.

For example, John has previously selected avatar 610 to represent his user account (e.g., selected when the user account was created). Additionally, John selected a particular pose of avatar 610 to represent his user account, as shown in the static pose of John's avatar 610 at FIG. 6A. Similarly, Jane and Sam have previously selected avatars 612 and 614 to represent them, respectively. Jane and Sam have also previously selected the particular poses of avatars 612 and 614 to represent them, as shown in the static poses of Jane's avatar 612 and Sam's avatar 614 in FIG. 6A.

Figure 6B:
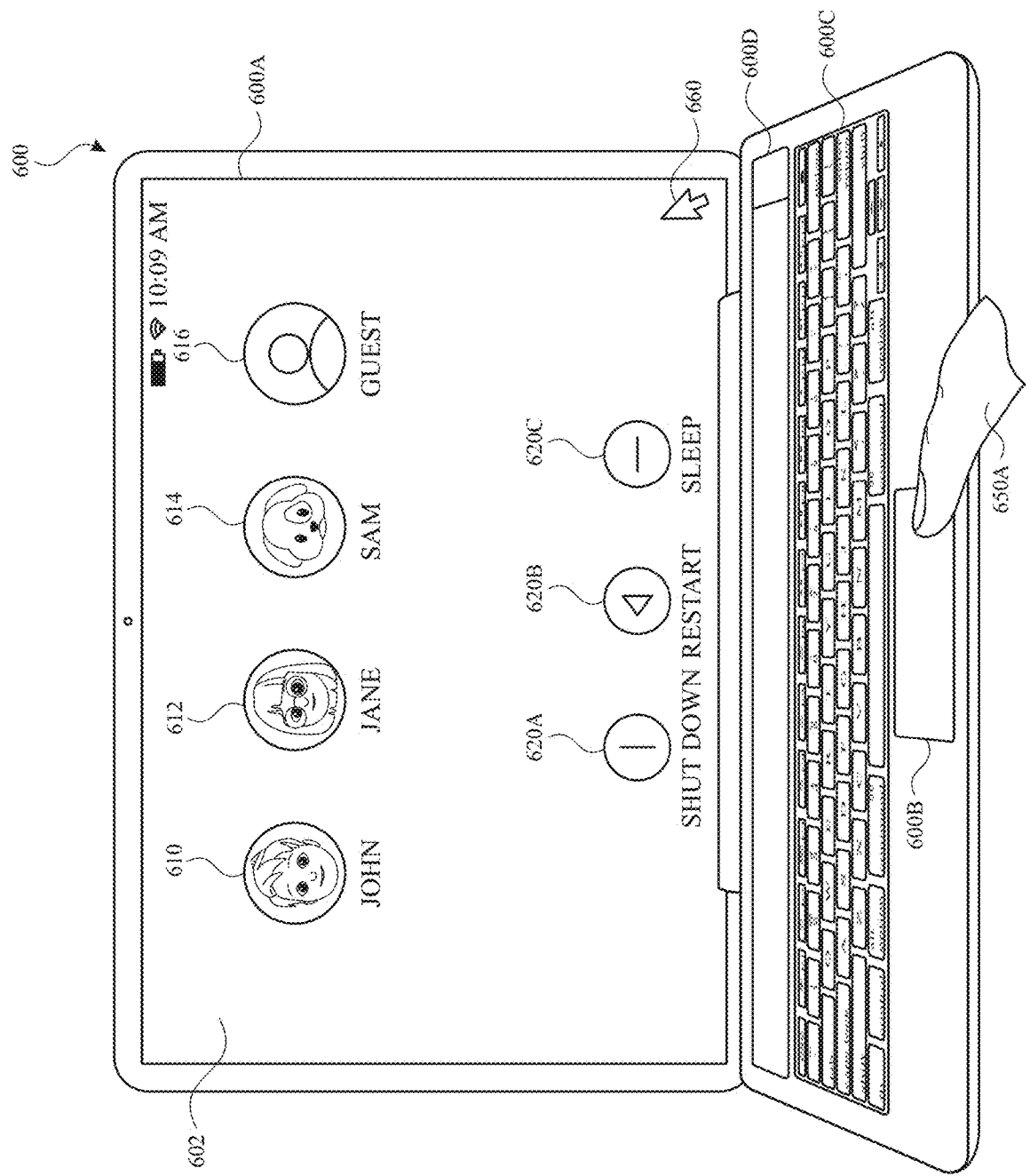

At FIG. 6B, after the operating system of computer system 600 has loaded, avatars 610-614 are animated. Computer system 600 displays a smooth transition between avatars 610-614 of FIG. 6A when they are static and avatars 610-614 when they are animated, such as by centering the static avatar in the respective circles (where the circle does not move during the smooth transition) and cross-fading between the static and animated versions of the respective avatars 610-614. Avatars 610-614 are animated with a three dimensional appearance, with the animations includes changes in facial expression, shape, location, size, and/or rotation (one, two, or three axes) of the avatar. At FIG. 6B, the operating system of computer system 600 has loaded and no further user input has been received at the system. As a result, at FIG. 6B, avatars 610-614 cycle through various animations to indicate to the user that the avatars can be selected to log into a respective user account. Additionally, at FIG. 6B, computer system 600 displays shutdown option 620A, restart option 620B, and sleep option 620. Shutdown option 620A, when selected, causes computer system 600 to shut down. Restart option 620B, when selected, causes computer system 600 to restart. Sleep option 620, when selected, causes computer system 600 to enter a low power mode.

Throughout FIGS. 6B-6K, although avatars 610-614 are animated at the same time, computer system 600 manages the animations of avatars 610-614 such that they do not concurrently perform the same animation. Guest avatar 616 is static (e.g., not animated, and/or maintains the same size and position) throughout FIGS. 6A-6G and 6I-6K.

Figure 6C:
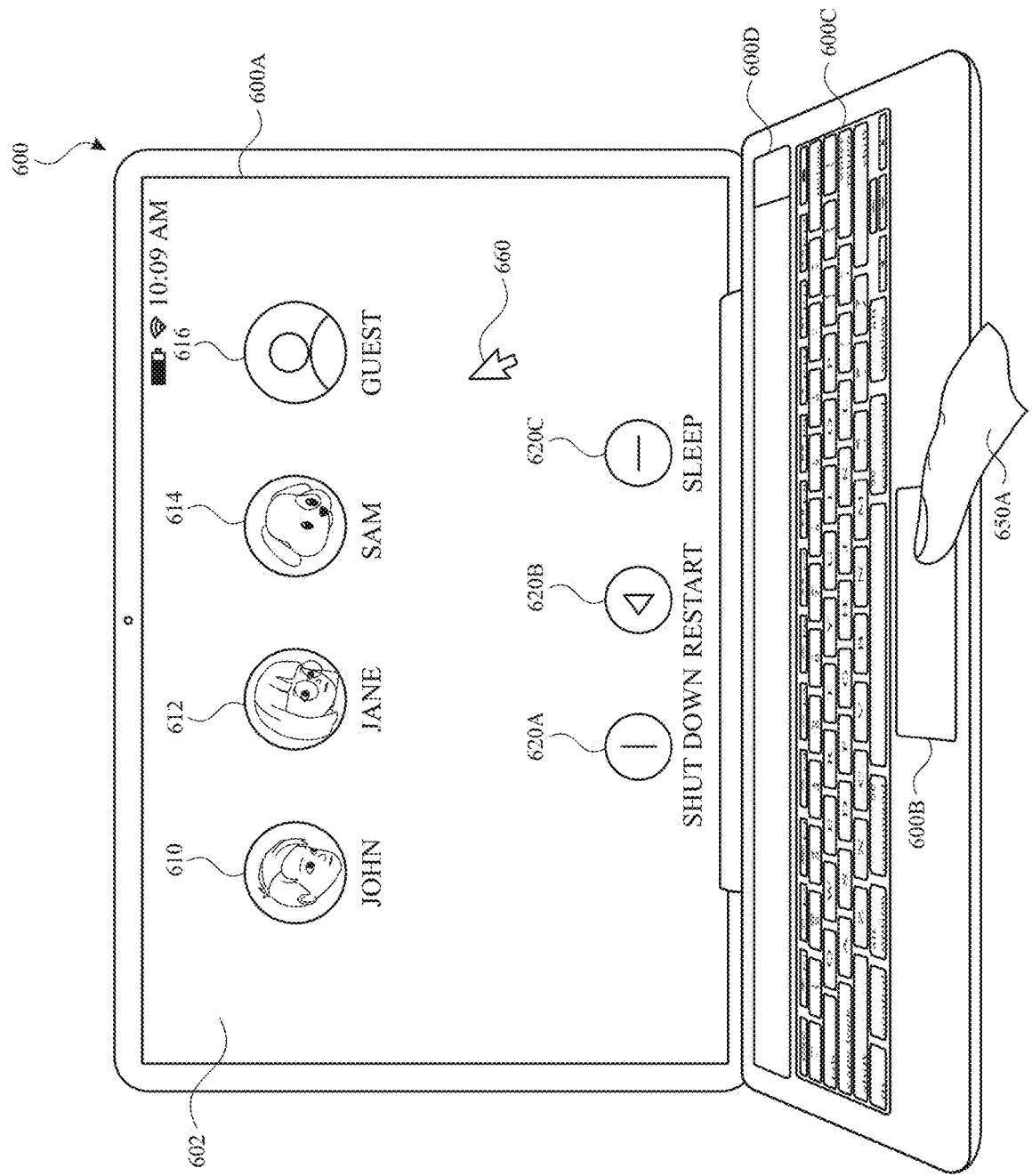
Figure 6D:
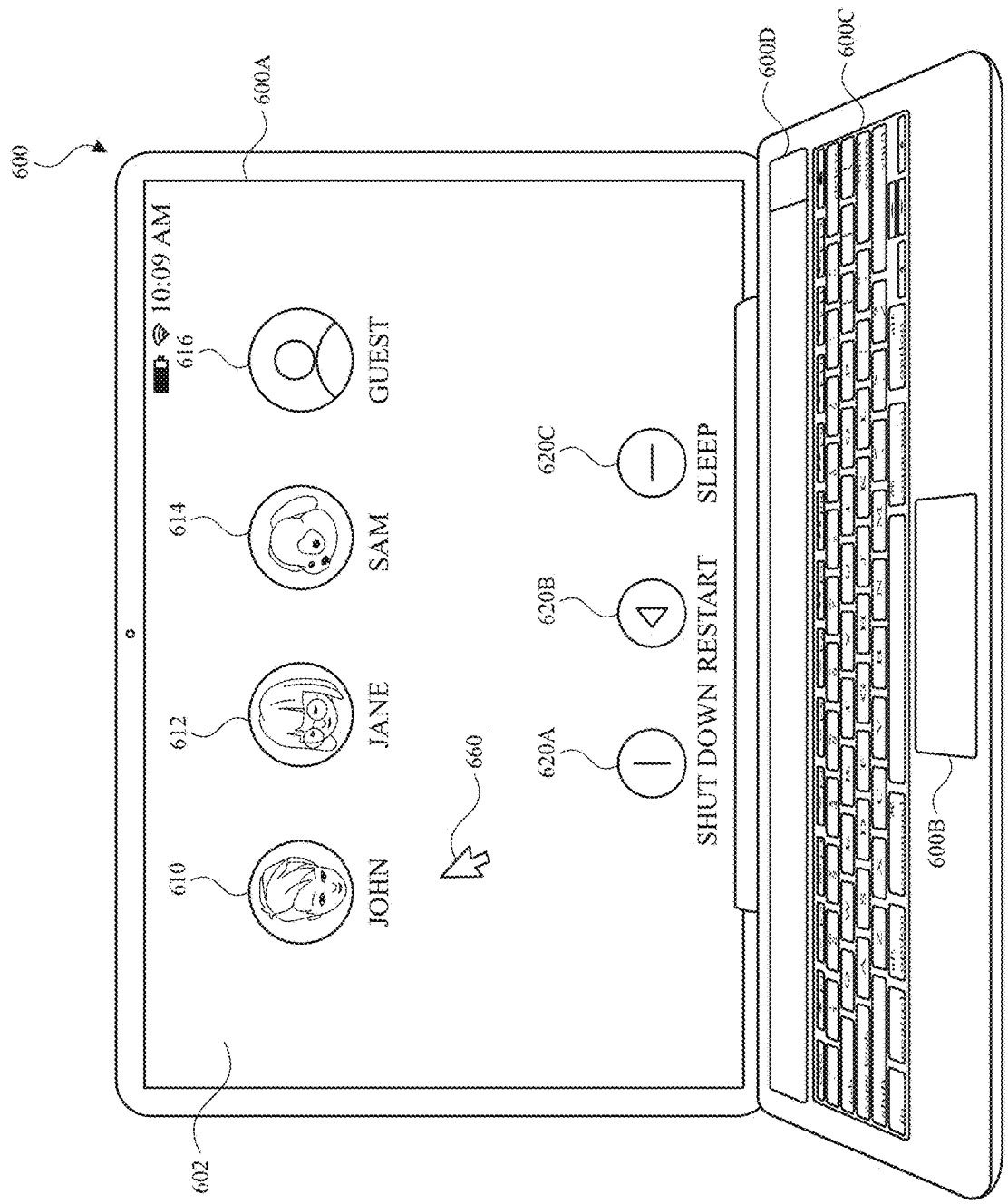

At FIG. 6B, computer system 600 detects a first pointer-movement input (e.g., swipe gesture 650A at touch sensitive surface 600B or a mouse movement). In response to detecting the first pointer-movement input, computer system 600 changes the position of cursor 660 on display 600A, as shown in FIGS. 6B-6D. As cursor 660 begins to move across lock screen 602, avatars 610-614 animate to look in the direction of the cursor, such as by turning their head and/or moving their eyes. This provides the user with feedback that computer system 600 has received user input and indicates to the user where the cursor is located on display 600A and/or lock screen 602. As cursor 660 moves on display 600A from the position in FIG. 6B to that of FIG. 6C and then to that of FIG. 6D, avatars 610-614 continue to animate to look in the direction of cursor 660 in conjunction with the movement of cursor 660. The movement of cursor 660 is based on, e.g., the movement of swipe gesture 650A or movement of a mouse (or other pointing device, e.g., 350) in communication with computer system 600.

Figure 6E:
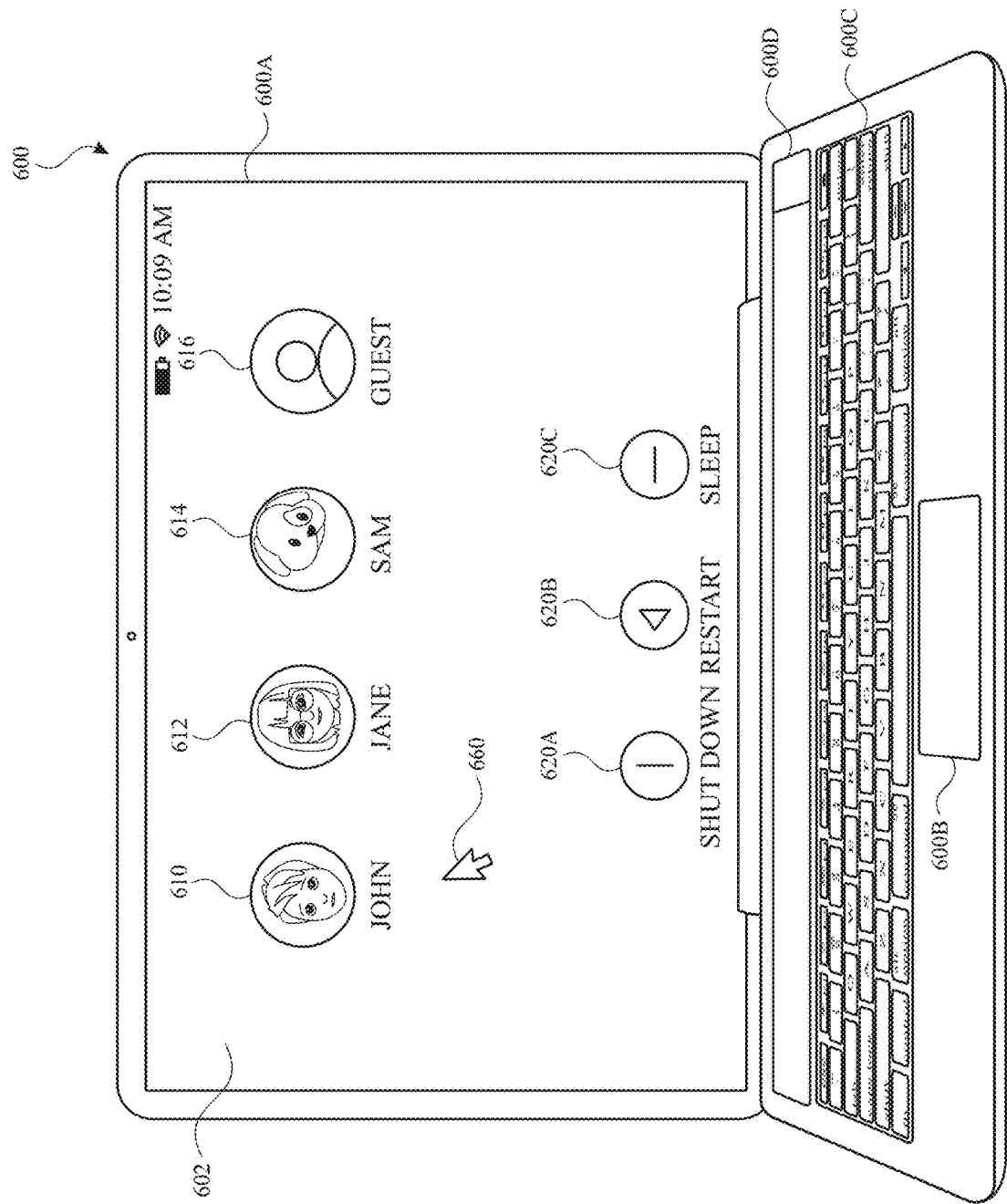

At FIG. 6E, computer system 600 has stopped receiving inputs at touch sensitive surface 600B for a first predetermined amount of time, such as for 5 seconds or 10 seconds. As a result, avatars 610-614 cease to look in the direction of the cursor while continuing to animate while waiting for user input. The animation while waiting for user input includes, for example, avatars 610-614 looking around, bobbing their heads, and/or smiling. In some embodiments, the waiting animation includes cycling through repetitive animations with unique animations randomly interspersed within the repetitive animations. During these animations of waiting for user input, avatars 610-614 are animated at the same time, but computer system 600 selects the animations of avatars 610-614 so that they do not concurrently perform the same animation. In some embodiments, the same movements are performed by avatars 610-614 as part of the waiting animation, but at different times.

Figure 6F:
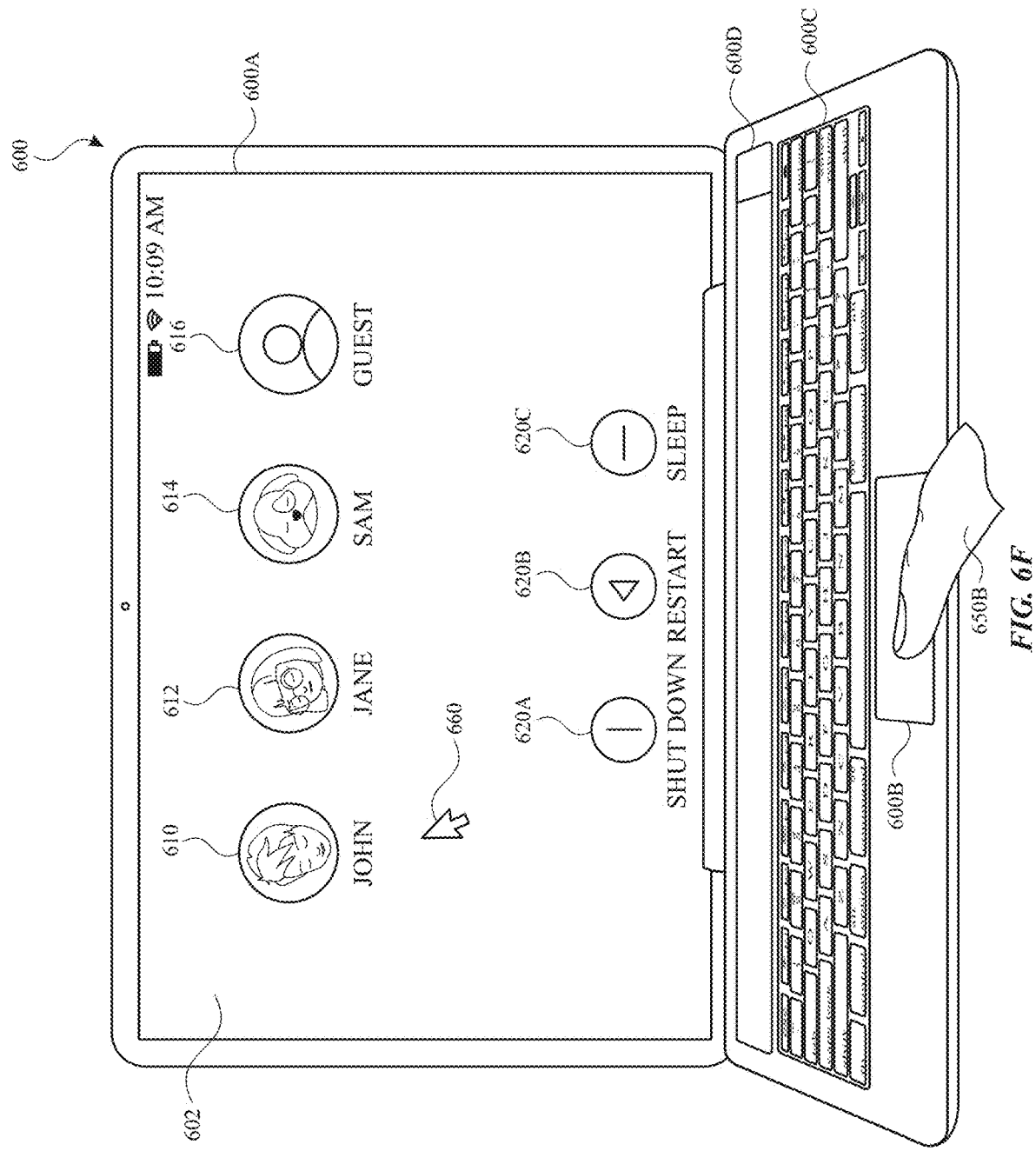

At FIG. 6F, computer system 600 has continued to not receive user inputs (e.g., at touch-sensitive surface 600B, at keyboard 600C, and at fingerprint sensor 600D) since the first pointer-movement input in FIGS. 6B-6C (e.g., swipe gesture 650A) for a second predetermined amount of time (longer than the first predetermined amount of time), such as for 1 minute or 2 minutes. Cursor 660 has remained in the same position in FIGS. 6D-6F. As a result of not having received user inputs for the second predetermined amount of time, avatars 610-614 animate to sleeping appearances, as shown in FIG. 6F. In some embodiments, the sleeping appearances include closed eyes, though avatars 610-614 optionally continue to animate with different movements (e.g., moving their heads with eyes closed and/or shifting from side to side).

Figure 6G:
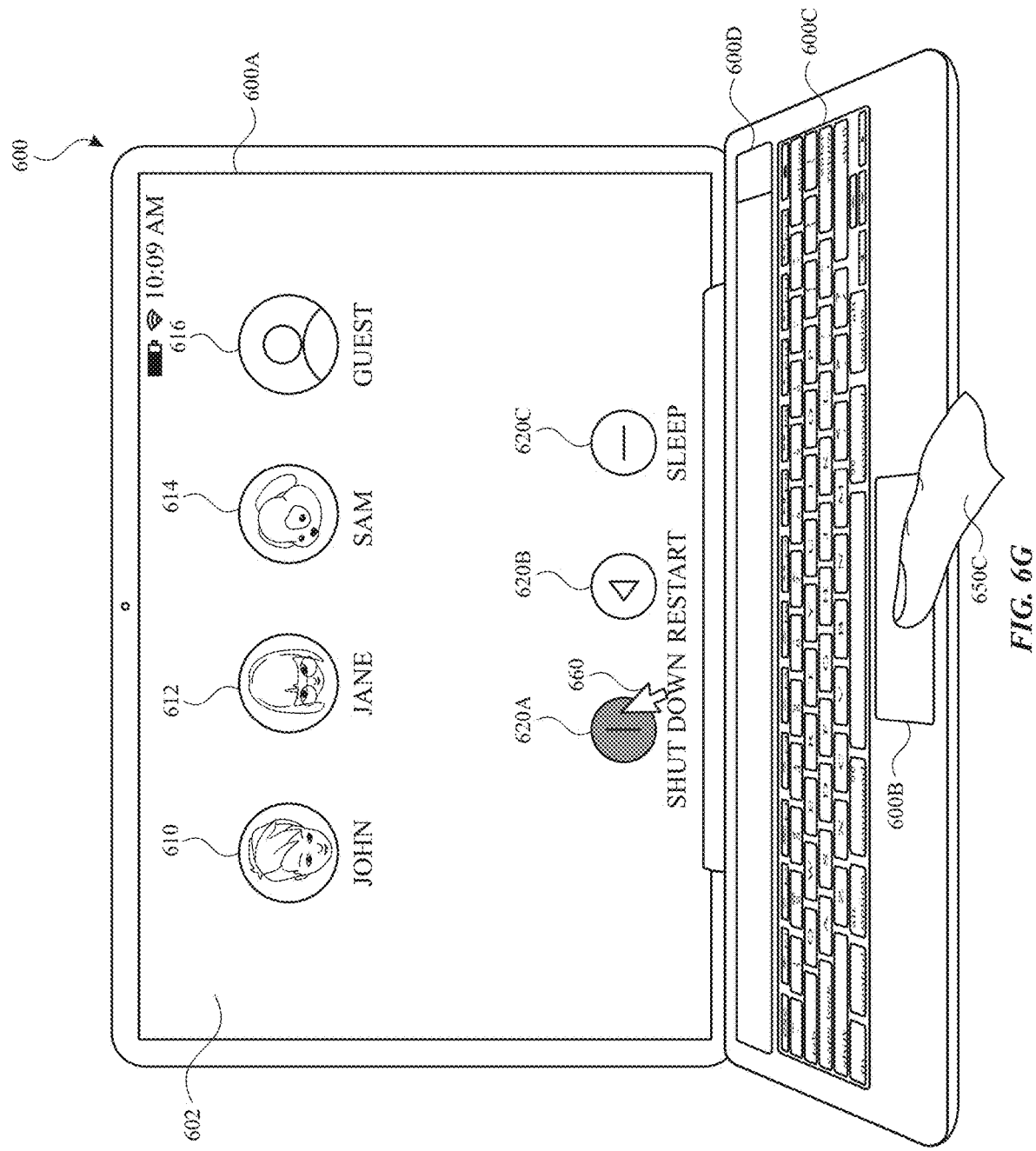

At FIG. 6F, while avatars 610-614 have varying sleeping appearances, computer system 600 begins to detect a second pointer-movement input (e.g., swipe gesture 650B on touch-sensitive surface 600B or movement of a mouse). In response to detecting the second pointer-movement input, cursor 660 moves across lock screen 602. Avatars 610-614 look in the direction of cursor 660 and follow cursor 660 as it moves across lock screen 602, as shown in FIG. 6G. As further illustrated in FIG. 6G, swipe gesture 650B causes cursor 660 to move to shutdown option 620A, causing shutdown option 620A to change color to reflect that focus has been placed on shutdown option 620A. The direction in which each of avatars 610-614 is looking at cursor 660 differs because of their different respective positions on lock screen 602.

Figure 6H:
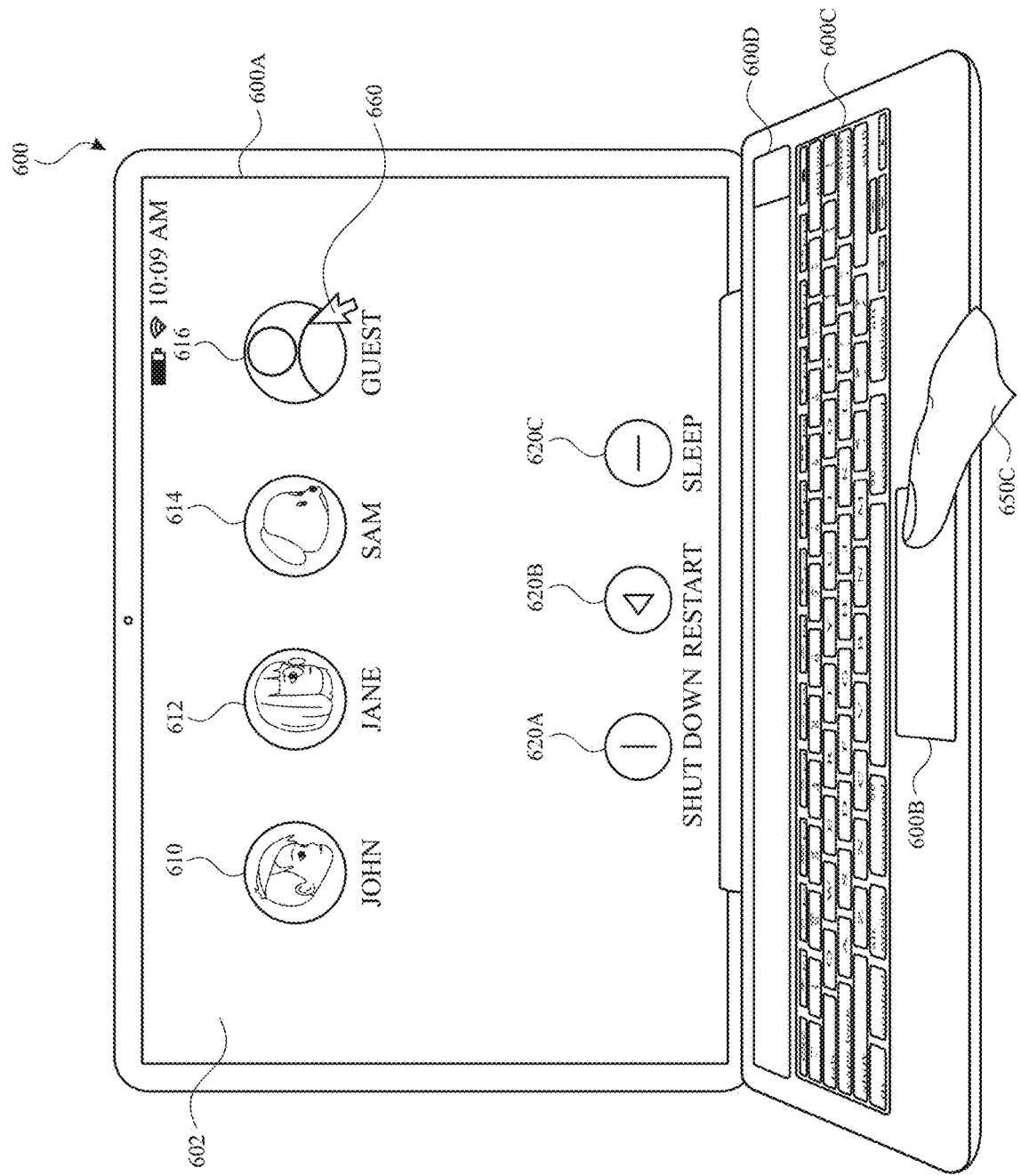

At FIG. 6G, computer system 600 begins to detect a drag input (e.g., swipe gesture 650C or mouse movement) on touch-sensitive surface 600B, which moves cursor 660 to guest avatar 616, as shown in FIG. 6H. At FIG. 6H, because the focus of cursor 660 is on guest avatar 616, guest avatar 616 optionally enlarges (e.g., as compared to FIG. 6G). Avatars 610-614 do not have the focus of cursor 660 and continue to look in the direction of cursor 660 on lock screen 602 based on cursor 660 moving.

Figure 6I:
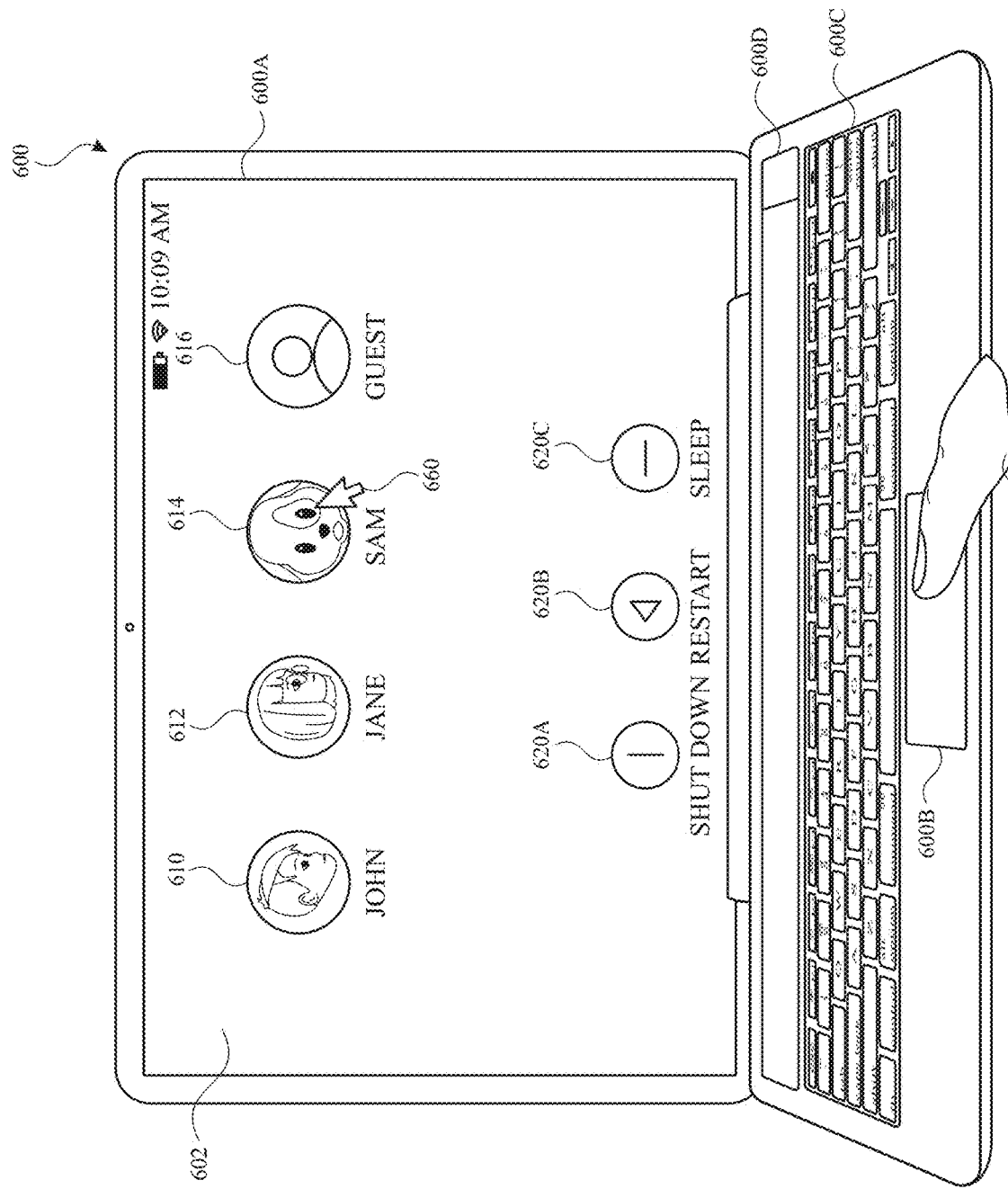

At FIG. 6H, computer system 600 continues to detect the drag input (e.g., swipe gesture 650C or mouse movement) on touch-sensitive surface 600B, which moves cursor 660 to Sam's avatar 614, as shown in FIG. 6I. At FIG. 6I, because the focus of cursor 660 is no longer on guest avatar 616, guest avatar 616 reduces in size. Because the focus of cursor 660 is on Sam's avatar 614, Sam's avatar 614 becomes more attentive and/or more active, and optionally becomes larger, as compared to when the focus of cursor 660 was not on Sam's avatar 614. The animated expression of Sam's avatar 614 also changes to one of excitement. Sam's avatar 614 stops looking at or following cursor 660 when the focus of cursor 660 is on Sam's avatar 614. Avatars 610-612 do not have the focus of cursor 660 and continue to look in the direction of cursor 660 on lock screen 602 based on cursor 660 moving.

At FIG. 6I, computer system 600 continues to detect a drag input (e.g., swipe gesture 650C or mouse movement) on touch-sensitive surface 600B, which moves cursor 660 from Sam's avatar 614 to Jane's avatar 612, as shown in FIG. 6J. At FIG. 6J, because the focus of cursor 660 is no longer on Sam's avatar 614, Sam's avatar 614 becomes less attentive, and optionally gets smaller and less animated (e.g., less movement as compared to when the focus was on Sam's avatar 614). Because the focus of cursor 660 is on Jane's avatar 612, Jane's avatar 612 becomes more attentive and/or more active, and optionally becomes larger. The animated expression of Jane's avatar 612 also changes to one of excitement. Jane's avatar 612 stops looking at or following cursor 660 when the focus of cursor 660 is on Jane's avatar 612. Avatars 610 and 614 do not have the focus of cursor 660 and continue to look in the direction of cursor 660 on lock screen 602 based on cursor 660 moving.

Figure 6K:
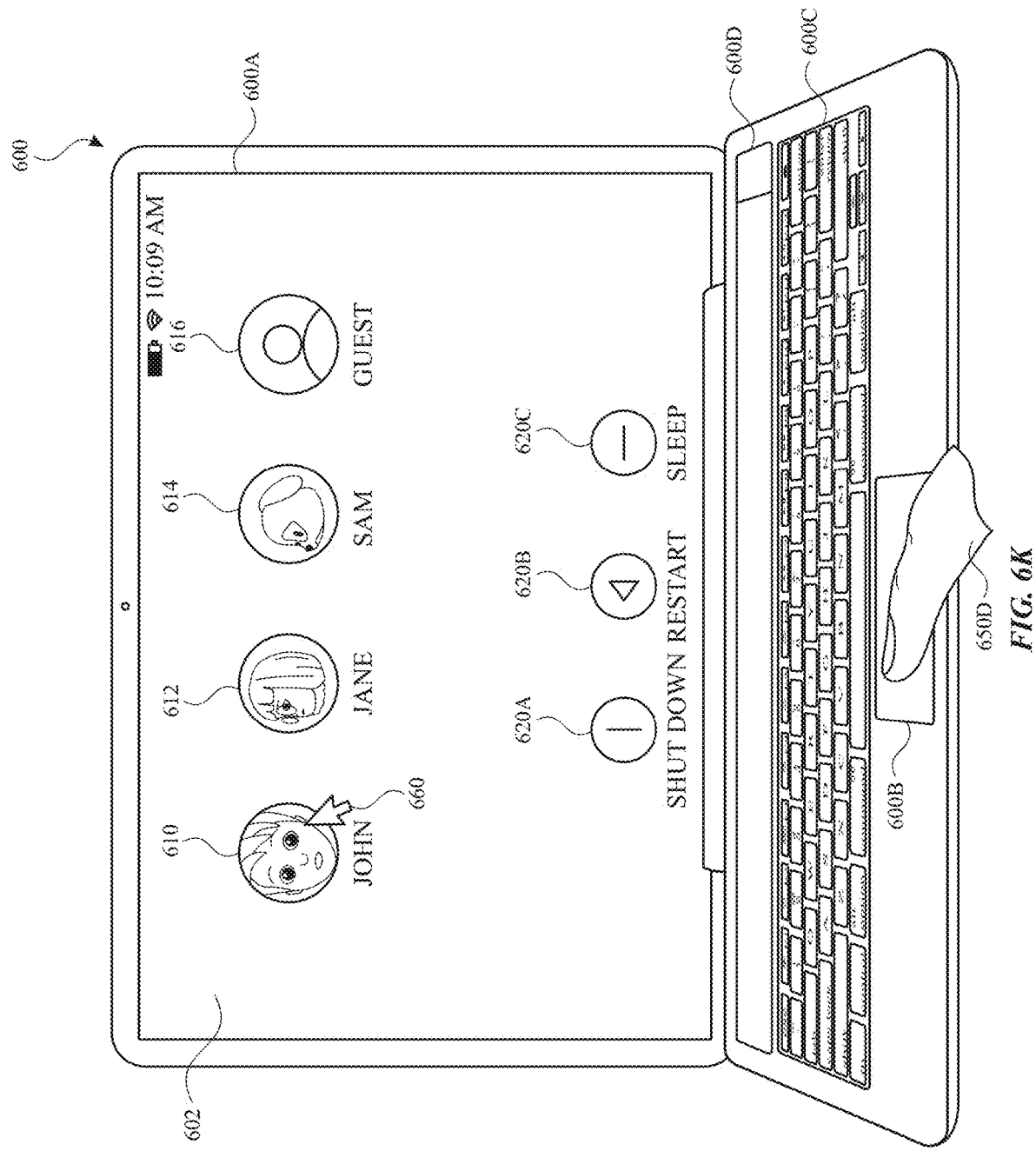
Figure 6L:
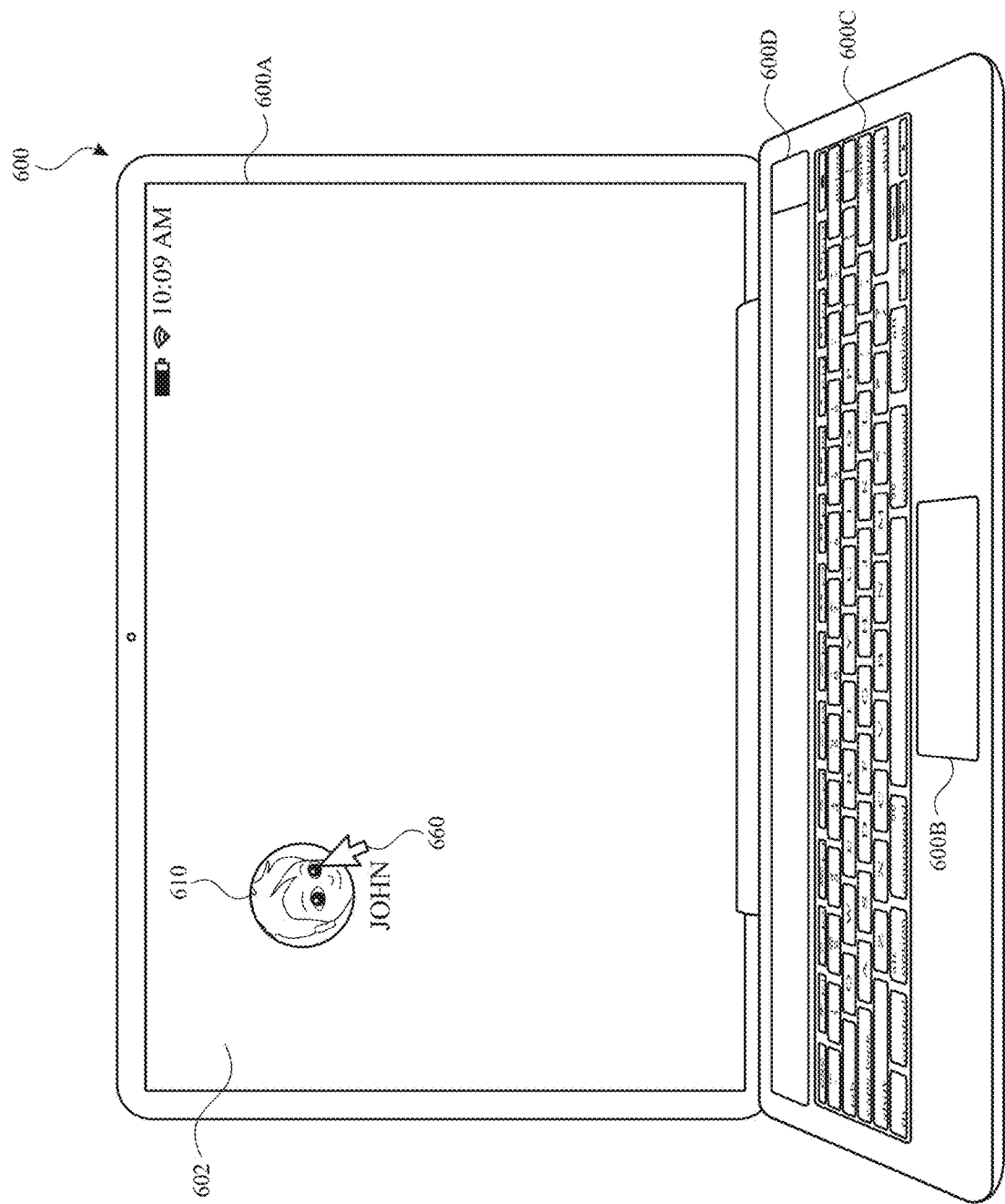
Figure 6M:
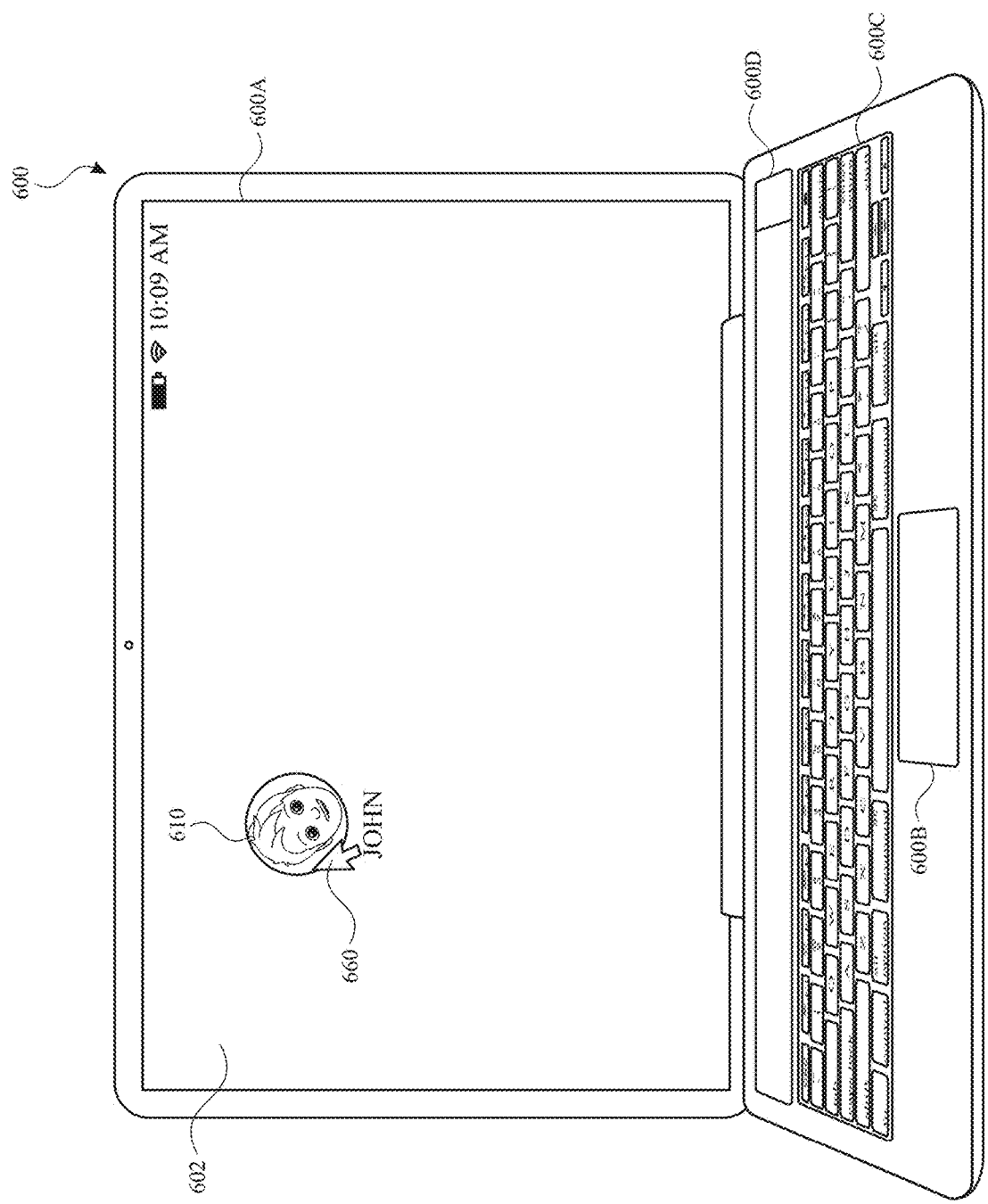
Figure 6N:
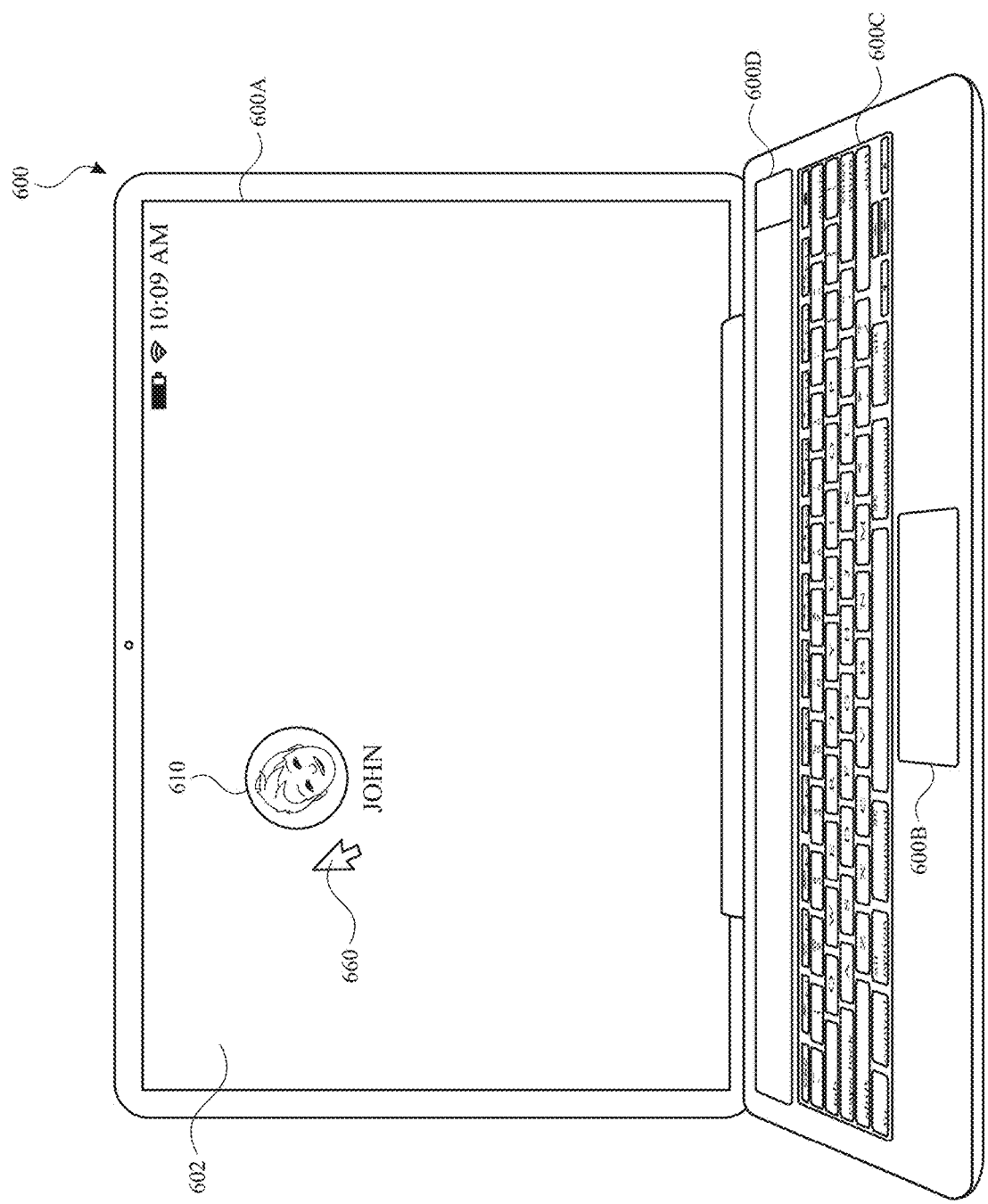

At FIG. 6J, computer system 600 continues to detect a drag input (e.g., swipe gesture 650C or mouse movement) on touch-sensitive surface 600B, which moves cursor 660 from Jane's avatar 612 to John's avatar 610, as shown in FIG. 6K. At FIG. 6K, because the focus of cursor 660 is no longer on Jane's avatar 612, Jane's avatar 612 becomes less attentive, and optionally gets smaller and less animated (e.g., less movement as compared to when the focus was on Jane's avatar 612). Because the focus of cursor 660 is on John's avatar 610, John's avatar 610 becomes more attentive and/or more active (more animated, more movement) (e.g., as compared to avatars 612-614 at FIG. 6K, as compared to John's avatar 610 when the focus was not on John's avatar 610), and optionally becomes larger. The animated expression of John's avatar 610 also changes to one of excitement. John's avatar 610 stops looking at or following cursor 660 when the focus of cursor 660 is on John's avatar 610. Avatars 612 and 614 do not have the focus of cursor 660 and continue to look in the direction of cursor 660 on lock screen 602 based on cursor 660 moving.

At FIG. 6K, while the focus of cursor 660 is on John's avatar 610, computer system 600 detects a selection input (e.g., tap gesture 650D on touch-sensitive surface 600B or a mouse click) to select John's avatar 610. In response to detecting the selection input (e.g., tap gesture 650D or a mouse click), the expression of John's avatar changes to reflect the selection and computer system 600 ceases to display (e.g., by fading out and/or by sliding off of the display) avatars 612-616 and options 620A-620C. In response to detecting the selection input selecting John's avatar 610 (and without receiving and/or requiring further users inputs), John's avatar moves (e.g., slides, translates) toward a central location (e.g., a predefined location) of lock screen 602, as illustrated in FIGS. 6L-6O. John's avatar is animated (e.g., using a physics model) during the movement to the central location to reflect the movement, such as by causing a tilting of the head of John's avatar 610 in one direction (e.g., to the right) as the avatar accelerates (e.g., at FIGS. 6M and 6N) and tilting of the head of John's avatar 610 in another direction (e.g., an opposite direction, to the left) as the avatar decelerates to stop at the central location. Other features of John's avatar 610 also optionally reflect the movement, such as the hair of John's avatar moving.

Figure 6O:
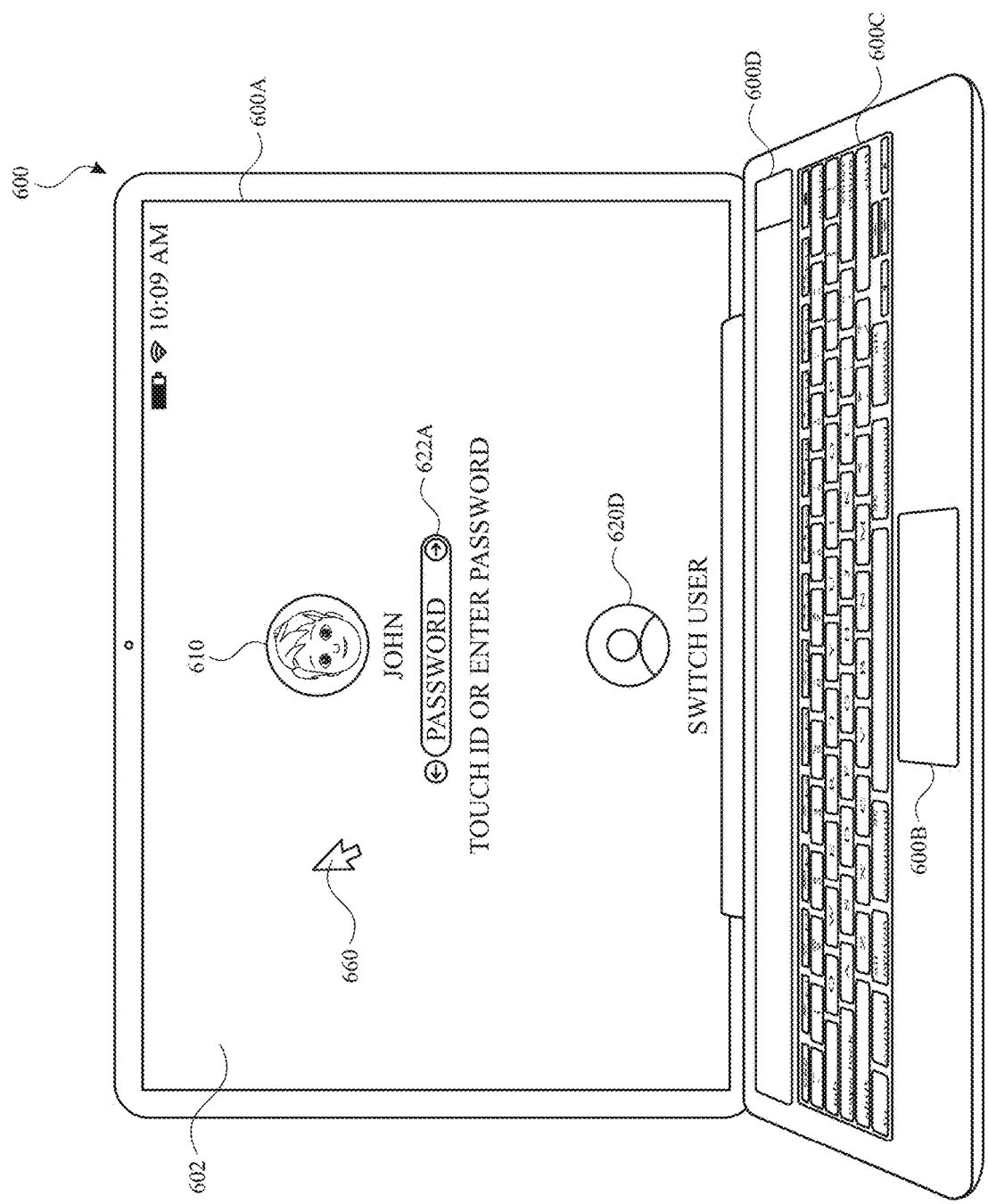

At FIG. 6O, John's avatar 610 is displayed at the central location, along with password entry field 622A and switch user option 620D. Password entry field 622A is configured to receive textual input for receiving a password for John's user account. Switch user option 620D, when selected, causes computer system 600 to re-display avatars 610-616, as in FIG. 6K, such that a new selection can be made and a password for a different account can be entered. In some embodiments, selection of switch user option 620D causes John's avatar to move (e.g., slide, translate) toward the original position on the left side of lock screen 602.

Figure 6P:
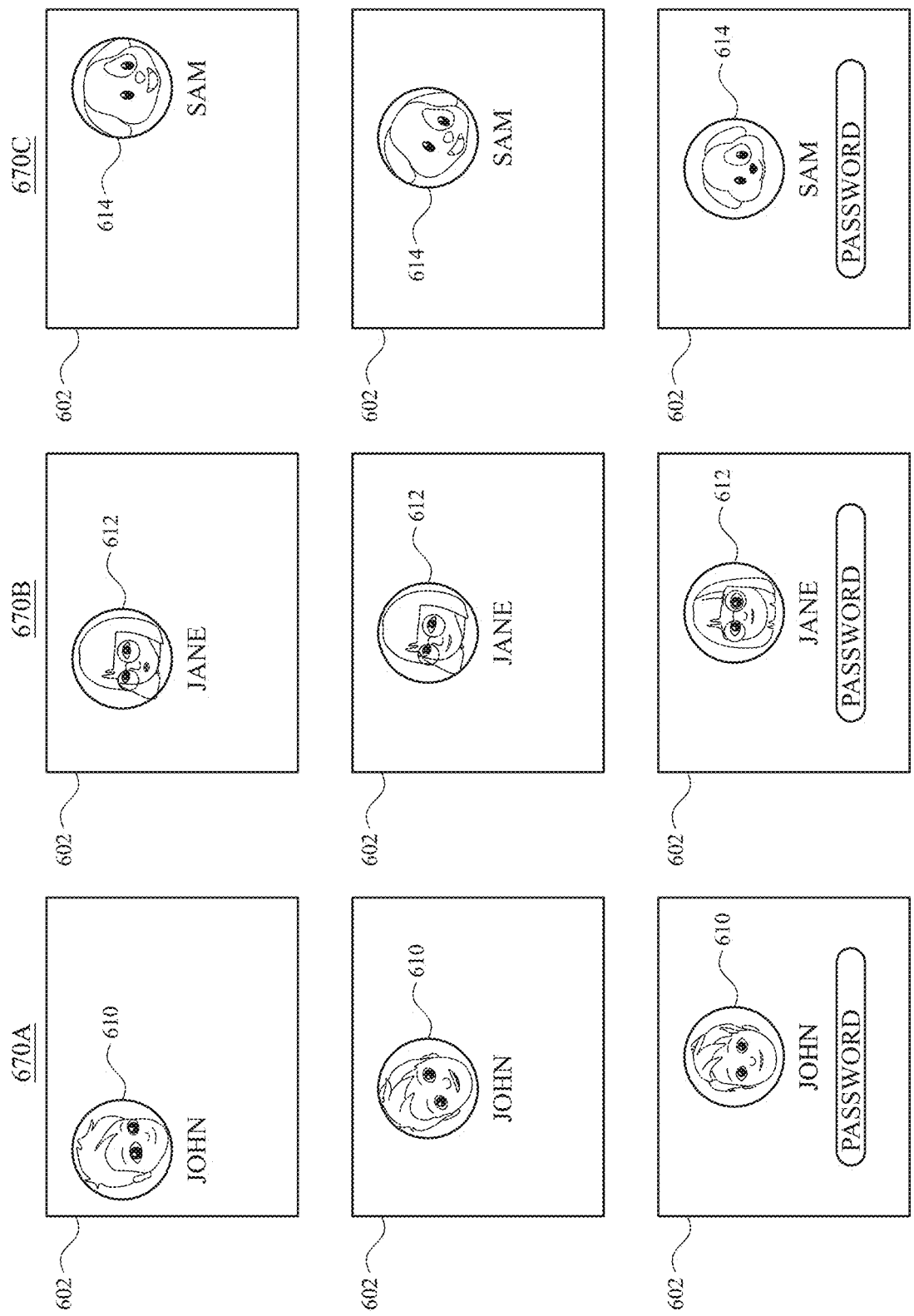
Figure 6R:
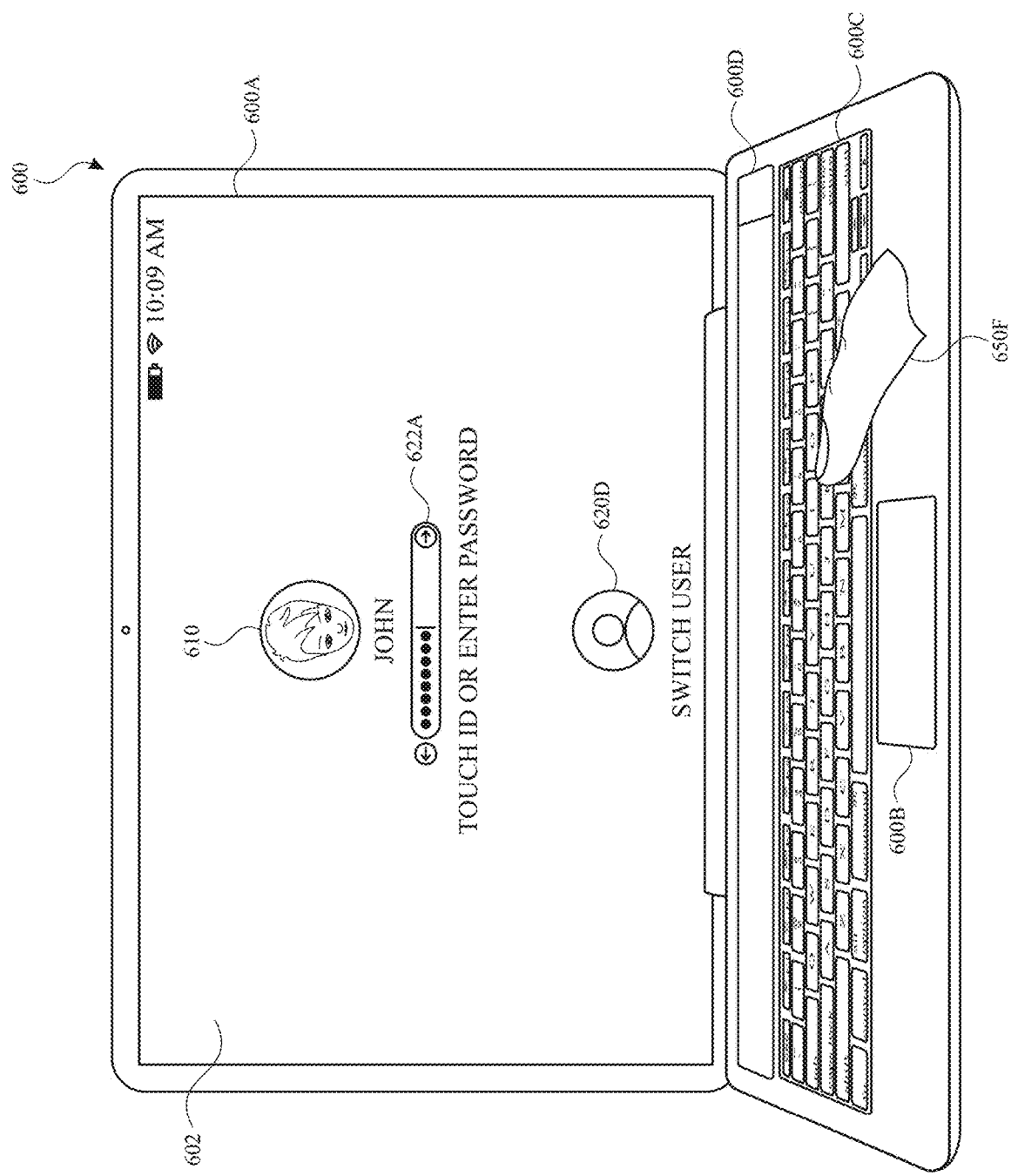

FIG. 6P illustrates exemplary animations when different avatars are selected. Left column 670A illustrates a timeline of John's avatar 610 moving in response to being selected, as explained above with respect to FIGS. 6K-6O. As illustrated in left column 670A of FIG. 6P, John's avatar 610 slides to the right to the central location, thereby causing the head of John's avatar 610 to tilt to the right as the avatar accelerates and, optionally, to the left as the avatar decelerates to stop at the central location. As John's avatar 610 slides to the right, the head of John's avatar 610 shifts slightly (e.g., to the left) relative to the circle around the head of John's avatar 610 (e.g., the head lags the movement of the circle). In some embodiments, the amount by which the avatar shifts relative to the boundary around the avatar and/or the speed with which the avatar shifts relative to the boundary around the avatar is determined based on how far the avatar is from the respective location it will be displayed once it is selected (e.g., when the password entry field is displayed). For example, the avatar shifts further and/or faster relative to the boundary if the avatar is further away from the respective location and shifts less far and/or slower relative to the boundary if the avatar is closer to the respective location.

As illustrated in center column 670B of FIG. 6P, had Jane's avatar 612 been selected, Jane's avatar 612 would also move (e.g., slide, translate) to the right to the central location, thereby causing the head of Jane's avatar 612 to tilt to the right as the avatar accelerates and, optionally, to the left as the avatar decelerates to stop at the central location. Because the starting location of Jane's avatar 612 is closer to the central location as compared to John's avatar 610, Jane's avatar 612 moves more slowly as compared to John's avatar 610 and Jane's avatar 612 includes less head tilt because of the reduced acceleration and deceleration.

As illustrated in right column 670C of FIG. 6P, had Sam's avatar 614 been selected, Sam's avatar 614 would move (e.g., slide, translate) to the left to the central location, thereby causing the head of Sam's avatar 614 to tilt to the left as the avatar accelerates and to the right as the avatar decelerates to stop at the central location. Because the starting location of Sam's avatar 614 is closer to the central location as compared to John's avatar 610, Sam's avatar 614 moves more slowly as compared to John's avatar 610 and Sam's avatar 614 includes less head tilt as compared to John's avatar 610 because of the reduced acceleration and deceleration. Based on being selected, John's avatar 610, Jane's avatar 612, and Sam's avatar 614 all move to the same central location (e.g., the predetermined location) to indicate which account has been selected, as shown in the bottom row of FIG. 6P, and the password entry field is displayed.

Returning to the example where the user has selected John's avatar 610, at FIG. 6Q, computer system 600 has received user input (e.g., voice input and/or gesture input at touch-sensitive surface 600B) corresponding to a request for a password hint. In response to receiving the user input corresponding to a request for a password hint, computer system 600 displays password hint 622B, which provides the user with one or more hints of the password for John's user account. In response to receiving the user input corresponding to a request for a password hint, computer system 600 animates John's avatar 610 with an animation that is specific to requests for hints, such as an animation of John's avatar 610 with an inquisitive appearance.

At FIG. 6Q, computer system 600 receives a selection input (e.g., tap gesture 650E at touch-sensitive surface 600B or a mouse click), corresponding to selection of password entry field 622A. In response to receiving the selection input corresponding to selection of password entry field 622A, password hint 622B ceases to be displayed and John's avatar 610 glances down at password entry field 622A, then animates back to a neutral pose (e.g., not looking down at password entry field 622A). At FIG. 6R, as computer system 600 receives keyboard user input 650F (e.g., via activation of characters of keyboard 600C) that causes entry of characters into password entry field 622A, John's avatar 610 glances down at password entry field 622A (e.g., continues to look down at password entry field 622A).

Figure 6S:
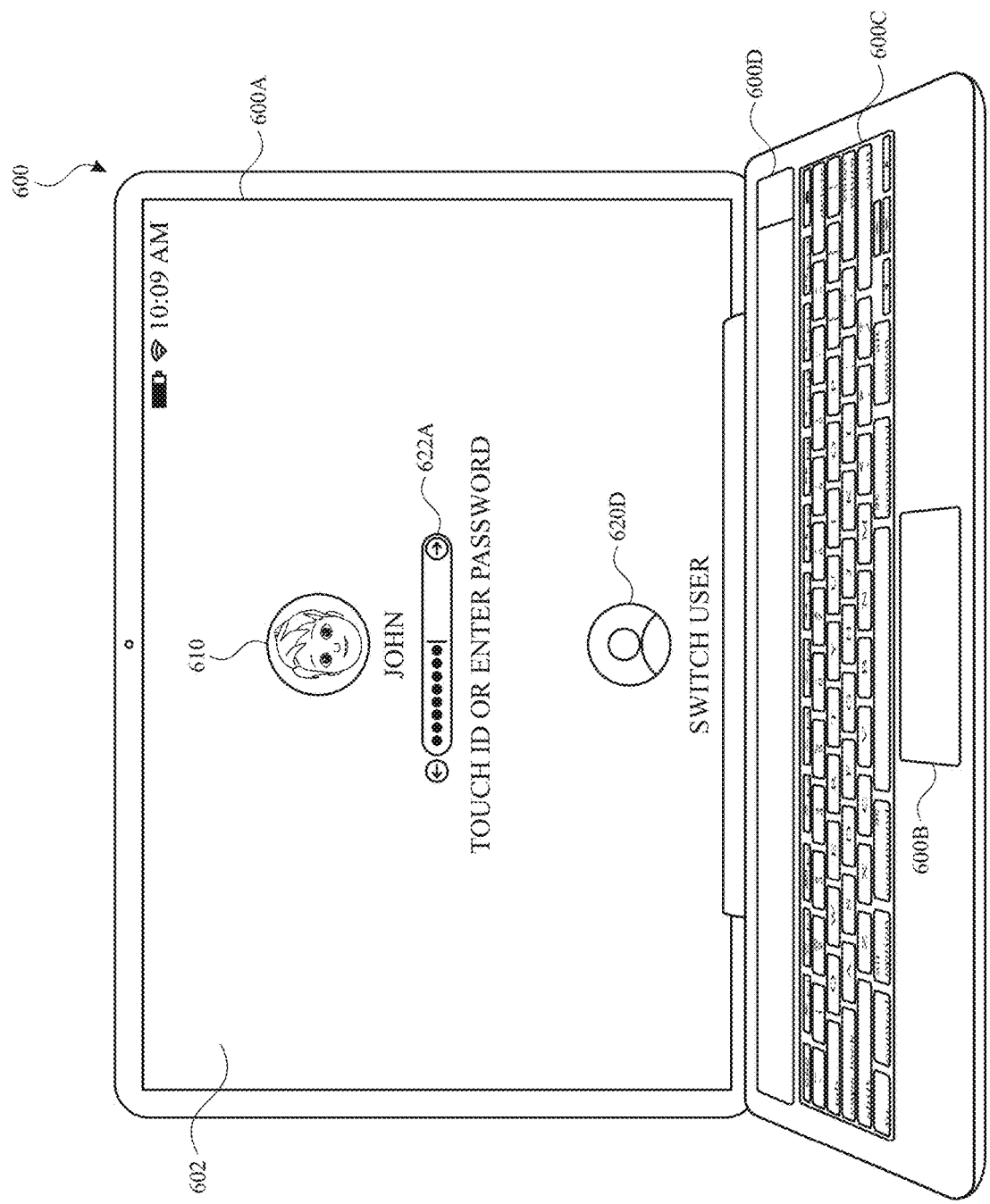

Subsequent to receiving keyboard user input 650F and in accordance with a determination that no characters have been entered into password entry field 622A for a third predetermined amount of time (e.g., 0.25 seconds, 0.5 seconds, 1 second, 2 seconds, 3 seconds, or 4 seconds), John's avatar 610 ceases to glance down at password entry field 622A and returns to a neutral pose, as shown in FIG. 6S. At FIG. 6T, computer system 600 has continued to not receive user inputs for a fourth predetermined amount of time (e.g., same as the first predetermined amount of time; 5 seconds, 7 seconds, or 10 seconds) and, in response, animates John's avatar 610 while waiting for user input. The animation of John's avatar 610 while waiting for user inputs includes, for example, John's avatar 610 looking around, bobbing his head, and/or smiling. In some embodiments, the waiting animation includes cycle through repetitive animations with unique animations randomly interspersed within the repetitive animations. In some embodiments, the animation of John's avatar 610 waiting at FIG. 6T (while John's avatar 610 has not been selected) is different from the animation of John's avatar 610 waiting at FIG. 6E (while John's avatar 610 has been selected) because computer system 600 is in a different state (selection state of John's avatar 610). Different animations of waiting based on the state of computer system 600 provides the user with feedback about the state of computer system 600.

Figure 6T:
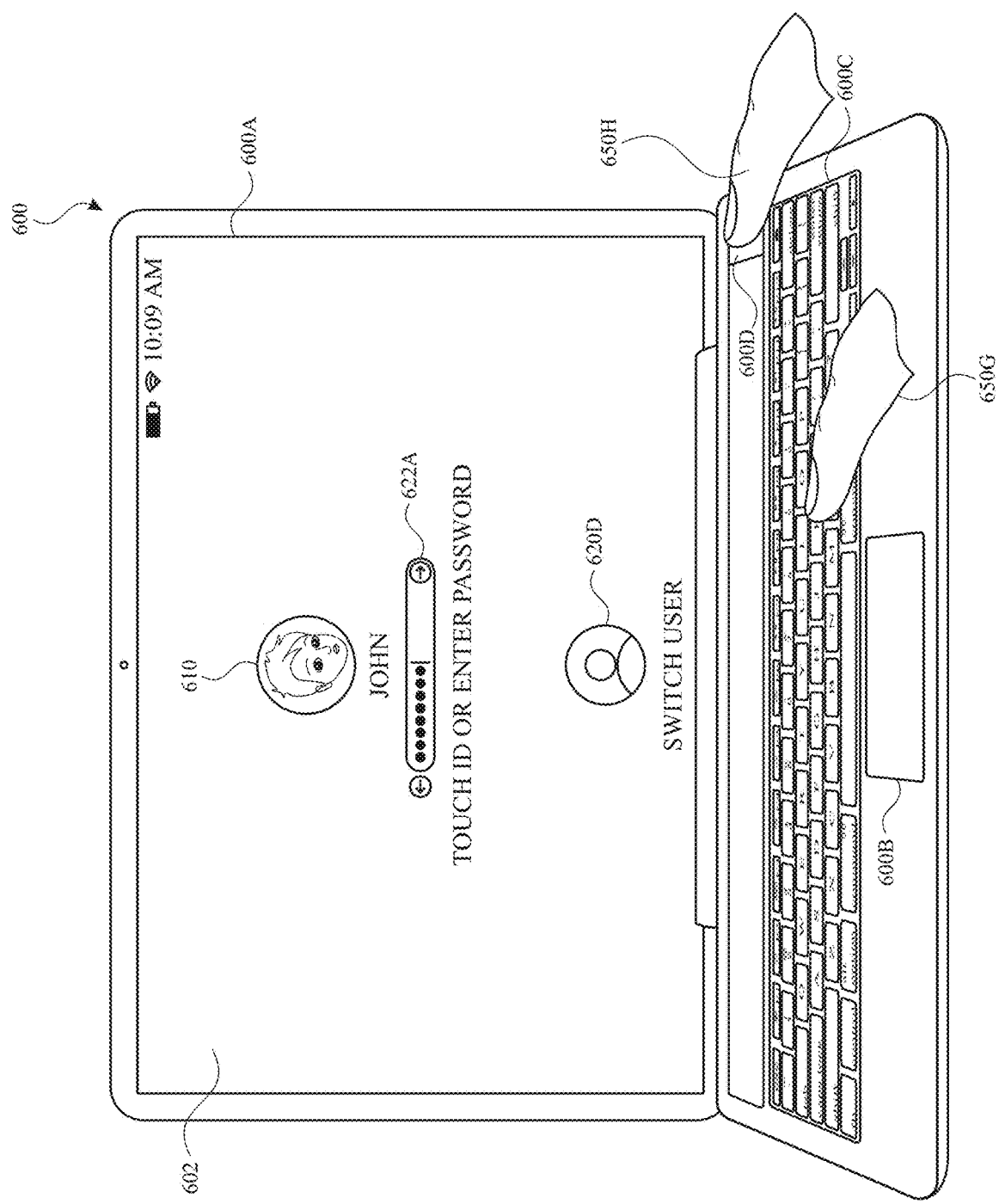
Figure 6U:
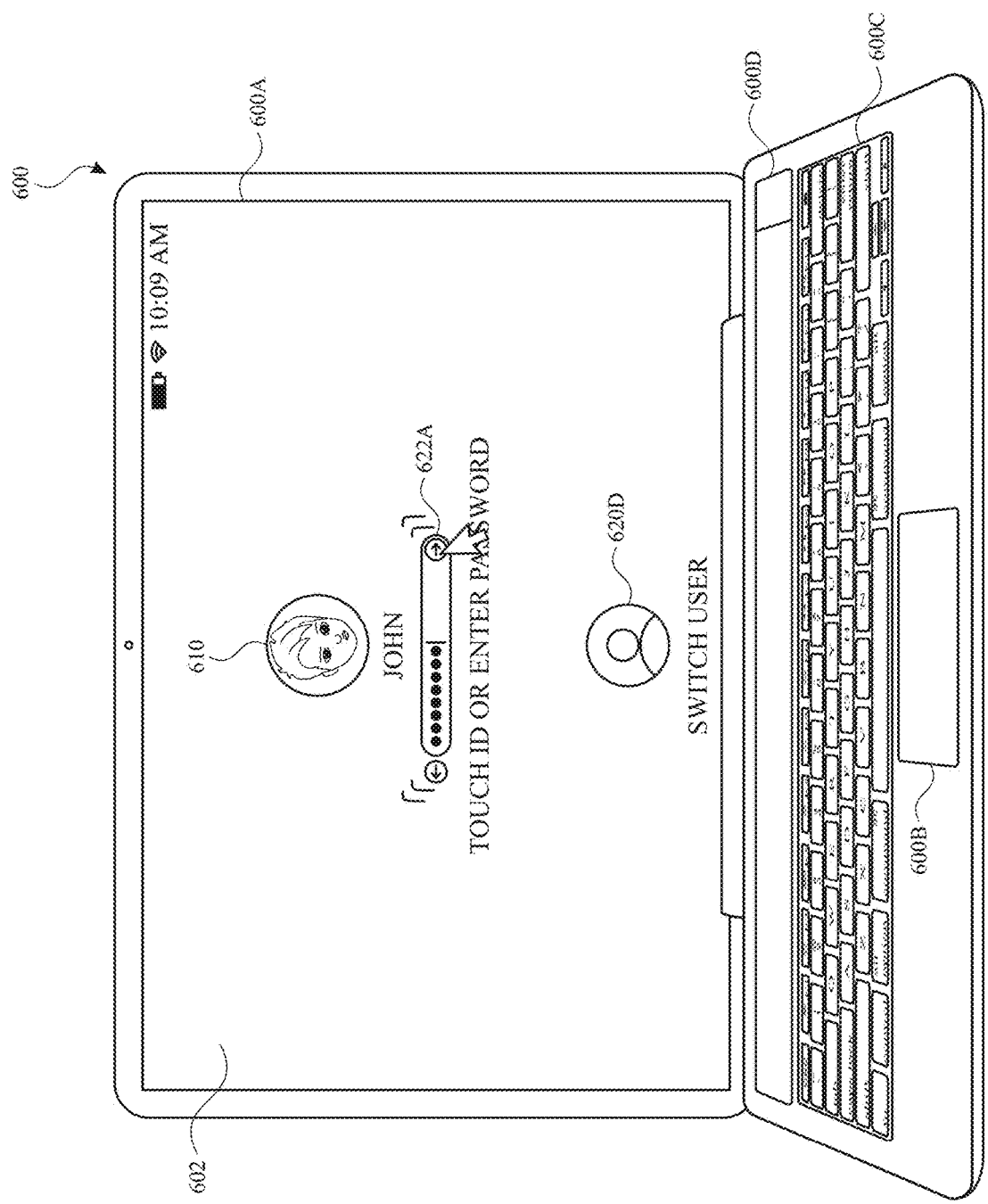
Figure 6V:
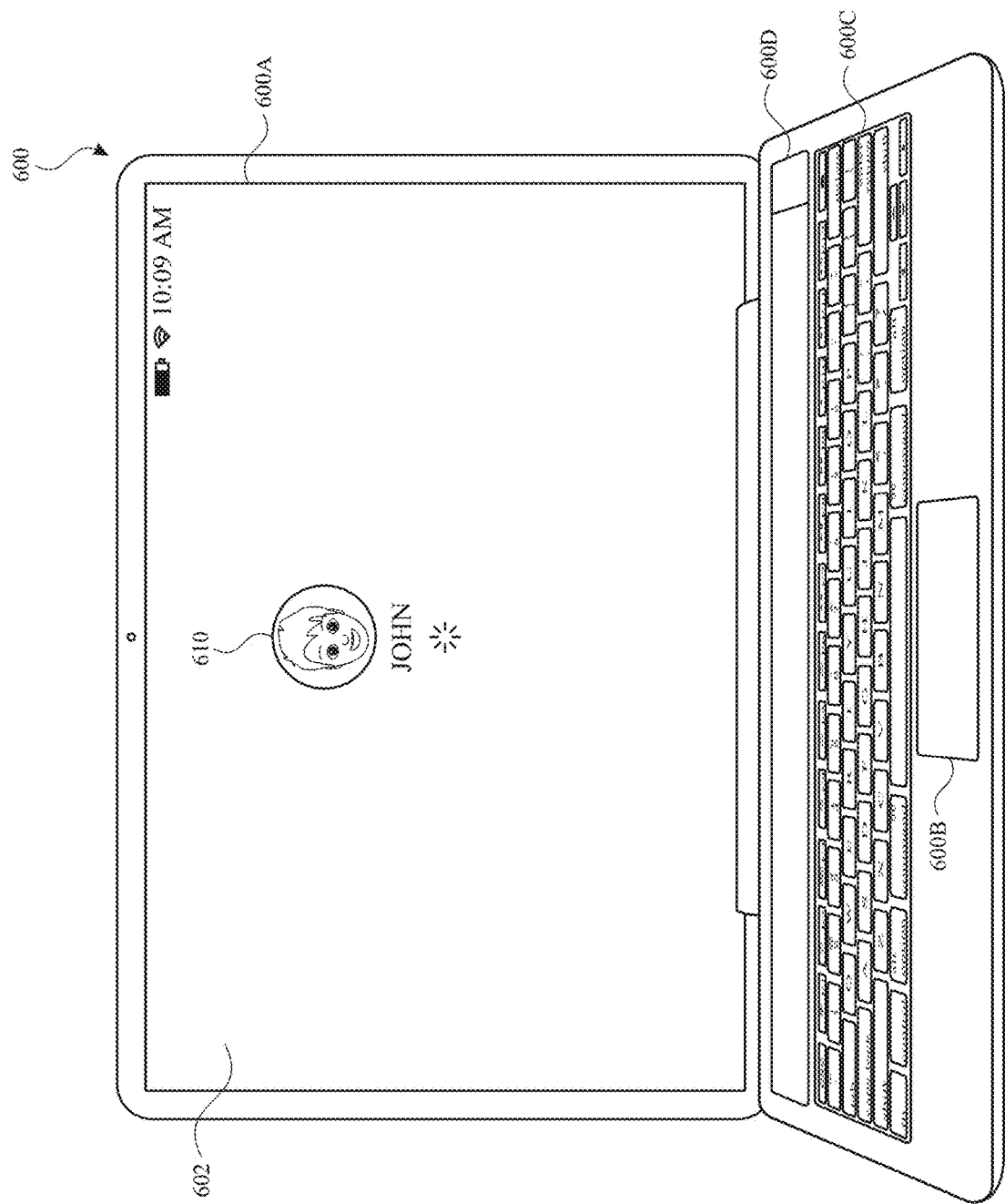
Figure 6W:
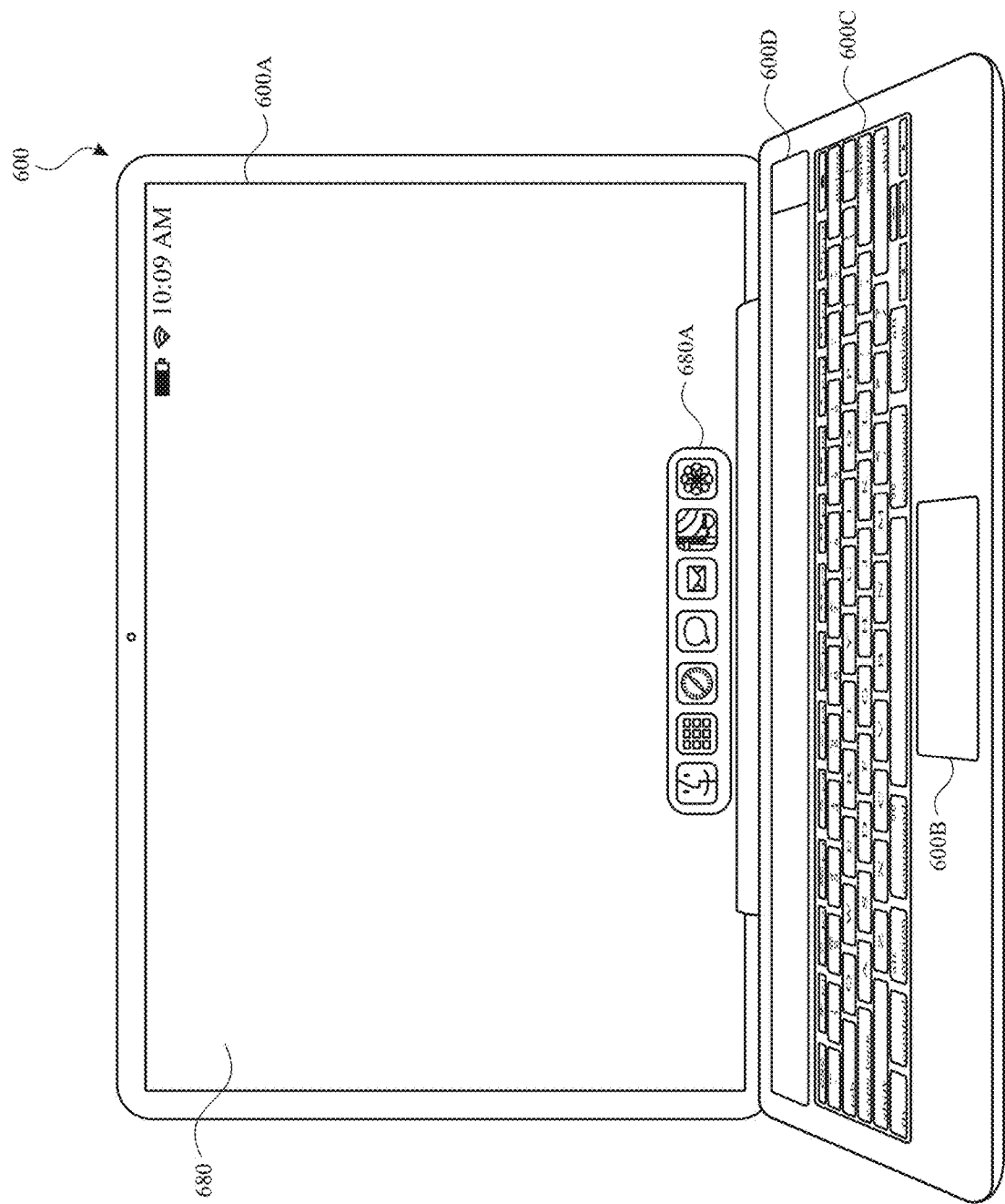

At FIG. 6T, computer system 600 receives submission input 650G (e.g., via activation of a return key on keyboard 600C). In response to receiving submission input 650G and in accordance with a determination that the password in password entry field 622A does not correspond to (e.g., does not match) the password for John's user account, John's avatar 610 animates to indicate that the password is incorrect, as shown in FIG. 6U, such as by the head of John's avatar 610 shaking side-to-side in disagreement and/or John's avatar 610 animating to a failure pose of a frown. Based on the password being incorrect, password entry field 622A also moves side-to-side (e.g., multiple times), as shown in FIG. 6U, and computer system 600 does not unlock. In response to receiving submission input 650G and in accordance with a determination that the password in password entry field 622A does correspond to (e.g., matches) the password for John's user account, John's avatar animates to a success pose to indicate that the password is correct, as shown in FIG. 6V, then computer system 600 unlocks to display homepage 680 for John's user account, as shown in FIG. 6W. The success pose includes a smile and John's avatar 610 ceasing to animate (becomes static, maintaining the smile) as John's account logs in.

In some embodiments, rather than keyboard input into password entry field 622A for submission, computer system 600 receives fingerprint information 650H via fingerprint sensor 600D, as shown in FIG. 6T. In accordance with the detected fingerprint information 650H matching enrolled fingerprint information for John's user account (e.g., regardless of the characters entered into the password entry field), John's avatar 610 animates to the success pose to indicate that the received fingerprint information matches, as shown in FIG. 6V, then computer system 600 unlocks to display homepage 680 for John's user account, as shown in FIG. 6W. In accordance with the detected fingerprint information 650H not matching enrolled fingerprint information for John's user account, John's avatar animates to indicate that the received fingerprint information does not match, as shown in FIG. 6U, such as by the head of John's avatar 610 shaking side-to-side in disagreement and/or John's avatar 610 animating to a failure pose of a frown. Based on the detected fingerprint information 650H not matching enrolled fingerprint information for John's user account, password entry field 622A also moves side-to-side, as shown in FIG. 6U, and computer system 600 does not unlock.

With computer system 600 unlocked, the user can access additional applications and functions of computer system 600, which were not accessible with computer system 600 locked. At FIG. 6W, homepage 680 includes a plurality of icons 680A that, when selected, display a corresponding application. For example, because computer system 600 is logged into John's user account, selecting the mail icon starts the mail application that displays John's email messages. At FIG. 6X, while John's user account is logged into computer system 600, a messaging application 682 is displayed concurrently with John's contact information 684 (e.g., a part of an address book). Messaging application 682 uses the static pose of John's avatar 610 to represent John in a conversation with another user, where the other user is represented by avatar 618. The static pose of John's avatar 610 in messaging application 682 is the same as the static pose of John's avatar 610 at FIG. 6A, which John previously selected. Similarly, John's contact information 684 uses the same static pose of John's avatar 610 to represent John. In some embodiments, John's avatar 610 is animated in messaging application 682 (e.g., to be directed at and/or follow a cursor).

FIG. 7 is a flow diagram illustrating a method for managing an avatar on a lock screen using a computer system in accordance with some embodiments. Method 700 is performed at a computer system (e.g., 100, 300, 500, or 600) (e.g., a laptop computer, a desktop computer, a smartphone, a tablet, and/or a smartwatch) that is in communication with a display generation component and one or more input devices (e.g., a keyboard, a touch-sensitive surface, a computer mouse). Some operations in method 700 are, optionally, combined, the orders of some operations are, optionally, changed, and some operations are, optionally, omitted.

As described below, method 700 provides an intuitive way for managing an avatar on a lock screen. The method reduces the cognitive burden on a user for using a lock screen, thereby creating a more efficient human-machine interface. For battery-operated computing devices, enabling a user to use a lock screen faster and more efficiently conserves power and increases the time between battery charges.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and/or activation or deactivation of certain applications. The locked state can be used to prevent unintentional or unauthorized use of some functionality of the computer system and/or activation or deactivation of some functions of the computer system. In the unlocked state, the computer system is powered on and operational and is not prevented from performing at least a portion of the predefined set of operations that cannot be performed while in the locked state.

When the computer system is in the locked state, the computer system is said to be locked. When the computer system is in the unlocked state, the computer system is said to be unlocked. In some embodiments, the computer system in the locked state optionally responds to a limited set of user inputs, including input that corresponds to an attempt to transition the computer system to the unlocked state or input that corresponds to powering the computer system off.

While the computer system (e.g., 600) is in a locked state (702), the computer system (e.g., 600) displays (704), via the display generation component, a lock screen user interface (e.g., 602) that includes a first avatar (e.g., 610, 612, or 614) (e.g., a first avatar character and/or representing a first user account of the computer system) (and, optionally, concurrently with a second avatar different from the first avatar).

While the computer system (e.g., 600) is in the locked state (702) and while displaying the lock screen user interface that includes the first avatar (e.g., 610, 612, or 614), the computer system (e.g., 600) receives (706), via the one or more input devices, first input (e.g., user input, input via a mouse or trackpad/touch-sensitive surface that moves a cursor on the lock screen user interface, (virtual or mechanical) keyboard input that enters a character into a password/passcode field of the lock screen user interface, and/or input (such as selection of a login button, activation of an enter button of a keyboard) that corresponds to a request to unlock the computer system).

In response (708) to receiving the first input (and, optionally, while the computer system remains in the locked state), the computer system (e.g., 600) displays (e.g., 710) (e.g., newly displaying and/or updating display of), via the display generation component, a respective change in a respective element (e.g., 660, 620A, 622A, or 622B) of the lock screen user interface (e.g., 602) other than the first avatar (e.g., movement of a cursor and/or entry of characters into a password/passcode field) including: in accordance with a determination that the first input is a first type of input (e.g., 650A, 650B, (parts of or all of) 650C, 650D, 650E, 650F, 650G, or 650H), the respective change is a first change (712) in the respective element (e.g., 660, 620A, 622A, 622B) of the lock screen user interface (e.g., 602), and in accordance with a determination that the first input is a second type of input (e.g., 650A, 650B, (parts of or all of) 650C, 650D, 650E, 650F, 650G, or 650H) different from the first type of input, the respective change is a second change (714) in the respective element (e.g., 660, 620A, 622A, or 622B) of the lock screen user interface (e.g., 602) that is different from the first change in the respective element of the lock screen user interface (e.g., the first type of input is a click and the second type of input is cursor movement; and/or the first and second types of input are both cursor movement, but in different directions). In some embodiments, the first input is received while the respective element of the lock screen user interface is displayed, and the respective element changes (e.g., a location of the respective element changes, a visual characteristic of the respective element changes) in response to and based on the first input. In some embodiments, the degree of change in a visual characteristic of the respective element is based on a degree, duration, quantity, and/or direction of the first input. For example, a swipe input (e.g., on a touch-sensitive surface) and/or mouse input (e.g., using a computer mouse) that travels a short distance causes less movement of a cursor than a swipe input (e.g., on the touch-sensitive surface) and/or mouse input (e.g., using the computer mouse) that travels a longer distance. For another example, entry of multiple characters via a keyboard causes more changes to a password/passcode field as compared to entry of a single character via the keyboard.

In response (708) to receiving the first input (and, optionally, while the computer system remains in the locked state), the computer system (e.g., 600) displays (716) (e.g., concurrently with display of the lock screen user interface object), via the display generation component, animation, over time, of the first avatar (e.g., 610, 612, or 614 in FIGS. 6C-6D and 6F-6H) (and, optionally, the second avatar (e.g., 610, 612, or 614 in FIGS. 6C-6D and FIGS. 6F-6H)) transitioning through a plurality of poses, wherein, after the animation, the first avatar (e.g., 610, 612, or 614 in FIG. 6D or FIG. 6H) (and, optionally, the second avatar) is concurrently displayed along with the respective change in the respective element of the lock screen user interface (e.g., 602) other than the first avatar. In some embodiments, a pose optionally includes a static pose or animated pose, such as an animated pose where the avatar character appears to be looking at a location on a display corresponding to the received first input. In some embodiments, the animated pose includes an amount of movement, such as changes in pitch, roll, and/or tilt of the avatar character. In some embodiments, the animated pose includes changes in facial expression of the first avatar. In some embodiments, the animation of the first avatar is performed in response to receiving the first input. Changing a respective element of a lock screen user interface based on an input provides the user with visual feedback that the input has been received and about the effect of the input on the state of the computer system, which provides improved visual feedback.

In some embodiments, the first avatar (e.g., 610) (and, optionally, the second avatar (e.g., 612 and/or 614)) is a three-dimensional avatar and the animation, over time, of the first avatar (and, optionally, the second avatar) transitioning through the plurality of poses includes a change in shape of the first avatar and/or a rotation of the first avatar. In some embodiments, the rotation of the first avatar includes rotation other than rotation in a plane of the display on which the first avatar is being displayed. In some embodiments, the rotation of the first avatar includes the head of the avatar turning left to look left, the head turning right to look right, the head turning up to look up, and/or the head turning down to look down. In some embodiments, the first avatar (e.g., the head of the first avatar) appears to rotate (e.g., concurrently) along two axis.

Changing a shape and/or rotation of the first avatar provides the user with visual feedback that the system is active and that inputs will be processed. Further, inputs that affect the animation of the first avatar provides the user with visual feedback that the input has been received and about the effect of the input on the state of the computer system, which provides improved visual feedback.

In some embodiments, in accordance with a determination that the first input is a first type of input (e.g., 650A or 650B) (e.g., an input that causes a cursor to pass over the first avatar and/or a successful login attempt), the animation, over time, of the first avatar transitioning through the plurality of poses includes a first animation (and, optionally, a first pose) without including a second animation (and, optionally, without including a second pose). In accordance with a determination that the first input is a second type of input (e.g., 650C or 650D) (e.g., an input that does not cause the cursor to pass over the first avatar and/or an unsuccessful login attempt) that is different from the first type of input, the animation, over time, of the first avatar (e.g., 610) transitioning through the plurality of poses includes the second animation (and, optionally, the second pose) without including the first animation (and, optionally, without including the first pose).

Accordingly, the animations of the first avatar are based on the user input and different user inputs cause different animations of the first avatar. In some embodiments, the animation includes smooth transitions among multiple poses and/or the animation includes animated movement of the first avatar to transition among the multiple poses. In some embodiments, the second avatar transitions (concurrently with the first avatar) through a plurality of poses (e.g., different from the first avatar). Animating the first avatar differently based on the received input provides the user with visual feedback that the input has been received and about the effect of the input on the state of the computer system, which provides improved visual feedback.

In some embodiments, the respective element includes (e.g., is) a cursor (e.g., 660) displayed via the display generation component. The first type of input (or, alternatively, the second type of input) is a first pointing device input (e.g., 654A, 650B, or 650C) received via a pointing device (e.g., 600B) (e.g., movement of a (e.g., wired or wireless) computer mouse; and/or movement of a contact on a touch-sensitive surface such as a trackpad, a touch screen, a touch bar, or a touch-sensitive mouse) that causes the cursor (e.g., 660) to move in the lock screen user interface (e.g., 602) (e.g., without occluding the first avatar). The second type of input is an input (e.g., 650D, 650F, 650G, or 650H) other than input that causes the cursor to move (e.g., a click input, a selection input, a typing input). A cursor moving about the display provides the user with feedback about the location of the pointing device with respect to the element of the user interface. In some embodiments, the first avatar looking in the direction of the cursor provides the user with visual feedback about where on the display the user can find the cursor, which provides improved visual feedback.

In some embodiments, the first change (or, alternatively, the second change) in the respective element of the lock screen user interface is an animated change in location (e.g., that does not pass over (e.g., occlude) the first avatar) of the cursor (e.g., while maintaining other visual appearances (e.g., size, color, and/or shape) of the cursor). In some embodiments, the plurality of poses includes: a first pose where the first avatar is looking in a direction of the cursor while the cursor is at a first display location; and a second pose, different from the first pose, where the first avatar is looking in a direction (e.g., different direction) of the cursor while the cursor is at a second display location. In some embodiments, the first avatar looks at the cursor (e.g., based on eye movement and/or head movement of the avatar) while the location of the cursor changes. In some embodiments, the first avatar ceases to look at the cursor based on the cursor not moving for a predetermined period of time.

In some embodiments, the respective element includes (e.g., is) a cursor (e.g., 660) displayed via the display generation component. The first type of input (or, alternatively, the second type of input) is a second pointing device input (e.g., last portion of input 650C) received via a pointing device (e.g., 600B) (e.g., movement of a (e.g., wired or wireless) computer mouse; and/or movement of a contact on a touch-sensitive surface) that causes the cursor (e.g., 660) to move across the lock screen user interface to a location of the first avatar (e.g., 610) (or otherwise point at the first avatar and/or highlight the first avatar). The second type of input is an input other than input that causes the cursor to move across the lock screen user interface to a location of the first avatar (e.g., a click input, a selection input, and/or a typing input). The first avatar having different amounts of movement based on whether the in the direction of the cursor provides the user with visual feedback about where the cursor is located on the display, which provides improved visual feedback.

In some embodiments, the first change (or, alternatively, the second change) in the respective element of the lock screen user interface is an animated change in location (e.g., that does not pass over (e.g., occlude) the first avatar) of the cursor (e.g., while maintaining other visual appearances (e.g., size, color, and/or shape) of the cursor). In some embodiments, the plurality of poses includes: a third pose (that is optionally different from the first and/or second pose) where the first avatar includes a first amount of movement (e.g., a non-zero amount of movement such as changes in pitch, roll, and/or tilt of the avatar character) while the cursor is at a display location that does not occlude the first avatar, and a fourth pose, different from the third (and, optionally, different from the first and/or second) pose, where the first avatar includes a second amount of movement (e.g., a non-zero amount of movement such as changes in pitch, roll, and/or tilt of the avatar character), different from the first amount of movement (e.g., more than or less than the first amount of movement), while the cursor is at a display location that does occlude the first avatar.

In some embodiments, the respective element includes (e.g., is) a cursor (e.g., 660) displayed via the display generation component. The first type of input (or, alternatively, the second type of input) is a third pointing device input (e.g., 650D), received via a pointing device (e.g., 600B) (e.g., depression (or other activation) of a button of a computer mouse; and/or contact on a touch-sensitive surface that exceeds a non-zero intensity threshold), corresponding to a press input (e.g., a press of a button or a pressure sensitive surface). The first change (or, alternatively, the second change) in the respective element of the lock screen user interface includes (e.g., is) a change in an appearance (e.g., size, color, and/or shape) of a selectable user interface object (e.g., 620A-620C) in the lock screen user interface object (e.g., a button, text entry field, image, or other selectable user interface object). The second type of input is an input other than input corresponding to press input (e.g., input that causes the cursor to move across the lock screen user interface). The appearance of the cursor changing when the computer system detects a mouse click provides the user with visual feedback about the state of the system and that the input has been received, which provides improved visual feedback.

In some embodiments, the first type of input (or, alternatively, the second type of input) is a selection input (e.g., 650D) corresponding to selection of the first avatar (e.g., received via a pointing device, such as a mouse click input when the cursor is pointing on (e.g., occluding the first avatar)) and the second type of input is an input other than a selection input corresponding to selection of the first avatar (e.g., typing input and/or input that causes the cursor to move across the lock screen user interface). Animating the first avatar when the computer system detects selection of the first avatar provides the user with visual feedback about the state of the computer system and that the first avatar has been selected, which provides improved visual feedback.

In some embodiments, in response to receiving the first input (e.g., 650D), displaying, via the display generation component, the first avatar (e.g., 610) sliding in a direction (e.g., as shown in FIGS. 6L-6O) (e.g., towards a center of the lock screen user interface; translating; and/or moving in or along a direction from a first display location to a second display location). Wherein displaying (e.g., concurrently with display of the respective element), via the display generation component, animation, over time, of the first avatar transitioning through the plurality of poses includes a first pose (e.g., 610 in FIG. 6M) based on the direction of sliding. In some embodiments, in accordance with a determination that the first avatar is sliding in a first direction (e.g., to the right) (and/or in accordance with a determination that the starting position of the first avatar is on the left side of the display when the first input is received), the animation includes a first sliding pose (e.g., head tilted to the left) (without including a second sliding pose) and in accordance with a determination that the first avatar is sliding in a second direction (e.g., to the left) different from the first direction (and/or in accordance with a determination that the starting position of the first avatar is on the right side of the display when the first input is received), the animation includes a second sliding pose (e.g., head tilted to the right) without including the first sliding pose. In some embodiments, the plurality of poses includes the head of the first avatar tilting (e.g., tilting away and/or in a first direction) in concurrence with the first avatar sliding (e.g., the first avatar tilts in an opposite direction of the sliding). In some embodiments, the plurality of poses includes the head of the first avatar ceasing to tilt in the first direction and/or tilting in a different direction (e.g., the opposite direction and/or a second direction) in concurrence with the speed of sliding of the first avatar slowing down and/or stopping. In some embodiments, in response to receiving the first input, the computer system ceases to display (e.g., prior to sliding the first avatar) other avatars (e.g., that were displayed when the first input was received) corresponding to other accounts. Animating the first avatar to slide (e.g., towards a center of the lock screen user interface) when the computer system detects selection of the first avatar provides the user with visual feedback about the state of the computer system and that the first avatar has been selected, which provides improved visual feedback.

In some embodiments, in response to receiving the first input, the computer system (e.g., 600) displays, an animation of the first avatar moving, including (e.g., as shown in FIG. 6P): in accordance with a determination that the first avatar is displayed in a first portion of the lock screen user interface (e.g., on a first side of the lock screen user interface), the animation of the first avatar moving includes movement of the first avatar in a first direction (e.g., the first avatar being dragged from the first side of the lock screen user interface to a predefined location such as a center of the lock screen user interface), and in accordance with a determination that the first avatar is displayed in a second portion of the lock screen user interface that is different from the first portion of the lock screen user interface (e.g., on a second side of the lock screen user interface), the animation of the first avatar moving includes movement of the first avatar in a second direction that is different from the first direction (e.g., the first avatar being dragged from the second side of the lock screen user interface to the predefined location). Moving the first avatar in a direction that is based on the starting location of the first avatar provides the user with visual feedback about which avatar has been selected (e.g., by moving the avatar to the predefined location), which provides improved visual feedback.

In some embodiments, the first avatar faces a third direction and/or the head of the first avatar tilts in the third direction based on the movement of the first avatar being in the first direction. In some embodiments, the first avatar faces a fourth direction and/or the head of the first avatar tilts in the fourth direction based on the movement of the first avatar being in the second direction. In some embodiments, the speed at which the first avatar moves in the first/second direction (e.g., to the predefined location) is based on a starting location and/or distance of movement of the first avatar (e.g., longer distance to move to the predefined location results in faster speed). In some embodiments, the first avatar moves at a faster speed and/or reaches a higher speed of movement when the first avatar starts further from the predefined location as compared to when the first avatar starts closer to the predefined location.

In some embodiments, (e.g., while the computer system is in the locked state) in response to a determination that user input has not been received (at the computer system) for a first predetermined period of time, the computer system (e.g., 600) displays, via the display generation component, an inactivity animation (e.g., as shown in FIG. 6F) of the first avatar (e.g., 610) (and, optionally, a second avatar (e.g., 612 or 614)) (e.g., an animation indicating inactivity for the first predetermined period of time has elapsed, an animation of the first (and/or second) avatar sleeping (e.g., eyes closed), and/or an animation of the first (and/or second) avatar being bored). In some embodiments, in response to a determination that user input has not been received for a predetermined period of time that is longer than the first predetermined period of time, changing (e.g., subsequent to displaying the inactivity animation of the first avatar) a display state of the display generation component (e.g., dimming the display and/or turning off the display). Animating the first avatar to indicate that no activity has been detected for the first predetermined period of time provides the user with visual feedback about the state of the computer system and that no inputs have been received. The animation of the first avatar that no activity has been detected for the first predetermined period of time also provides the user with a warning that the computer system will take further action (e.g., dim or turn off display) if no activity continues to be detected, which provides improved visual feedback.

In some embodiments, the first type of input includes (e.g., is) entering characters (e.g., 600F) in a password entry field (e.g., 622A) (e.g., consisting of numeric, alphabetical, and/or non-alphanumeric characters). Changing a respective element of a lock screen user interface based on an input entering characters in the password entry field provides the user with visual feedback that the input has been received and about the effect of the input on the state of the computer system, which provides improved visual feedback.

In some embodiments, the computer system receives a request (e.g., 600C, 650G, and/or 650H) to unlock the computer system (e.g., 600) including providing authentication information (e.g., a password/passcode, or biometric authentication). In response to receiving the request to unlock the computer system, the computer system (e.g., 600) displays, via the display generation component, animation, over time, of the first avatar (e.g., 610) transitioning through a plurality of poses includes: in accordance with a determination that the request to unlock the computer system corresponds to (e.g., results in) a successful login attempt (e.g., correct password is submitted), changing the appearance of the first avatar to a first appearance (e.g., 610 in FIG. 6V), and in accordance with a determination that the request to unlock the computer system corresponds to (e.g., results in) an unsuccessful login attempt (e.g., incorrect password is submitted), changing the appearance of the first avatar to a second appearance (e.g., 610 in FIG. 6U) that is different from the first appearance. Accordingly, the first avatar reacts differently when a correct password is submitted as compared to when an incorrect password is submitted. In some embodiments, when the login attempt is not successful, the password entry field shakes (e.g., left-to-right and right-to-left) to indicate that the password is wrong (e.g., the respective change is a shake in the password entry field). Changing a respective element of a lock screen user interface based on whether a request to unlock the computer system is successful provides the user with visual feedback about the input that has been received and about whether the computer system will remain locked or be unlocked, which provides improved visual feedback. Providing different animations of the first avatar based on whether the request to unlock the computer system is successful similarly provides the user with visual feedback about the input that has been received and about whether the computer system will remain locked or be unlocked, which provides improved visual feedback.

In some embodiments, the first appearance (e.g., 610 in FIG. 6V) is a static pose (e.g., the first avatar smiling without additional head movement) and the second appearance (e.g., 610 in FIG. 6U) is an animated appearance (e.g., the first avatar includes an animated reaction and/or the animation includes head movement). Displaying a static pose when the password is successful as compared to an animated appearance when the password is not successful provides the user with visual feedback about the password that has been received and about whether the computer system will remain locked or be unlocked, which provides improved visual feedback.

In some embodiments, the second type of input (or, alternatively, another type of input) includes (e.g., is) a request for a password hint (e.g., selection of an option requesting that the electronic device provide (e.g., display) a hint as to what the password is) (e.g., as illustrated in FIG. 6Q). Providing a different animation of the first avatar when a request is received for a hint of what the password is (as compared to another input, such as input to submit password) provides the user with visual feedback about the input that has been received and about what information computer system will provide (e.g., the hint), which provides improved visual feedback.

In some embodiments, while displaying the first avatar, detecting entry of characters (e.g., 650F) (e.g., characters of a (e.g., correct or incorrect) password) in a text entry field (e.g., 622A). In some embodiments, the entry of the characters (e.g., password) includes keyboard input. In response to detecting the entry of characters in the text entry field (e.g., 622A), the computer system (e.g., 600) displays, via the display generation component, the first avatar (e.g., 610) paying attention to (e.g., glancing at or in the direction of) a text entry field (such as a password entry field) into which the characters are being entered (e.g., as illustrated in FIG. 6R). Providing a different animation of the first avatar when text is being entered into the text entry field provides the user with visual feedback about the input that is being received. The first avatar paying attention to the text entry field provides the user with feedback about the location at which the received input is being entered into the computer system, which provides improved visual feedback.

In some embodiments, subsequent to displaying the first avatar (e.g., 610) glancing at (e.g., in the direction of) the text entry field (e.g., 622A) (e.g., a password entry field) into which the characters are being entered, the computer system (e.g., 600) detects that characters have not been entered into the text entry field for at least a predetermined amount of time. In response to detecting that characters have not been entered into the text entry field (e.g., 622A) for at least the predetermined amount of time, the computer system (e.g., 600) displays (e.g., after detecting that text entry into the password entry field has ended and/or after determining that text has not been entered into the password entry field for a predefined amount of time), via the display generation component, an animation of the first avatar transitioning to a pose (e.g., 610 as in FIGS. 6S and/or 6T) (e.g., a neutral pose and/or the same pose that the first avatar had before entry of characters of the password begin) that does not include the first avatar paying attention to (e.g., glancing at or in the direction of) the text entry field. Returning to not paying attention to at the text entry field (and/or returning to a neutral pose) once the computer system stops receiving input at the text entry field provides the user with visual feedback about whether text is being received and entered into the text entry field, which provides improved visual feedback.

In some embodiments, while the computer system (e.g., 600) is in the locked state, in accordance with a determination that user input has not been received for a second predetermined period of time (e.g., that is different from or less than the first predetermined period of time), displaying, via the display generation component, an animation of the first avatar (and, optionally, the second avatar) indicating that the computer system is waiting for user input (e.g., an animation of the first avatar and/or second avatar looking around, bobbing, and/or smiling) (e.g., 610, 612, and/or 614 in FIG. 6E; or 610 in FIG. 6T). Providing animations of the first avatar when user input is not received provides the user with visual feedback that input the user may be trying to enter has not been received and/or that the computer system is waiting on the user to provide input to change the state of the computer system, which provides improved visual feedback.

In some embodiments, the animation of the first avatar (e.g., 610) indicating that the computer system (e.g., 600) is waiting for user input is based on a state of the computer system, including: in accordance with a determination that the computer system is in a first state, the animation of the first avatar (and, optionally, the second avatar) indicating that the computer system is waiting for user input is a first waiting animation (e.g., 610 in FIG. 6E), and in accordance with a determination that the computer system is in a second state, the animation of the first avatar (and, optionally, the second avatar) indicating that the computer system is waiting for user input is a second waiting animation (e.g., 610 in FIG. 6T) that is different from the first waiting animation. In some embodiments, the first state is a state in which a plurality of avatars are displayed for selection and the second state is a state in which an avatar (such as the first avatar) of the plurality of avatars has been selected (and, optionally, a password entry field is displayed). In some embodiments, in accordance with a determination that the computer system is in a third state (e.g., a state in which the computer system is in a sleep state and/or low power state), the animation of the first avatar indicating that the computer system is waiting for user input is a third waiting animation (different from the first and second waiting animations). In some embodiments, while displaying the animation of the first avatar indicating that the computer system is waiting for user input, user input is received. In response to receiving the user input, the computer system ceases to display the animation of the first avatar indicating that the computer system is waiting for user input. Providing different animations of the first avatar based on the state of the computer system when user input is not received provides the user with visual feedback about the state of the computer system and what type of information should be entered into the computer system, which provides improved visual feedback.

In some embodiments, while the computer system (e.g., 600) is waiting for user input, displaying, via the display generation component, a waiting animation (e.g., 610, 612, and/or 614 in FIG. 6E; or 610 in FIG. 6T) that includes displaying, in sequence: a repeating animation that includes multiple repetitions of the same behavior (e.g., repeatedly (e.g., twice, thrice, or four times) and/or with other animations interspersed before/between/after the multiple first waiting animations); a first emphasis animation that is different from the repeating animation and is selected (e.g., randomly or pseudo-randomly) from a set of emphasis animations that includes three or more different emphasis animations, wherein in some embodiments, the set of emphasis animations includes a large number of emphasis animations (e.g., more than 20, more than 50, or more than 100 emphasis animations) so that the behavior of the avatar does not appear to repeat itself for at least a threshold amount of time (e.g., 5 min, 15 min, 30 min, or 2 hours); the repeating animation; a second emphasis animation that is different from the repeating animation and is selected from the set of emphasis animations; and the repeating animation. In some embodiments, some of the animations of the first avatar indicating that the computer system is waiting for user input are used three, four, five, or more times as often as particular other animations of the first avatar indicating that the computer system is waiting for user input. Providing animations of the first avatar to indicate that the computer system is waiting for user input provides the user with visual feedback about the state of the computer system and that information should be entered into the computer system to proceed, which provides improved visual feedback.

In some embodiments, an animation of the first avatar (e.g., 610) indicating that the computer system (e.g., 600) is waiting for user input includes a first amount of movement (e.g., rotating, facial expressions, nodding, changing in size, changes in pitch, roll, and/or tilt of the avatar character) of the first avatar when the computer system is in a state in which the first avatar has been selected from among a plurality of avatars (e.g., as in FIG. 6T) (e.g., the plurality of avatars was displayed prior to user selection of the first avatar and the first avatar is displayed without concurrently displaying other avatars of the plurality of avatars) and an animation of the first avatar (e.g., 610) indicating that the computer system (e.g., 600) is waiting for user input includes a second amount of movement (e.g., rotating, facial expressions, nodding, changing in size, changes in pitch, roll, and/or tilt of the avatar character), greater than the first amount of movement, of the first avatar when the computer system is in a state in which the first avatar has not been selected from among the plurality of avatars (e.g., as in FIG. 6E) (e.g., the plurality of avatars are concurrently displayed, including the first avatar). In some embodiments, the first avatar is more attentive, reacts more frequently, and/or is more active when the first avatar has been selected (e.g., from among the plurality of avatars) as compared to when the first avatar has not been selected (e.g., no avatar has been selected from among the plurality of avatars). Providing animations with greater movement of the first avatar when the avatar has been selected and less movement of the first avatar when the avatar has not been selected provides the user with visual feedback about the state of the computer system and whether the avatar and corresponding user account has been selected, which provides improved visual feedback.

In some embodiments, while the computer system is in the locked state, the computer system (e.g., 600) displays, via the display generation component and concurrently with the first avatar (e.g., 610), a password entry field (e.g., 622A) (e.g., text entry field into which characters of a password/passcode can to be entered in response to a text entry input while the text entry field is selected). Concurrently displaying the password entry field with the first avatar enables the computer system to provide the user with feedback about the password entry field (such as whether text is being entered into the password entry field) through various animations of the first avatar, which provides improved visual feedback.

In some embodiments, the lock screen user interface is a password entry user interface (e.g., 602 at FIG. 6O). While displaying the first avatar (e.g., 610) (e.g., along with one or more other avatars), the computer system (e.g., 600) detects, via one or more user input devices (e.g., a pointing device, a hardware keyboard, and/or a virtual keyboard), selection (e.g., 650D) of the first avatar (e.g., detecting a mouse click while the cursor is on the first avatar). The password entry user interface (e.g., 602 at FIG. 6O) that includes the password entry field (e.g., 622A) is displayed (e.g., concurrently with display of the first avatar) in response to detecting the selection of (e.g., click on) the first avatar. In some embodiments, the password entry user interface includes a password entry field, a submit button for submitting the entered password, a password hint button for receiving a password hint, and/or a password reset button for resetting the password. Displaying the password entry user interface when the first avatar is selected (e.g., clicked on) provides the user with feedback that a password should be entered to proceed (e.g., to proceed to unlock the computer system), which provides improved visual feedback.

In some embodiments, while the computer system (e.g., 600) is in the locked state, the computer system (e.g., 600) concurrently displays in the lock screen user interface (e.g., 602 at FIGS. 6A-6K), via the display generation component, a plurality of avatars (e.g., 610, 612, and 614) including the first avatar (e.g., 610) and a second avatar (e.g., 612 or 614) (e.g., a second avatar character and/or representing a second user account of the computer system different from the first user account) that is different from the first avatar. In some embodiments, the computer system displays a plurality of avatars other than the first avatar, wherein each avatar of the plurality of avatars corresponds to a different user account of the computer system. Displaying one or more additional avatars enables the computer system to provide the user with a mechanism to access different user accounts to log into (e.g., by clicking on the avatar and entering the correct password), which provides improved visual feedback.

In some embodiments, the first avatar (e.g., 610) and the second avatar (e.g., 612 or 614) are concurrently animated (e.g., the computer system animates both avatars to look at a (same) location of the cursor, the computer system animates both avatars based on the state of the computer system, the computer system animates both avatars independent of each other). In some embodiments, the lock screen user interface includes a plurality of avatars, including the first avatar and the second avatar, wherein each avatar corresponds to a different user account. In some embodiments, the second avatar is also animated and the animations are, optionally, based on the input (or lack of input) that is received. Concurrently displaying the first avatar with other avatars provides the user with additional indications of the user input being received and the state of the computer system, which provides improved visual feedback.

In some embodiments, concurrently displaying the plurality of avatars includes animating an avatar (e.g., 610) that has a current input focus (e.g., an avatar that has been selected or is the subject of user input such as a cursor hover or user gaze direction) with an active animation style (e.g., an animation style that includes more dramatic and/or faster movements than a non-active animation style and/or an animation style that responds to a larger number of different user inputs or responds more prominently to user inputs than a non-active animation style) that is not used for avatars that do not have the current input focus, including: in accordance with a determination that the first avatar (e.g., 610) has current input focus (e.g., as in FIG. 6K), the computer system (e.g., 600) concurrently displays the first avatar with the active animation style (e.g., without animating the second avatar with the active animation style); and in accordance with a determination that the second avatar (e.g., 612) has current input focus (e.g., as in FIG. 6J), the computer system (e.g., 600) concurrently displays the second avatar (e.g., 612) with the active animation style (e.g., without animating the first avatar with the active animation style). In some embodiments, the active animation style is applied to one avatar at a time and the non-active animation style is applied to multiple other avatars that do not have the current input focus. In some embodiments, if the computer system detects that input focus has switched to a respective avatar, the respective avatar is displayed with the active animation style while other avatars are displayed with the non-active animation style. Presenting an avatar that is highlighted (e.g., via a mouse over) with a different animation style as compared to avatars that are not highlighted provides the user with visual feedback about which avatar is highlighted/in focus and on which actions will be performed, which provides improved visual feedback.

In some embodiments, concurrently displaying the plurality of avatars includes animating the plurality of avatars with a non-active animation style. While displaying the plurality of avatars with the non-active animation style, the computer system (e.g., 600) detects that an input focus has been directed to a respective avatar of the plurality of avatars (e.g., an avatar that has been selected or is subject of user input such as a cursor hover or user gaze direction) (e.g., as in FIGS. 6I-6K). In response to detecting the input focus has been directed to the respective avatar, changing the respective avatar from the non-active animation style to an active animation style (e.g., an animation style that includes more dramatic and/or faster movements than a non-active animation style and/or an animation style that responds to a larger number of different user inputs or responds more prominently to user inputs than a non-active animation style), including: in accordance with a determination that the first avatar has current input focus, concurrently displaying the first avatar with the active animation style (e.g., without animating the second avatar with the active animation style and/or without displaying the second avatar); and in accordance with a determination that the second avatar has current input focus, concurrently displaying the second avatar with the active animation style (e.g., without animating the first avatar with the active animation style and/or without displaying the first avatar). Presenting an avatar that is being focused on (e.g., selected) with a different animation style as compared to avatars that are not highlighted provides the user with visual feedback about which avatar is highlighted/in focus and on which actions will be performed, which provides improved visual feedback.

In some embodiments, animating the first avatar and animating the second avatar includes selecting animations for the first avatar and the second avatar so as to avoid concurrently displaying the same or similar animations for the first avatar and the second avatar. In some embodiments, a plurality of avatars (e.g., 3, 4, 5, 6, or more avatars) are concurrently displayed and some (or all) concurrently perform various animations and the computer system selects animations for the avatars (e.g., 3, 4, 5, 6, or more avatars) so as to avoid concurrently displaying the same or similar animation for two avatars. In some embodiments, the computer system selects, for display, the animation of the first avatar transitioning through the plurality of poses based on the second avatar (and, optionally, other (e.g., all) avatars of the plurality of displayed avatars) not being concurrently animated using the animation. In some embodiments, the computer system proactively avoids playing the same animation for multiple different avatars. In some embodiments, animations are selected such that multiple avatars do not play the same animation at the same time. In some embodiments, animations are selects such that the same animation was not recently played (e.g., within a predetermined period of time, within a predetermined number of played animations) for the first avatar being animated and/or for other displayed avatars. Proactively avoiding playing the same animation for multiple different avatars (e.g., via randomness and/or checks for current/recent animations of other avatars) provides the user with feedback that the avatars are not linked together (e.g., correspond to different user accounts), which provides improved visual feedback.

In some embodiments, the first avatar (e.g., displayed as part of the lock screen user interface) is static while an operating system of the computer system is loading (e.g., not animated for a non-zero duration of time and/or not animated for the entire duration of the operating system loading) (and, optionally, while the computer system is in the locked state). Displaying a static avatar, rather than an animated avatar, while an operating system of the computer system is loading reduces the need for processing power for the avatar, enabling the operating system to load more quickly, and to provide the user with visual feedback that the operating system is loading, which provides improved visual feedback.

In some embodiments, in response to a determination that the operating system has finished loading, transitioning (e.g., center the first avatar and/or performing a crossfade animation) display, via the display generation component, of the first avatar from being static to being animated. Transitioning an avatar from being a static avatar to an animated avatar provides the user with feedback that the operating system has finished loading, which provides improved visual feedback.

In some embodiments, while the first avatar is static (e.g., 610 at FIG. 6A), a pose of the first avatar (e.g., 610) corresponds to (e.g., is the same as) a user-selected pose associated with user contact information (e.g., as shown in 684) for the user account corresponding to the first avatar. In some embodiments, the pose of the first avatar (while static) is the same as the pose that the user of the user account selected to represent the user in a contact (e.g., in an electronic address book). In some embodiments, the pose of the first avatar is selected based on the user having previously selected that pose for the first avatar to represent the user (e.g., in a contact listing of an electronic address book). Displaying the static avatar using a previously user-selected pose associated with user contact information for the user account provides the user with feedback about which account the avatar corresponds to, which provides improved visual feedback.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the lock screen experience. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, and/or exercise information), date of birth, or any other identifying or personal information.

The present disclosure recognizes that the use of such personal information data, in the present technology, can be used to the benefit of users. For example, the personal information data can be used to present relevant avatars. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of lock screen services, the present technology can be configured to allow users to select to "opt in" or "opt out" of participation in the collection of personal information data during registration for services or anytime thereafter. In another example, users can select not to provide personal information when accessing a lock screen. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer system configured to communicate with a display generation component and one or more input devices, comprising:
one or more processors; and
memory storing one or more programs configured to be executed by the one or more processors, the one or more programs including instructions for:
while the computer system is in a locked state:
displaying, via the display generation component, a lock screen user interface that includes a first avatar; and
while displaying the lock screen user interface that includes the first avatar, receiving, via the one or more input devices, first input; and
in response to receiving the first input:
displaying, via the display generation component, a respective change in a respective element of the lock screen user interface other than the first avatar including:
in accordance with a determination that the first input is a first type of input, the respective change is a first change in the respective element of the lock screen user interface; and
in accordance with a determination that the first input is a second type of input different from the first type of input, the respective change is a second change in the respective element of the lock screen user interface that is different from the first change in the respective element of the lock screen user interface; and
displaying, via the display generation component, animation, over time, of the first avatar transitioning through a plurality of poses, wherein, after the animation, the first avatar is concurrently displayed along with the respective change in the respective element of the lock screen user interface other than the first avatar.

2. The computer system of claim 1, wherein the first avatar is a three-dimensional avatar and the animation, over time, of the first avatar transitioning through the plurality of poses includes a change in shape of the first avatar and/or a rotation of the first avatar.

3. The computer system of claim 1, wherein:
in accordance with a determination that the first input is a first type of input, the animation, over time, of the first avatar transitioning through the plurality of poses includes a first animation without including a second animation; and in accordance with a determination that the first input is a second type of input that is different from the first type of input, the animation, over time, of the first avatar transitioning through the plurality of poses includes the second animation without including the first animation.

4. The computer system of claim 1, wherein:
the respective element includes a cursor displayed via the display generation component;
the first type of input is a first pointing device input received via a pointing device that causes the cursor to move in the lock screen user interface; and
the second type of input is an input other than input that causes the cursor to move.

5. The computer system of claim 1, wherein:
the respective element includes a cursor displayed via the display generation component;
the first type of input is a second pointing device input received via a pointing device that causes the cursor to move across the lock screen user interface to a location of the first avatar; and
the second type of input is an input other than input that causes the cursor to move across the lock screen user interface to a location of the first avatar.

6. The computer system of claim 1, wherein:
the respective element includes a cursor displayed via the display generation component;
the first type of input is a third pointing device input, received via a pointing device, corresponding to a press input;
the first change in the respective element of the lock screen user interface includes a change in an appearance of a selectable user interface object in the lock screen user interface; and
the second type of input is an input other than input corresponding to press input.

7. The computer system of claim 1, wherein:
the first type of input is a selection input corresponding to selection of the first avatar; and
the second type of input is an input other than a selection input corresponding to selection of the first avatar.

8. The computer system of claim 7, the one or more programs further including instructions for:
in response to receiving the first input, displaying, via the display generation component, the first avatar sliding in a direction; and
wherein displaying, via the display generation component, animation, over time, of the first avatar transitioning through the plurality of poses includes a first pose based on the direction of sliding.

9. The computer system of claim 7, the one or more programs further including instructions for:
in response to receiving the first input, displaying an animation of the first avatar moving, including:
in accordance with a determination that the first avatar is displayed in a first portion of the lock screen user interface, the animation of the first avatar moving includes movement of the first avatar in a first direction; and
in accordance with a determination that the first avatar is displayed in a second portion of the lock screen user interface that is different from the first portion of the lock screen user interface, the animation of the first avatar moving includes movement of the first avatar in a second direction that is different from the first direction.

10. The computer system of claim 1, the one or more programs further including instructions for:
in response to a determination that user input has not been received for a first predetermined period of time, displaying, via the display generation component, an inactivity animation of the first avatar.

11. The computer system of claim 1, wherein the first type of input includes entering characters in a password entry field.

12. The computer system of claim 1, the one or more programs further including instructions for:
receiving a request to unlock the computer system including providing authentication information; and
in response to receiving the request to unlock the computer system, displaying, via the display generation component, animation, over time, of the first avatar transitioning through a plurality of poses includes:
in accordance with a determination that the request to unlock the computer system corresponds to a successful login attempt, changing the appearance of the first avatar to a first appearance; and
in accordance with a determination that the request to unlock the computer system corresponds to an unsuccessful login attempt, changing the appearance of the first avatar to a second appearance that is different from the first appearance.

13. The computer system of claim 12, wherein the first appearance is a static pose and the second appearance is an animated appearance.

14. The computer system of claim 1, wherein the second type of input includes a request for a password hint.

15. The computer system of claim 1, the one or more programs further including instructions for:
while displaying the first avatar, detecting entry of characters in a text entry field; and
in response to detecting the entry of characters in the text entry field, displaying, via the display generation component, the first avatar paying attention to a text entry field into which the characters are being entered.

16. The computer system of claim 15, the one or more programs further including instructions for:
subsequent to displaying the first avatar paying attention to the text entry field into which the characters are being entered, detecting that characters have not been entered into the text entry field for at least a predetermined amount of time; and
in response to detecting that characters have not been entered into the text entry field for at least the predetermined amount of time, displaying, via the display generation component, an animation of the first avatar transitioning to a pose that does not include the first avatar paying attention to the text entry field.

17. The computer system of claim 1, the one or more programs further including instructions for:
while the computer system is in the locked state, in accordance with a determination that user input has not been received for a second predetermined period of time, displaying, via the display generation component, an animation of the first avatar indicating that the computer system is waiting for user input.

18. The computer system of claim 17, wherein the animation of the first avatar indicating that the computer system is waiting for user input is based on a state of the computer system, including:
in accordance with a determination that the computer system is in a first state, the animation of the first avatar indicating that the computer system is waiting for user input is a first waiting animation; and
in accordance with a determination that the computer system is in a second state, the animation of the first avatar indicating that the computer system is waiting for user input is a second waiting animation that is different from the first waiting animation.

19. The computer system of claim 1, the one or more programs further including instructions for:
while the computer system is waiting for user input, displaying, via the display generation component, a waiting animation that includes displaying, in sequence:
a repeating animation that includes multiple repetitions of a same behavior;
a first emphasis animation that is different from the repeating animation and is selected from a set of emphasis animations that includes three or more different emphasis animations;
the repeating animation;
a second emphasis animation that is different from the repeating animation and is selected from the set of emphasis animations; and
the repeating animation.

20. The computer system of claim 1, wherein:
an animation of the first avatar indicating that the computer system is waiting for user input includes a first amount of movement of the first avatar when the computer system is in a state in which the first avatar has been selected from among a plurality of avatars; and
an animation of the first avatar indicating that the computer system is waiting for user input includes a second amount of movement, greater than the first amount of movement, of the first avatar when the computer system is in a state in which the first avatar has not been selected from among the plurality of avatars.

21. The computer system of claim 1, the one or more programs further including instructions for:
while the computer system is in the locked state, displaying, via the display generation component and concurrently with the first avatar, a password entry field.

22. The computer system of claim 21, wherein the lock screen user interface is a password entry user interface, the one or more programs further including instructions for:
while displaying the first avatar, detecting, via one or more user input devices, selection of the first avatar; and
wherein the password entry user interface that includes the password entry field is displayed in response to detecting the selection of the first avatar.

23. The computer system of claim 1, the one or more programs further including instructions for:
while the computer system is in the locked state, concurrently displaying in the lock screen user interface, via the display generation component, a plurality of avatars including the first avatar and a second avatar that is different from the first avatar.

24. The computer system of claim 23, wherein the first avatar and the second avatar are concurrently animated.

25. The computer system of claim 23, wherein concurrently displaying the plurality of avatars includes animating an avatar that has a current input focus with an active animation style that is not used for avatars that do not have the current input focus, including:

in accordance with a determination that the first avatar has the current input focus, concurrently displaying the first avatar with the active animation style; and in accordance with a determination that the second avatar has the current input focus, concurrently displaying the second avatar with the active animation style.

26. The computer system of claim 23, wherein concurrently displaying the plurality of avatars includes animating the plurality of avatars with a non-active animation style and the one or more programs further includes instructions for:

while displaying the plurality of avatars with the non-active animation style, detecting that an input focus has been directed to a respective avatar of the plurality of avatars; and in response to detecting the input focus has been directed to the respective avatar, changing the respective avatar from the non-active animation style to an active animation style, including:

in accordance with a determination that the first avatar has the current input focus, concurrently displaying the first avatar with the active animation style; and in accordance with a determination that the second avatar has the current input focus, concurrently displaying the second avatar with the active animation style.

27. The computer system of claim 23, wherein animating the first avatar and animating the second avatar includes selecting animations for the first avatar and the second avatar so as to avoid concurrently displaying same or similar animations for the first avatar and the second avatar.

28. The computer system of claim 1, wherein the first avatar is static while an operating system of the computer system is loading.

29. The computer system of claim 28, the one or more programs further including instructions for:

in response to a determination that the operating system has finished loading, transitioning display, via the display generation component, of the first avatar from being static to being animated.

30. The computer system of claim 28, wherein, while the first avatar is static, a pose of the first avatar corresponds to a user-selected pose associated with user contact information for the user account corresponding to the first avatar.

31. A non-transitory computer-readable storage medium storing one or more programs configured to be executed by one or more processors of a computer system that is in communication with a display generation component and one or more input devices, the one or more programs including instructions for:

while the computer system is in a locked state:

displaying, via the display generation component, a lock screen user interface that includes a first avatar; and while displaying the lock screen user interface that includes the first avatar, receiving, via the one or more input devices, first input; and in response to receiving the first input:

displaying, via the display generation component, a respective change in a respective element of the lock screen user interface other than the first avatar including:

in accordance with a determination that the first input is a first type of input, the respective change is a first change in the respective element of the lock screen user interface; and in accordance with a determination that the first input is a second type of input different from the first type of input, the respective change is a second change in the respective element of the lock screen user interface that is different from the first change in the respective element of the lock screen user interface; and displaying, via the display generation component, animation, over time, of the first avatar transitioning through a plurality of poses, wherein, after the animation, the first avatar is concurrently displayed along with the respective change in the respective element of the lock screen user interface other than the first avatar.

32. The computer-readable storage medium of claim 31, wherein the first avatar is a three-dimensional avatar and the animation, over time, of the first avatar transitioning through the plurality of poses includes a change in shape of the first avatar and/or a rotation of the first avatar.

33. The computer-readable storage medium of claim 31, wherein:

in accordance with a determination that the first input is a first type of input, the animation, over time, of the first avatar transitioning through the plurality of poses includes a first animation without including a second animation; and in accordance with a determination that the first input is a second type of input that is different from the first type of input, the animation, over time, of the first avatar transitioning through the plurality of poses includes the second animation without including the first animation.

34. The computer-readable storage medium of claim 31, wherein:

the respective element includes a cursor displayed via the display generation component;

the first type of input is a first pointing device input received via a pointing device that causes the cursor to move in the lock screen user interface; and the second type of input is an input other than input that causes the cursor to move.

35. The computer-readable storage medium of claim 31, wherein:

the respective element includes a cursor displayed via the display generation component;

the first type of input is a second pointing device input received via a pointing device that causes the cursor to move across the lock screen user interface to a location of the first avatar; and the second type of input is an input other than input that causes the cursor to move across the lock screen user interface to a location of the first avatar.

36. The computer-readable storage medium of claim 31, wherein:

the respective element includes a cursor displayed via the display generation component;

the first type of input is a third pointing device input, received via a pointing device, corresponding to a press input;

the first change in the respective element of the lock screen user interface includes a change in an appearance of a selectable user interface object in the lock screen user interface; and the second type of input is an input other than input corresponding to press input.

37. The computer-readable storage medium of claim 31, wherein:

the first type of input is a selection input corresponding to selection of the first avatar; and the second type of input is an input other than a selection input corresponding to selection of the first avatar.

38. The computer-readable storage medium of claim 37, the one or more programs further including instructions for:
in response to receiving the first input, displaying, via the display generation component, the first avatar sliding in a direction; and
wherein displaying, via the display generation component, animation, over time, of the first avatar transitioning through the plurality of poses includes a first pose based on the direction of sliding.

39. The computer-readable storage medium of claim 37, the one or more programs further including instructions for:
in response to receiving the first input, displaying an animation of the first avatar moving, including:
in accordance with a determination that the first avatar is displayed in a first portion of the lock screen user interface, the animation of the first avatar moving includes movement of the first avatar in a first direction; and
in accordance with a determination that the first avatar is displayed in a second portion of the lock screen user interface that is different from the first portion of the lock screen user interface, the animation of the first avatar moving includes movement of the first avatar in a second direction that is different from the first direction.

40. The computer-readable storage medium of claim 31, the one or more programs further including instructions for:
in response to a determination that user input has not been received for a first predetermined period of time, displaying, via the display generation component, an inactivity animation of the first avatar.

41. The computer-readable storage medium of claim 31, wherein the first type of input includes entering characters in a password entry field.

42. The computer-readable storage medium of claim 31, the one or more programs further including instructions for:
receiving a request to unlock the computer system including providing authentication information; and
in response to receiving the request to unlock the computer system, displaying, via the display generation component, animation, over time, of the first avatar transitioning through a plurality of poses includes:
in accordance with a determination that the request to unlock the computer system corresponds to a successful login attempt, changing the appearance of the first avatar to a first appearance; and
in accordance with a determination that the request to unlock the computer system corresponds to an unsuccessful login attempt, changing the appearance of the first avatar to a second appearance that is different from the first appearance.

43. The computer-readable storage medium of claim 42, wherein the first appearance is a static pose and the second appearance is an animated appearance.

44. The computer-readable storage medium of claim 31, wherein the second type of input includes a request for a password hint.

45. The computer-readable storage medium of claim 31, the one or more programs further including instructions for:
while displaying the first avatar, detecting entry of characters in a text entry field; and
in response to detecting the entry of characters in the text entry field, displaying, via the display generation component, the first avatar paying attention to a text entry field into which the characters are being entered.

46. The computer-readable storage medium of claim 45, the one or more programs further including instructions for:
subsequent to displaying the first avatar paying attention to the text entry field into which the characters are being entered, detecting that characters have not been entered into the text entry field for at least a predetermined amount of time; and
in response to detecting that characters have not been entered into the text entry field for at least the predetermined amount of time, displaying, via the display generation component, an animation of the first avatar transitioning to a pose that does not include the first avatar paying attention to the text entry field.

47. The computer-readable storage medium of claim 31, the one or more programs further including instructions for:
while the computer system is in the locked state, in accordance with a determination that user input has not been received for a second predetermined period of time, displaying, via the display generation component, an animation of the first avatar indicating that the computer system is waiting for user input.

48. The computer-readable storage medium of claim 47, wherein the animation of the first avatar indicating that the computer system is waiting for user input is based on a state of the computer system, including:
in accordance with a determination that the computer system is in a first state, the animation of the first avatar indicating that the computer system is waiting for user input is a first waiting animation; and
in accordance with a determination that the computer system is in a second state, the animation of the first avatar indicating that the computer system is waiting for user input is a second waiting animation that is different from the first waiting animation.

49. The computer-readable storage medium of claim 31, the one or more programs further including instructions for:
while the computer system is waiting for user input, displaying, via the display generation component, a waiting animation that includes displaying, in sequence:
a repeating animation that includes multiple repetitions of a same behavior;
a first emphasis animation that is different from the repeating animation and is selected from a set of emphasis animations that includes three or more different emphasis animations;
the repeating animation;
a second emphasis animation that is different from the repeating animation and is selected from the set of emphasis animations; and
the repeating animation.

50. The computer-readable storage medium of claim 31, wherein:
an animation of the first avatar indicating that the computer system is waiting for user input includes a first amount of movement of the first avatar when the computer system is in a state in which the first avatar has been selected from among a plurality of avatars; and
an animation of the first avatar indicating that the computer system is waiting for user input includes a second amount of movement, greater than the first amount of movement, of the first avatar when the computer system is in a state in which the first avatar has not been selected from among the plurality of avatars.

51. The computer-readable storage medium of claim 31, the one or more programs further including instructions for:

while the computer system is in the locked state, displaying, via the display generation component and concurrently with the first avatar, a password entry field.

52. The computer-readable storage medium of claim 51, wherein the lock screen user interface is a password entry user interface, the one or more programs further including instructions for:
    while displaying the first avatar, detecting, via one or more user input devices, selection of the first avatar; and
    wherein the password entry user interface that includes the password entry field is displayed in response to detecting the selection of the first avatar.

53. The computer-readable storage medium of claim 31, the one or more programs further including instructions for:
    while the computer system is in the locked state, concurrently displaying in the lock screen user interface, via the display generation component, a plurality of avatars including the first avatar and a second avatar that is different from the first avatar.

54. The computer-readable storage medium of claim 53, wherein the first avatar and the second avatar are concurrently animated.

55. The computer-readable storage medium of claim 53, wherein concurrently displaying the plurality of avatars includes animating an avatar that has a current input focus with an active animation style that is not used for avatars that do not have the current input focus, including:
    in accordance with a determination that the first avatar has the current input focus, concurrently displaying the first avatar with the active animation style; and
    in accordance with a determination that the second avatar has the current input focus, concurrently displaying the second avatar with the active animation style.

56. The computer-readable storage medium of claim 53, wherein concurrently displaying the plurality of avatars includes animating the plurality of avatars with a non-active animation style and the one or more programs further includes instructions for:
    while displaying the plurality of avatars with the non-active animation style, detecting that an input focus has been directed to a respective avatar of the plurality of avatars; and
    in response to detecting the input focus has been directed to the respective avatar, changing the respective avatar from the non-active animation style to an active animation style, including:
    in accordance with a determination that the first avatar has the current input focus, concurrently displaying the first avatar with the active animation style; and
    in accordance with a determination that the second avatar has the current input focus, concurrently displaying the second avatar with the active animation style.

57. The computer-readable storage medium of claim 53, wherein animating the first avatar and animating the second avatar includes selecting animations for the first avatar and the second avatar so as to avoid concurrently displaying same or similar animations for the first avatar and the second avatar.

58. The computer-readable storage medium of claim 31, wherein the first avatar is static while an operating system of the computer system is loading.

59. The computer-readable storage medium of claim 58, the one or more programs further including instructions for:
    in response to a determination that the operating system has finished loading, transitioning display, via the display generation component, of the first avatar from being static to being animated.

60. The computer-readable storage medium of claim 58, wherein, while the first avatar is static, a pose of the first avatar corresponds to a user-selected pose associated with user contact information for the user account corresponding to the first avatar.

61. A method, comprising:
    at a computer system that is in communication with a display generation component and one or more input devices:
        while the computer system is in a locked state:
            displaying, via the display generation component, a lock screen user interface that includes a first avatar; and
            while displaying the lock screen user interface that includes the first avatar, receiving, via the one or more input devices, first input; and
        in response to receiving the first input:
            displaying, via the display generation component, a respective change in a respective element of the lock screen user interface other than the first avatar including:
                in accordance with a determination that the first input is a first type of input, the respective change is a first change in the respective element of the lock screen user interface; and
                in accordance with a determination that the first input is a second type of input different from the first type of input, the respective change is a second change in the respective element of the lock screen user interface that is different from the first change in the respective element of the lock screen user interface; and
            displaying, via the display generation component, animation, over time, of the first avatar transitioning through a plurality of poses, wherein, after the animation, the first avatar is concurrently displayed along with the respective change in the respective element of the lock screen user interface other than the first avatar.

62. The method of claim 61, wherein the first avatar is a three-dimensional avatar and the animation, over time, of the first avatar transitioning through the plurality of poses includes a change in shape of the first avatar and/or a rotation of the first avatar.

63. The method of claim 61, wherein:
    in accordance with a determination that the first input is a first type of input, the animation, over time, of the first avatar transitioning through the plurality of poses includes a first animation without including a second animation; and
    in accordance with a determination that the first input is a second type of input that is different from the first type of input, the animation, over time, of the first avatar transitioning through the plurality of poses includes the second animation without including the first animation.

64. The method of claim 61, wherein:
    the respective element includes a cursor displayed via the display generation component;
    the first type of input is a first pointing device input received via a pointing device that causes the cursor to move in the lock screen user interface; and
    the second type of input is an input other than input that causes the cursor to move.

65. The method of claim 61, wherein:
the respective element includes a cursor displayed via the display generation component;
the first type of input is a second pointing device input received via a pointing device that causes the cursor to move across the lock screen user interface to a location of the first avatar; and
the second type of input is an input other than input that causes the cursor to move across the lock screen user interface to a location of the first avatar.

66. The method of claim 61, wherein:
the respective element includes a cursor displayed via the display generation component;
the first type of input is a third pointing device input, received via a pointing device, corresponding to a press input;
the first change in the respective element of the lock screen user interface includes a change in an appearance of a selectable user interface object in the lock screen user interface; and
the second type of input is an input other than input corresponding to press input.

67. The method of claim 61, wherein:
the first type of input is a selection input corresponding to selection of the first avatar; and
the second type of input is an input other than a selection input corresponding to selection of the first avatar.

68. The method of claim 67, further comprising:
in response to receiving the first input, displaying, via the display generation component, the first avatar sliding in a direction; and
wherein displaying, via the display generation component, animation, over time, of the first avatar transitioning through the plurality of poses includes a first pose based on the direction of sliding.

69. The method of claim 67, further comprising:
in response to receiving the first input, displaying an animation of the first avatar moving, including:
in accordance with a determination that the first avatar is displayed in a first portion of the lock screen user interface, the animation of the first avatar moving includes movement of the first avatar in a first direction; and
in accordance with a determination that the first avatar is displayed in a second portion of the lock screen user interface that is different from the first portion of the lock screen user interface, the animation of the first avatar moving includes movement of the first avatar in a second direction that is different from the first direction.

70. The method of claim 61, further comprising:
in response to a determination that user input has not been received for a first predetermined period of time, displaying, via the display generation component, an inactivity animation of the first avatar.

71. The method of claim 61, wherein the first type of input includes entering characters in a password entry field.

72. The method of claim 61, further comprising:
receiving a request to unlock the computer system including providing authentication information; and
in response to receiving the request to unlock the computer system, displaying, via the display generation component, animation, over time, of the first avatar transitioning through a plurality of poses includes:
in accordance with a determination that the request to unlock the computer system corresponds to a successful login attempt, changing the appearance of the first avatar to a first appearance; and
in accordance with a determination that the request to unlock the computer system corresponds to an unsuccessful login attempt, changing the appearance of the first avatar to a second appearance that is different from the first appearance.

73. The method of claim 72, wherein the first appearance is a static pose and the second appearance is an animated appearance.

74. The method of claim 61, wherein the second type of input includes a request for a password hint.

75. The method of claim 61, further comprising:
while displaying the first avatar, detecting entry of characters in a text entry field; and
in response to detecting the entry of characters in the text entry field, displaying, via the display generation component, the first avatar paying attention to a text entry field into which the characters are being entered.

76. The method of claim 75, further comprising:
subsequent to displaying the first avatar paying attention to the text entry field into which the characters are being entered, detecting that characters have not been entered into the text entry field for at least a predetermined amount of time; and
in response to detecting that characters have not been entered into the text entry field for at least the predetermined amount of time, displaying, via the display generation component, an animation of the first avatar transitioning to a pose that does not include the first avatar paying attention to the text entry field.

77. The method of claim 61, further comprising:
while the computer system is in the locked state, in accordance with a determination that user input has not been received for a second predetermined period of time, displaying, via the display generation component, an animation of the first avatar indicating that the computer system is waiting for user input.

78. The method of claim 77, wherein the animation of the first avatar indicating that the computer system is waiting for user input is based on a state of the computer system, including:
in accordance with a determination that the computer system is in a first state, the animation of the first avatar indicating that the computer system is waiting for user input is a first waiting animation; and
in accordance with a determination that the computer system is in a second state, the animation of the first avatar indicating that the computer system is waiting for user input is a second waiting animation that is different from the first waiting animation.

79. The method of claim 61, further comprising:
while the computer system is waiting for user input, displaying, via the display generation component, a waiting animation that includes displaying, in sequence:
a repeating animation that includes multiple repetitions of a same behavior;
a first emphasis animation that is different from the repeating animation and is selected from a set of emphasis animations that includes three or more different emphasis animations;
the repeating animation;
a second emphasis animation that is different from the repeating animation and is selected from the set of emphasis animations; and
the repeating animation.

80. The method of claim 61, wherein:
- an animation of the first avatar indicating that the computer system is waiting for user input includes a first amount of movement of the first avatar when the computer system is in a state in which the first avatar has been selected from among a plurality of avatars; and
- an animation of the first avatar indicating that the computer system is waiting for user input includes a second amount of movement, greater than the first amount of movement, of the first avatar when the computer system is in a state in which the first avatar has not been selected from among the plurality of avatars.

81. The method of claim 61, further comprising:
- while the computer system is in the locked state, displaying, via the display generation component and concurrently with the first avatar, a password entry field.

82. The method of claim 81, wherein the lock screen user interface is a password entry user interface, the method further comprising:
- while displaying the first avatar, detecting, via one or more user input devices, selection of the first avatar; and
- wherein the password entry user interface that includes the password entry field is displayed in response to detecting the selection of the first avatar.

83. The method of claim 61, further comprising:
- while the computer system is in the locked state, concurrently displaying in the lock screen user interface, via the display generation component, a plurality of avatars including the first avatar and a second avatar that is different from the first avatar.

84. The method of claim 83, wherein the first avatar and the second avatar are concurrently animated.

85. The method of claim 83, wherein concurrently displaying the plurality of avatars includes animating an avatar that has a current input focus with an active animation style that is not used for avatars that do not have the current input focus, including:
- in accordance with a determination that the first avatar has the current input focus, concurrently displaying the first avatar with the active animation style; and
- in accordance with a determination that the second avatar has the current input focus, concurrently displaying the second avatar with the active animation style.

86. The method of claim 83, wherein concurrently displaying the plurality of avatars includes animating the plurality of avatars with a non-active animation style, the method further comprising:
- while displaying the plurality of avatars with the non-active animation style, detecting that an input focus has been directed to a respective avatar of the plurality of avatars; and
- in response to detecting the input focus has been directed to the respective avatar, changing the respective avatar from the non-active animation style to an active animation style, including:
  - in accordance with a determination that the first avatar has the current input focus, concurrently displaying the first avatar with the active animation style; and
  - in accordance with a determination that the second avatar has the current input focus, concurrently displaying the second avatar with the active animation style.

87. The method of claim 83, wherein animating the first avatar and animating the second avatar includes selecting animations for the first avatar and the second avatar so as to avoid concurrently displaying same or similar animations for the first avatar and the second avatar.

88. The method of claim 61, wherein the first avatar is static while an operating system of the computer system is loading.

89. The method of claim 88, further comprising:
- in response to a determination that the operating system has finished loading, transitioning display, via the display generation component, of the first avatar from being static to being animated.

90. The method of claim 88, wherein, while the first avatar is static, a pose of the first avatar corresponds to a user-selected pose associated with user contact information for the user account corresponding to the first avatar.

* * * * *

UNITED STATES PATENT AND TRADEMARK OFFICE
CERTIFICATE OF CORRECTION

| | |
|---|---|
| PATENT NO. | : 11,776,190 B2 |
| APPLICATION NO. | : 17/736925 |
| DATED | : October 3, 2023 |
| INVENTOR(S) | : Raymond S. Sepulveda et al. |

Page 1 of 2

It is certified that error appears in the above-identified patent and that said Letters Patent is hereby corrected as shown below:

In the Claims

In Column 53, Claim 12, Line 21, delete "the appearance" and insert -- an appearance --, therefor.

In Column 55, Claim 26, Line 20, delete "the current input focus" and insert -- the input focus --, therefor.

In Column 55, Claim 26, Line 23, delete "the current input focus" and insert -- the input focus --, therefor.

In Column 55, Claim 30, Line 43, delete "the user account" and insert -- a user account --, therefor.

In Column 57, Claim 42, Line 47, delete "the appearance" and insert -- an appearance --, therefor.

In Column 59, Claim 56, Line 50, delete "the current input focus" and insert -- the input focus --, therefor.

In Column 59, Claim 56, Line 53, delete "the current input focus" and insert -- the input focus --, therefor.

In Column 60, Claim 60, Line 6, delete "the user account" and insert -- a user account --, therefor.

In Column 62, Claim 72, Line 1, delete "the appearance" and insert -- an appearance --, therefor.

In Column 64, Claim 86, Line 18, delete "the current input focus" and insert -- the input focus --, therefor.

Signed and Sealed this
Eighteenth Day of November, 2025

John A. Squires
*Director of the United States Patent and Trademark Office*

CERTIFICATE OF CORRECTION (continued)
U.S. Pat. No. 11,776,190 B2

In Column 64, Claim 86, Line 21, delete "the current input focus" and insert -- the input focus --, therefor.

In Column 64, Claim 90, Line 40, delete "the user account" and insert -- a user account --, therefor.